(12) United States Patent
Kato et al.

(10) Patent No.: US 7,090,400 B2
(45) Date of Patent: Aug. 15, 2006

(54) SEPARATOR, LINEAR GUIDE USING THE SEPARATOR AND LINEAR MOTION APPARATUS

(75) Inventors: Soichiro Kato, Kanagawa (JP); Masaru Akiyama, Kanagawa (JP)

(73) Assignee: NSK Ltd., Tokyo (JP)

( * ) Notice: Subject to any disclaimer, the term of this patent is extended or adjusted under 35 U.S.C. 154(b) by 103 days.

(21) Appl. No.: 10/774,624

(22) Filed: Feb. 10, 2004

(65) Prior Publication Data
US 2004/0190801 A1 Sep. 30, 2004

(30) Foreign Application Priority Data

| Feb. 10, 2003 | (JP) | ............................ 2003-032456 |
| Jun. 3, 2003 | (JP) | ............................ 2003-157701 |
| Jul. 31, 2003 | (JP) | ............................ 2003-284433 |
| Aug. 13, 2003 | (JP) | ............................ 2003-292892 |

(51) Int. Cl.
*F16C 29/06* (2006.01)

(52) U.S. Cl. ........................................................ 384/44

(58) Field of Classification Search .................. 384/44, 384/551, 43, 45; 464/168, 164
See application file for complete search history.

(56) References Cited

FOREIGN PATENT DOCUMENTS

| JP | 40-24405 B | 10/1940 |
| JP | 52-110246 UM A | 8/1977 |
| JP | 56-2206 B | 1/1981 |
| JP | 11-247855 A | 9/1999 |
| JP | 2000-291668 A | 10/2000 |
| JP | 2001-132745 A | 5/2001 |
| JP | 2001-317552 A | 10/2001 |
| JP | 2002-039175 A | 2/2002 |
| JP | 2002-089651 A | 3/2002 |
| JP | 2002-156018 A | 5/2002 |

*Primary Examiner*—Lenard A. Footland
(74) *Attorney, Agent, or Firm*—Sughrue Mion, PLLC

(57) ABSTRACT

A separator for use in a linear guide having a guide rail, a slider disposed on the guide rail so as to move relatively each other, and a plurality of roller-shaped rolling elements incorporated in the slider, the separator has a separator main body having, on both sides in a front and rear direction thereof, recessed surface sections which contact circumferential sections of the rolling elements; and at least a pair of arm sections provided parallel to each other on both sides of the separator main body while being oriented in the same direction, wherein a length of the arm section is equal or shorter than a distance between centers of two adjacent rolling elements with the separator main body sandwiched therebetween, with respect to a lateral direction of the separator main-body.

21 Claims, 34 Drawing Sheets

SEPARATOR, LINEAR GUIDE USING THE SEPARATOR AND LINEAR MOTION APPARATUS

BACKGROUND OF THE INVENTION

1. Field of the Invention

The present invention relates to a linear guide, and more particularly, to a separator (partition element), a linear guide equipped with the separator, and an apparatus using the linear guide.

The present invention also relates to a direct-acting apparatus used in industrial machinery; e.g., a linear guide bearing, a ball screw, a ball spline, and a linear ball bush.

2. Description of the Related Art

A linear guide using roller-shaped rolling elements as rolling elements comprises a guide rail for guiding an object which moves linearly; and a slider disposed on the guide rail in a movable manner. When the slider has moved over the guide rail in a longitudinal direction thereof, a plurality of roller-shaped rolling elements incorporated in the slider roll in the longitudinal direction of the guide rail between a raceway formed on the guide rail and another raceway formed on the slider.

Such a linear guide has greater rigidity and load capacity than a linear guide using spherical rolling elements. When adjacent rolling elements come into contact with each other, at the area of contact the respective rolling elements rotate in opposite directions. Therefore, the frictional force which develops at the contact area hinders smooth rolling actions of the rolling elements. In the previously-described linear guide, axial fluctuations; that is, so-called skews, arise in the rolling elements, which may in turn impair the operability of the linear guide.

To solve the problem, JP-A-2001-132745 and JP-B-40-24405, which are provided below, disclose a linear guide which has separators sandwiched between roller-shaped rolling elements, to thereby prevent occurrence of contact between rolling elements and skew.

However, the linear guide disclosed by JP-A-2001-132745 uses, as separators to be interposed between the roller-shaped rolling elements, a separator main body which has, on both sides in the front and rear direction thereof, recessed surfaces to contact a circumferential surface of the roller-shaped rolling element; and a flange section which extends from either side of the separator main body in opposite directions and comes into surface contact with one end face of a rolling element. Therefore, the rotational resistance of the rolling element is increased on one end of the separator main body, thereby decreasing the rotational balance of the rolling elements. Therefore, the effect of suppressing skew is insufficient.

The linear guide disclosed by JP-B-40-24405 employs a configuration wherein partition elements, in which plate-like webs extending toward centers of rolling elements are provided on both sides of each partition element, are used as separators; and wherein the webs of the partition elements are brought into contact with each other in the vicinity of the center of the rolling elements, thereby supporting each other. Therefore, a clearance rises between any of adjacent rolling elements and any one of adjacent partition elements. As a result, a distance between the centers of two rolling elements which are adjacent to each other with a partition element interposed therebetween become larger than necessary. Therefore, the number of rolling elements disposed in a load zone may be decreased, which may in turn result in a decrease in load capacity. Moreover., in the case of the linear guide described in JP-B-40-24405, the widthwise length of the partition is greater than the axial length of the rolling element. Hence, a clearance arises between the end face of the rolling element and the web. Thus, an effect for inhibiting occurrence of skew is insufficient.

In a linear guide having a plurality of rolling elements arranged therein, the rolling elements circulate endlessly, and the respective rolling elements roll in a single direction. When adjacent rolling elements come into contact with each other, at the area of contact the respective rolling elements rotate in opposite directions. Therefore, the force—which develops at the contact area and presses the rolling elements—hinders smooth rolling actions of the rolling elements which remain in contact with each other. This may impair smooth operation of the linear guide.

When columnar or cylindrical rollers are employed for rolling elements, the rigidity and load capacity (allowable bearing load) of the rolling elements can be enhanced as compared with a case where spherical balls are adopted as rolling elements. However, axial fluctuations; that is, so-called skews (a phenomenon of longitudinal axes of columnar or cylindrical rollers failing to remain orthogonal to the traveling direction and becoming skewed), arise in traveling rollers, which may in turn impair the operability of the rolling elements and, by extension, the operability of the linear guide.

For this reason, the linear guide is constructed to prevent the rolling elements from coming into direct contact with each other by means of interposing separators (partition elements) between rolling elements, in an attempt to make rolling (traveling) actions of the rolling elements smooth, enhance the operability of the same, and reduce noise which arises during traveling of the rolling elements.

For instance, JP-B-40-24405, JP-UM-A-52-110246, and JP-B-56-2206 provided below describe separators to be interposed between rollers.

JP-B-40-24405 discloses partition elements as partition elements (separators) to be employed in a bearing using rollers. The partition element has a recessed contact section fitting to a cylindrical surface of the roller, and arm sections (webs) which are provided on respective sides of the partition element with the center thereof aligned therebetween in the direction of linear motion and are extended to the center of the roller. This partition element is configured to bring the arm sections thereof into contact with arm sections extending from adjacent partition elements.

However, the partition element disclosed by JP-B-40-24405 is configured to transmit the force—which is transmitted to the partition element when the roller rolls and moves—to the next partition element by way of an arm section provided on the next partition element. In reality, the partition element suffers the following problems.

As motion of the roller shifts from a linear section to a change direction section, a change arises in the areas where the arm sections come into contact with each other, which may in turn widen a distance between rollers originally, in order to increase load capacity of the linear guide, rollers and partition elements are arranged comparatively tightly within the change direction section so that the largest possible number of rollers can be arranged in a load zone. For this reason, by means of action of the widening force, force which is greater than necessary may act on the arm sections remaining in contact with each other, thereby hindering smooth movement of the rollers and partition elements and deteriorating operability.

As described in JP-B-40-24405, in the case of the partition elements which transmit force by means of bringing arm sections into contact with each other, a gap arises between a roller and a partition element located before or after the roller in the traveling direction, which may fail to sufficiently hinder occurrence of skew. Moreover, the number of rollers which can be disposed in the load zone is diminished by presence of the gap. This may also result in a failure to sufficiently enhance the load capacity.

In a linear guide, a slider moves relative to a guide rail while a plurality of rolling elements are rolling through an endless circulation path. When the slider has moved relative to the guide rail, the respective rolling elements move while rolling in one direction, and hence adjacent rolling elements contact each other. As a result, there arises the problems of hindrance of smooth rolling actions of the rolling elements, rapid progress in abrasion of the rolling elements, and an increase in noise.

Therefore, there has hitherto been known a linear guide which smoothly rolls rolling elements to thus prevent early abrasion of the rolling elements and is provided with separators interposed between adjacent rolling elements in order to activate the linear guide while suppressing emission of noise (see, e.g., JP-A-11-247855, JP-A-2000-291668, JP-A-2001-317552, JP-A-2002-089651, JP-A-2002-039175 and JP-A-2002-156018).

A known conventional separator has arm sections or the like for retaining adjacent rolling elements in a predetermined position. For instance, according to the technique described in JP-A-11-247855, a train of rolling elements is constituted by connecting adjacent separators with rolling elements sandwiched therebetween. The rolling elements can be aligned in parallel within the endless circulation path by means of interconnecting the separators. As a result, axial fluctuations (skew) in and interference between the rolling elements is lessened, thereby enabling stable circulation of the rolling elements.

According to techniques described in, e.g., JP-A-2000-291668, JP-A-2001-317552, JP-A-2002-7089651, JP-A-2002-039175 and JP-A-2002-156018, a lubricant reservoir section, which is formed from a recess or a through hole, is formed in the separator for preserving lubricant. As a result of the lubricant reservoir section being formed in the separator, the rolling elements are smoothly rolled, thereby activating the linear guide while preventing early abrasion of the rolling elements and generation of noise.

However, according to the technique described in JP-A-11-247855, the separator is not provided with a recess, a through hole, or the like which is employed for preserving lubricant according to the techniques described in JP-A-2000-291668, JP-A-2001-317552, JP-A-2002-089651, JP-A-2002-039175 and JP-A-2002-156018. Therefore, the technique allows some improvements in terms of smooth rolling action of the rolling elements, prevention of early abrasion of the rolling elements, and activation of the linear guide while suppressing generation of noise.

In the meantime, according to the techniques described in JP-A-2000-291668, JP-A-2001-317552, JP-A-2002-089651, JP-A-2002-039175 and JP-A-2002-156018, the separator is not equipped with arm sections or the like which are employed for actively regulating the position of the rolling elements according to the technique of JP-A-11-247855. Therefore, a problem of stable circulation of the rolling elements while effectively suppressing axial fluctuations (skew) in and interference between the rolling elements still remains unsolved.

The present inventors have worked on development of a separator capable of comprehensively solving the above-described problems.

An assembly operation for manually inserting rolling elements into an endless circulation path while interposing separators between adjacent rolling elements is very time consuming. Therefore, automation of the assembly operation is desirable in terms of an improvement in productivity.

Therefore, a conceivable method is to align the separators through use of an automatic alignment machine, such as a parts feeder, and to successively automate the assembly operation through use of, e.g., a robot.

As separators capable of comprehensively solving the foregoing problems, there were prepared a plurality of separators which merely constitute a train of rolling elements, each rolling element having arm sections enabling alignment of the rolling element, and a lubricant reservoir section constituted of a recess or a through hole. A test was performed for automatically aligning the separators. In some cases the arm sections came to fit into the through holes or the like serving as the lubricant reservoir sections, which resulted in entanglement of the separators and ended in failure to align the separators.

As mentioned above, there still remain problems to be solved before realizing separators which have the function of controlling the position of the rolling elements and storing lubricant and take into consideration automation of production.

As shown in, e.g., FIG. 40, a linear guide bearing apparatus having an axially-extending guide rail 501 and a slider 502 disposed so as to straddle the guide rail 501 and be relatively movable in an axial direction has been known as a conventional direct-acting apparatus of this type.

Two axially-extending raceway surfaces 503 are formed on either side surface of the guide rail 501 in a transverse direction thereof, and hence a total of four raceway surfaces 503 are formed. Raceway surfaces 505 opposing the raceway surfaces 503 are formed on each inner side surface of a sleeve section 504 of a slider main body 502A of the slider 502.

A plurality of cylindrical rollers 506, serving as rolling elements, are rotatively loaded between the raceway surfaces. The slider 502 can axially, relatively move over the guide rail 501 by means of rolling actions of the cylindrical rollers 506.

As the slider 502 moves, the cylindrical rollers 506 interposed between the guide rail 501 and the slider 502 rotate and move toward an axial end of the slider 502. However, in order to continuously move the slider 502 in the axial direction, the cylindrical rollers 506 must be circulated endlessly.

Holes 507 are formed in the sleeve section 504 of the slider main body 502A so as to penetrate through the sleeve section 504. A circulation tube 8 whose inside is formed into a passage (rolling element passage) 508a for the cylindrical rollers 506 is fitted into each of the holes 507. A pair of end caps 509, which serve as rolling element circulation components, are fixed to the respective axial ends of the slider main body 502A through use of screws or the like. A change direction path 510 (see FIG. 41B)—which brings the raceway surfaces 503, 505 into communication with the rolling element passage 508a and is formed into a semi-circular shape—is formed in each of the end caps 509, thereby forming an endless circulation path for the cylindrical rollers 506.

The plurality of cylindrical rollers 506 that circulate the endless-circulation path rotate about roller shafts in one direction. When adjacent cylindrical rollers 506 have come into contact with each other, velocities of the rollers at that contact area are oriented in opposite directions. Force stemming from the contact hinders smooth rolling action of the cylindrical rollers 506.

As shown in FIG. 41., with this being the case, separators (partition elements) 520 are interposed between adjacent cylindrical rollers 506, thereby hindering the cylindrical rollers 506 from coming into direct contact with each other. As a result, the travel of the slider 502 is made smooth, and an attempt is made to diminish noise which arises during the course of travel of the slider. As shown in FIGS. 42 through 44, the separator 520 comprises a separator main body 521 interposed between the adjacent cylindrical rollers 506, and arm sections 522 which are arranged such that the axial end faces of the cylindrical roller 506 are sandwiched between the arm sections 522 and which are formed integrally with the separator main body 521. Recessed sections 521a agreeing with the outer circumferential shape of the cylindrical roller 506 are formed in areas of the separator main body 521 opposing the outer circumferential surface of the cylindrical roller 506. In FIG. 40, reference numeral 523 designates a separator guide member interposed between an outer side surface of the guide rail 501 and the inner side surface of the slider 502.

When the cylindrical rollers 506 circulate through the space defined between the raceway surfaces 503 and 505, the change direction path 510, and the rolling element passage 508a, the arm sections 522 of the separators 520 are guided along guide grooves 524 in the direction in which the cylindrical rollers 506 are circulated, wherein the guide grooves are formed in the separator guide member 523, the rolling element passage 508a, and the change direction path 510.

Incidentally, the present applicants have already proposed use of an elastomeric material, such as Hytrel® or Pelprene® (manufactured by Toyobo Co., Ltd. under this tradename), in order to absorb fluctuations in the length of a path due to a change in the phase of the rolling element in the endless circulation path for the rolling elements (see JP-A-2002-21849). Further, the separators have been swollen by fat and oil of lubricant or the like. Depending on a contact position between the rolling element and the separator, the pitch between the rolling elements may have become greatly changed, thereby raising a problem which adversely affects operability, a low noise characteristic, and durability. Therefore, the contact position between the rolling element and the separator is defined as a position of 50% or less the diameter of the rolling element, particularly a position ranging from 30% to 50% (when the positions are converted into contact angles, a position where a contact angle of 30° or less is achieved, particularly a position where a contact angle of 17.5° to 30° is achieved) (see JP-A-2003-49834).

However, depending on a radius curvature "f" of the recessed section of the separator {determined by (a radius R of a groove of a recessed section)/(a radius Dw of a rolling element)} or the value of a thickness 2δ of the bottom of the groove of the recessed section of the separator, the contact position between the rolling element and the separator defined in JP-A-2002-21849 cannot always attain an optimum value. For instance, when there are employed 0.54 for the curvature radius "f" of the recessed section of the separator; 8 mm for the radius Dw of the rolling element; and 1.2 mm (a value which ensures the number of rolling elements required to satisfy load capacity or the like) for the thickness 2δ of the recessed section of the separator, the contact position between the rolling element and the separator exceeds 50% (corresponding to a contact angle of 30°) of the diameter of the rolling element, and 52% (corresponding to a contact angle of 31°) becomes an optimum value {a dimensional difference between the length of the swelling in the separator in a radial direction thereof and the thickness of the swelling in the separator in a thicknesswise direction thereof becomes zero (see FIG. 45); the swelling in the radial direction leads to a decrease in the pitch between the rolling elements, and the swelling in the thicknesswise direction leads to an increase in the pitch between the rolling elements}.

SUMMARY OF THE INVENTION

The present invention has been conceived in view of the foregoing problem and aims at providing a separator for a linear guide which can prevent occurrence of contact between rolling elements and skew without involvement of a decrease in load capacity.

The present invention has been conceived in light of the problems in the related art and aims at providing a separator for a linear guide which effectively inhibits occurrence of a decrease in load capacity and skew and achieves enhanced operability with a simple construction, as well as providing a linear guide including the separator, and an apparatus including the linear guide.

The present invention has been conceived in light of the problems set forth and aims at providing a separator for use with a linear guide which lessens axial fluctuations (skew) in and interference between rolling elements, prevents early abrasion of the rolling elements by circulating the rolling elements in a more stable manner and rolling the rolling elements more smoothly, prevents generation of noise, and is capable of improving productivity of the linear guide, as well as providing a linear guide.

The present invention has been conceived to solve the problem and aims at providing a direct-acting apparatus which can readily realize an improvement in operability, a low-noise characteristic, and durability at low cost while suppressing fluctuations in a pitch between rolling elements due to the influence of swelling due to oil and fat of lubricant or the like.

To achieve the object, a first aspect of the present invention is a separator for use in a linear guide having a guide rail, a slider disposed on the guide rail so as to move relatively each other, and a plurality of roller-shaped rolling elements incorporated in the slider, the separator having a separator main body having, on both sides in a front and rear direction thereof, recessed surface sections which contact circumferential sections of the rolling elements; and at least a pair of arm sections provided parallel to each other on both sides of the separator main body while being oriented in the same direction, wherein a length of the arm section is equal or shorter than a distance between centers of two adjacent rolling elements with the separator main body sandwiched therebetween, with respect to a lateral direction of the separator main body.

By means of such a configuration, there is prevented occurrence of a clearance between the rolling elements and the separator main body and an eventual decrease in the number of rolling elements to be disposed in the load zone, which has arisen in the linear guided is closed by JP-B-40-24405 as a result of the length L between the arm sections of the separator being made shorter than the distance between the centers of the two adjacent rolling elements. Hence, occurrence of contact between the rolling elements and skew can be inhibited without involvement of a decrease in load capacity. Moreover, there is also prevented occurrence of an offset of rotational resistance of the separators to the rolling elements, which has arisen in the linear guide disclosed by JP-A-2001-132745. Hence, an effect of inhibiting occurrence of skew can be sufficiently yielded.

A second aspect of the present invention is a separator for a linear guide according to the first aspect, wherein the arm sections have a height which is about 20% to 60% with respect to the diameter of the roller-shaped rolling element. By means of adoption of such a configuration, the separator main body can be reinforced with arm sections, and sufficient contact area can be ensured between an end face of a rolling element and a raceway contacting the end face.

A third aspect of the present invention is a separator for a linear guide according to first or second aspect, wherein a lateral length of the separator main body is made slightly shorter than an axial length of the roller-shaped rolling element, and wherein one of right and left side surface sections of the rolling element contacts with a surface which is formed on an inner side surface of the slider so as to be adjacent to a raceway of the slider and is finished concurrently with finishing of the raceway. As a result of adoption of such a configuration, the positions of the rolling elements become more stable, thereby yielding a sufficient effect of inhibiting occurrence of skew in the rolling elements.

A fourth aspect of the present invention is a separator for use in a linear guide having a guide rail., a slider disposed on the guide rail so as to move relatively each other, and a plurality of roller-shaped rolling elements incorporated in the slider, the separator having: a separator main body having, on both sides in a front and rear direction thereof, recessed surface sections which contact circumferential sections of the rolling elements; and a clearance groove formed in the center of the recessed surface section in a circumferential direction of the rolling element. As a result of adoption of such a configuration, the contact area between the separator and the rolling element is limited to right and left sides of the separator. Hence, occurrence of skew in the rolling element is inhibited, thereby attaining enhanced operability of the linear guide.

A fifth aspect of the present invention is a separator for use in a linear guide according to the first or fourth aspect, wherein a through hole is formed in the center of the recessed surface sections so as to penetrate through the recessed surface sections in the front and rear direction of the separator main body. As a result of adoption of such a configuration, a lubricant can be stored in the through holes, and the lubricant stored in the through holes can be stably supplied to the rolling elements.

The separator defined in a sixth aspect is a separator for a linear guide according to the first aspect, further comprising bridge sections for connecting the separator main bodies with the arm sections.

By means of such a configuration, the separators are prevented from contacting each other. Hence, there can be achieved smooth operation of separators and, by extension, smooth operation of rollers. Since occurrence of skew in the rollers can be inhibited, more smooth operation can be achieved. Pattering of the rollers, which would otherwise arise at the entrance of the load zone, is suppressed. Eventually, noise and vibrations, which are caused during operation, can also be inhibited.

If an attempt is made to shorten the distance between the rollers in order to enhance the load capacity by means of increasing the number of rollers disposed within the load zone, the roller contact section of the separator main body will become thin in the moving direction (i.e., the direction of linear motion). Resultantly, the separator main body will become weakened. However, according to the invention, a joint between an upper portion of the separator main body and a lower portion of the separator main body is enhanced by means of the bridge section located between the arm section and the separator, thereby reinforcing the separator main body.

Therefore, the distance between the rollers can be shortened while desired strength is ensured. Therefore, even when the separators are sandwiched between the rollers, a decrease in the number of rollers located within the load zone and a drop in load capacity can be minimized.

The roller end faces are guided by the arm sections and, hence, a chance of the roller becoming dislodged from the separator main body or occurrence of a skew can be minimized.

Moreover, in a case where the linear guide has used the separators, if the arm sections are guided, occurrence of skew in a roller can be inhibited more effectively, which in turn enables more smooth operation of the rollers and the separators.

An invention defined in a seventh aspect is a separator for a linear guide according to the sixth aspect, wherein, in relation to the height of the recessed surface from an imaginary line interconnecting rotational centers of the adjacent rolling elements to an end face substantially parallel to a direct-acting surface of the rolling element in the recessed surface section of the separator main body, in a change direction section where the direction of movement of the rolling element is changed around a predetermined motion center, a height Ho of the recessed surface from the imaginary line interconnecting the rotational centers of the adjacent rolling elements on a distal side with reference to the motion center is made greater than a height Hi of the recessed surface from the imaginary line interconnecting rotational centers of the adjacent rolling elements on a proximal side with reference to the motion center.

The invention defined in a eighth aspect is a separator for a linear guide according to the sixth aspect, wherein, in relation to a width of the separator main body at an end face substantially parallel to a direct-acting surface of the rolling element in a change direction section where the direction of movement of the rolling element is changed around a predetermined motion center, a width "a" of the separator main body located on a distal side with reference to the motion center is greater than a width "b" located on a proximal side with reference to the motion center.

If the separator is configured in the manner as described in the seventh and eighth aspects, the capability of the separator main body to retain rollers is enhanced. Hence, occurrence of skew can be effectively inhibited, and occurrence of dislodgment of the rollers can also be effectively prevented. Particularly, as a result of improvement in the function of retaining rollers in the change direction section, when the separators are adopted for a linear guide, dislodgment of the rollers can be prevented even when a slider unit has been removed from a rail. Hence, ease of maintenance and assembly can be enhanced.

An invention defined in a ninth aspect is a separator for linear guide according to any one of the sixth to eighth aspects, wherein, when the arm sections are configured so as to extend to substantially identical lengths from the center on both sides of the separator main body toward rotational centers of adjacent rolling elements in a moving direction, when a length of the arm section located on one side is taken as L; a diameter of the rolling element is taken as Dwe; a distance between centers of adjacent rolling elements is taken as κDwe; a radius from the motion center to a locus of movement of rotational centers of the rolling elements at the change direction section is taken as R; and a radius from the motion center to an envelope surface, which is located at a position closer to the motion center than to an imaginary line interconnecting the centers of the adjacent rolling elements and defined by the arm sections (a height of the arm section in a direction orthogonal to a raceway surface of the rolling element is taken as A), is taken as Ri, the arm sections are formed into a contour such that a length Li of the arm section on one side (i.e., the length of one inner arm section), the arm section being located at a position closer to the motion center than to the imaginary line interconnecting the centers of the adjacent rolling elements and a length Lo of the arm section on the other side (the length of an outer arm section), the arm section being located at an opposite side to the motion center with reference to the imaginary line interconnecting the centers of the adjacent rolling elements satisfies the following equations: $\theta = \sin^{-1}\{\kappa Dwe/(2R)\}$, $0.3/2 \times Dwe \leq A \leq (R-Ri)$, $Li < (\kappa Dwe/2 - A \sin \theta)$, $Lo < \kappa Dwe/2$.

An invention defined in a tenth aspect is a separator for linear guide according to any one of the sixth to eighth aspect, wherein, when the arm sections a reconfigured to extend, on the respective sides of the separator, from the center of the separator main body toward the rotational centers of the adjacent rolling elements to different lengths with respect to the moving direction, the maximum length Ls of a total sum of lengths of the arm sections extending on the respective sides of the separator with respect to the moving direction is smaller than the distance κDwe between the rotational centers of adjacent rolling elements.

If the separator is configured in the same manner as described in ninth and tenth aspect, the arm sections of the adjacent separators can be set to a length at which the separators do not contact each other, over the entire circulation path of the rollers. Therefore, smooth operation of the rollers and separators can be implemented without fail.

An invention defined in a eleventh aspect is a separator for linear guide according to any one of sixth to tenth aspects, wherein the contact surfaces provided on both sides of the separator main body with respect to the moving direction come into contact with adjacent rolling elements at a position, where a dimension between recessed contact surfaces of the recessed surface section is minimized.

By means of such a configuration, even when swelling has arisen, the influence on the dimension between recessed contact surfaces can be minimized. Hence, there can be effectively inhibited the risk of dislodgment of rollers from separators, which would otherwise be caused by an increase in the clearance of the train of rollers with separators sandwiched therebetween.

An invention defined in a twelfth aspect is characterized in that a separator for linear guide according to any one of sixth to eleventh aspects, wherein a recessed lubricant reservoir is formed in the contact surfaces of the recessed surface section. By means of such a configuration, smooth operation of the roller and that of separators can be achieved, and suppression of abrasion of the rollers and the separators and, by extension, generation of operating sound or the like can be inhibited as well.

A linear guide according to an invention may be characterized by comprising, between rollers acing as rolling elements, the separator for a linear guide defined in any one of the first to twelfth aspects.

By means of such a configuration, there can be provided a linear guide which effectively prevents a drop in load capacity and occurrence of skew and achieves enhanced operability with a simple configuration.

A linear guide according to an invention may be characterized by being configured to guide the arm section. In this way, if the arm sections are guided, occurrence of skew in rollers can be more effectively inhibited, which in turn enables more smooth operation of rollers and separators.

An apparatus (a processing device of any of various types) according to an invention may be characterized by comprising the linear guide according to the above aspects.

By means of such a configuration, there can be provided a linear guide which effectively prevents a drop in load capacity and occurrence of skew and achieves enhanced operability with a simple configuration.

In order to solve the problems, a thirteenth aspect of the present invention is a separator for use in a linear guide according to the first aspect, wherein the guide rail has a roller guide surface, the slider has a load roller guide surface, a pair of change direction paths and a roller return passage, the load roller guide surface opposing the roller guide surface constitutes a roller track along with the roller guide surface, the pair of change direction paths remaining in communication with both ends of the roller track, and the roller return passage remaining in communication with the pair of change direction paths; and an endless circulation path is constituted of the roller track, the pair of change direction paths, and the roller return passage, the linear guide has guide grooves in the endless circulation path, the grooves continuous in a direction in which the rolling elements are arranged, the pair of arm sections are guided by the guide groove; and lubricant reservoir sections which are opened in respective the recessed surface section, the openings of the lubricant reservoir sections being made smaller than an outer dimension of the arm section, thereby preventing fitting of the arm section into the lubricant reservoir section.

A fourteenth aspect of the present invention is a separator for use in a linear guide according to the thirteenth aspect, wherein the maximum dimension of the opening section is smaller than the maximum dimension of the arm section within a cross section orthogonal to a longitudinal direction of the arm section.

An invention may be characterized by a linear guide characterized by using the separator for use in a linear guide defined in the thirteenth or fourteenth aspect.

If the separators of the invention are used for a linear guide, the sides of each roller can be sandwiched between and retained by recessed surfaces of the adjacent separators. Further, the positions of the rollers can be aligned by means of the arm sections formed on the separators. Therefore, if the separators of the present invention are used for the linear guide, axial fluctuations (skew) in and interference between?? the rolling elements are lessened, thereby enabling more stable circulation of the rolling elements.

The lubricant reservoir section which is to open in the roller contact surface is formed. Therefore, if the separators of the present invention are used for the linear guide, the rolling elements can be rolled more smoothly, and early abrasion of the rolling elements and generation of noise can be inhibited.

Moreover, according to the invention of the thirteenth aspect, the opening section of the lubricant reservoir section is made smaller than the outer shape of the arm section, thereby constituting the separators. According to the invention of the fourteenth aspect, the maximum dimension of the opening section is made smaller than the maximum dimension of the arm section within a cross section orthogonal to the longitudinal direction of the arm section. As a result, fitting of the arm section into the lubricant reservoir section can be prevented. For instance, even when having been automatically aligned by, e.g., a parts feeder or the like, the separators can be prevented from becoming entangled. Therefore, there can be provided a separator for a linear guide which facilitates automation of production and can improve productivity of the linear guide. There may be provided a linear guide which yields the advantages yielded by the separator for a linear guide defined in the thirteenth or fourteenth aspect.

The phrase "fitting of the arm section into the lubricant reservoir section" used herein means that an arm section of one separator among a plurality of separators fits into a lubricant reservoir section of another separator, whereby these separators become caught in each other.

Further, the word "outer dimension of the arm section" means any dimension which contributes to "fitting of the arm section into the lubricant reservoir section." For instance, if a cross section of the arm section orthogonal to the longitudinal direction is a mere rectangle, a dimension which contributes to fitting corresponds to the lengths of four sides and a diagonal length of the rectangle. If the cross section is circular, the dimension corresponds to a diameter of the circle. If the cross section has another composite geometry, the dimension corresponds to sizes of respective sections of a shape projected in a direction in which the arm section contributes to fitting.

According to the separators for a linear guide of the present invention, there can be provided a separator for use with a linear guide capable of improving productivity of a linear guide, as well as a linear guide.

To achieve the object, a fifteenth aspect of the present invention is a linear motion apparatus having: a guide rail including a rolling surface; a slider including a rolling surface opposing to the rolling surface of the guide rail and guided by the guide rail by way of a plurality of rolling elements interposed between the rolling surfaces so as to move relatively each other; and a separator interposed between the adjacent rolling elements and including recessed surface sections being formed in portions of each of said spacers opposing said rolling elements, wherein a contact position between the recessed surface section of the separator and the rolling element is set within a range of contact angle of 19° to 35°.

A sixteenth aspect of the present invention is a separator for use in a linear motion apparatus having: a guide rail including a rolling surface; a slider including a rolling surface opposing to the rolling surface of the guide rail and guided by the guide rail by way of a plurality of rolling elements interposed between the rolling surfaces so as to move relatively each other; and a separator interposed between the adjacent rolling elements and including recessed surface sections being formed in portions of each of said spacers opposing said rolling elements wherein a cross section of the recessed surface section is formed into the shape of a Gothic arch; the diameter of the rolling element is taken as Dw; a contact angle between the separator and the rolling element is taken as $\theta$; the radius of a Gothic arch groove of the recessed surface section is taken as R; the bottom thickness of the groove of the recessed surface of the separator is taken as $2\delta$; and the curvature radius of the recessed surface section is taken as "f", the separator assumes the contact angle $\theta$ which satisfies the following equations (1) to (3)

$$0.5Dw \cdot \sin\theta \tan\theta = \delta + R(\cos\theta_o - \cos\theta) \quad (1)$$

$$\theta_o = \sin^{-1}[\{(2f-1)/(2f)\}\sin\theta] \quad (2)$$

$$f = R/Dw \quad (3).$$

A seventeenth aspect of the present invention is a linear motion apparatus having: a guide rail including a rolling surface; a slider including a rolling surface opposing to the rolling surface of the guide rail and guided by the guide rail by way of a plurality of rolling elements interposed between the rolling surfaces so as to move relatively each other; and a separator interposed between the adjacent rolling elements and including recessed surface sections being formed in portions of each of said spacers opposing said rolling elements, wherein a cross section of the recessed surface section is formed into the shape of a single circular arc; the diameter of the rolling element is taken as Dw; a contact angle between the separator and the rolling element is taken as $\theta$; the radius of a circular arc groove of the recessed surface section is taken as R; the bottom thickness of the groove of the recessed surface of the separator is taken as $2\delta$; and the curvature radius of the recessed surface section is taken as "f", the separator assumes the contact angle $\theta$ which satisfies the following equations (4) and (5)

$$0.5Dw \cdot \sin\theta \tan\theta = \delta + R(1-\cos\theta) \quad (4)$$

$$f = R/Dw \quad (5).$$

A eighteenth aspect of the present invention is a separator for use in a linear guide according to the seventeenth aspect, wherein the range of the contact position between the recessed surface section of the separator and the rolling element is set within a range of ±10°.

A linear guide comprising the separator defined in any one of the first to eighteenth aspects may be employed.

According to the invention, in consideration of the radial length of the swelling in a separator induced by oil and fat or the like of lubricant and the thickness of the swelling in the separator in a thicknesswise direction (i.e., the radial thickness of the swelling) (the radial swelling leads to a decrease in the pitch between the rolling elements, and a thicknesswise swelling leads to an increase in the pitch between the rolling elements), a recessed section of the separator is brought into contact with a rolling element at a contact angle at which a change in the separator in the thicknesswise direction thereof becomes small, thereby minimizing the chance of a dimensional change in the separator due to swelling inducing a change in the pitch between the rolling elements. As a result, variations in the pitch between the rolling elements due to the influence of swelling stemming from oil and fat or the like of lubricant are suppressed, thereby readily realizing a further improvement in operability, a low noise characteristic, and durability at low cost.

BRIEF DESCRIPTION OF THE DRAWINGS

FIG. 30 is an enlarged descriptive view of the separators (for a linear guide) of the present invention, wherein

FIG. 42 is a view showing that separators are interposed between adjacent cylindrical rollers, wherein

DETEILED DESCRIPTION OF THE PREFERRED EMBODIMENTS

An embodiment of the present invention will be described hereinbelow by reference to the drawings.

Figure 1:
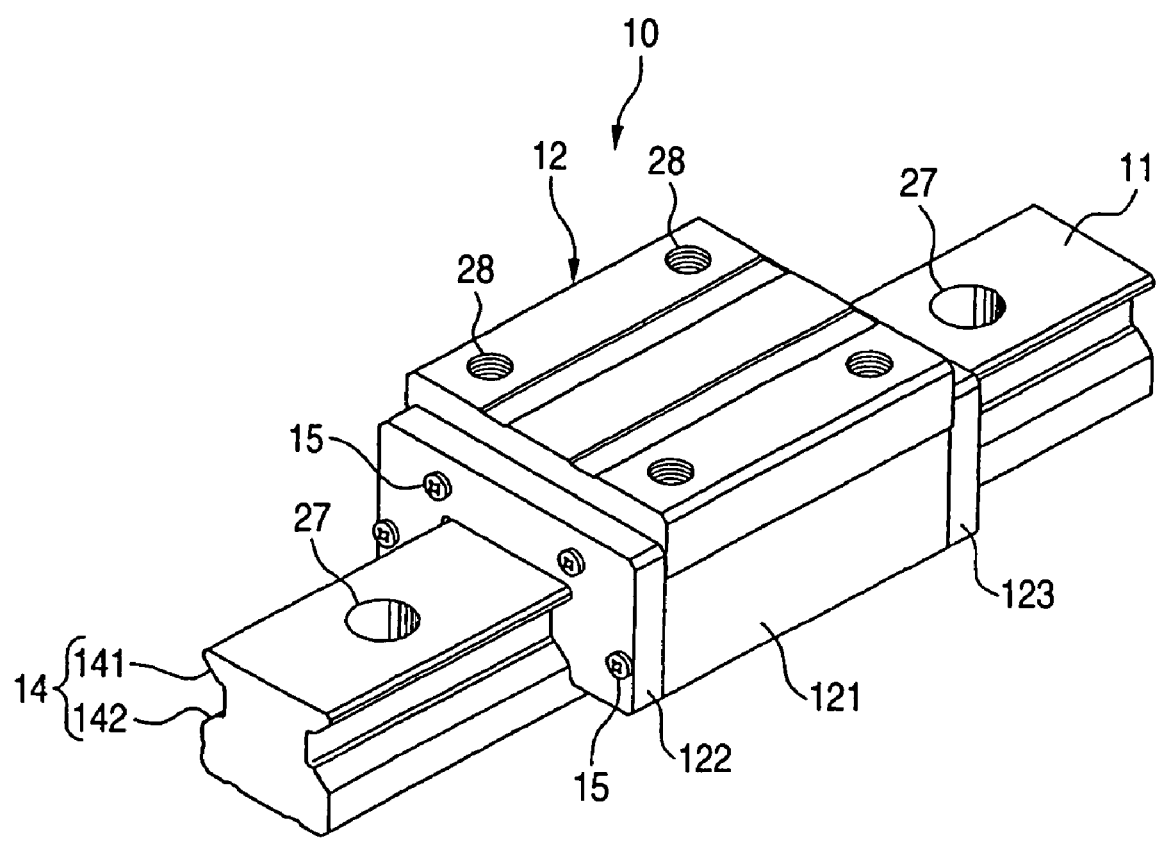
FIG. 1 is a perspective view of a linear guide.

FIGS. 1 through 8 show an embodiment of the present invention. FIG. 1 is a perspective view of a linear guide. As illustrated, a linear guide 10 comprises a guide rail 11; a slider 12 disposed on the guide rail 11 in a movable manner; and a plurality of rolling elements 13 incorporated into the slider 12. (see FIGS. 2 and 3). A recessed raceway track 14 is formed in both right and left side surfaces of the guide rail 11 across a longitudinal direction thereof.

As shown in FIG. 1, the raceway track 14 comprises raceway surfaces 141, 142. Of the raceway surfaces 141, 142, the raceway surface 141, which is located at a higher position in the drawing, is formed at an angle exceeding 90° (e.g., 135°) with respect to the side surface of the guide rail 11. Further, the raceway surface 142, which is located at a lower position in the drawing, is formed at an angle exceeding 90° (e.g., 120°) with respect to the side surface of the guide rail 11 in a direction opposite the raceway surface 141.

The slider 12 comprises a slider main body 121; and end caps 122, 123 attached to respective ends of the slider main body 12 in the front and rear directions thereof through use of a plurality of lock screws. The slider main body 121 has a lower surface 121a (see FIG. 2) opposing an upper surface of the guide rail 11. A rolling element retaining member 30 is attached to the lower surface 121a of the slider main body 121. The slider main body 121 has right and left inner side surfaces opposing side surfaces of the guide rail 11. Rolling element retaining members 31 and 32 (see FIG. 2) are attached to each of the inner side surfaces of the slider main body 121. A protruding raceway track 16 is formed on each inner side surface along the longitudinal direction of the guide rail 11.

Figure 2:
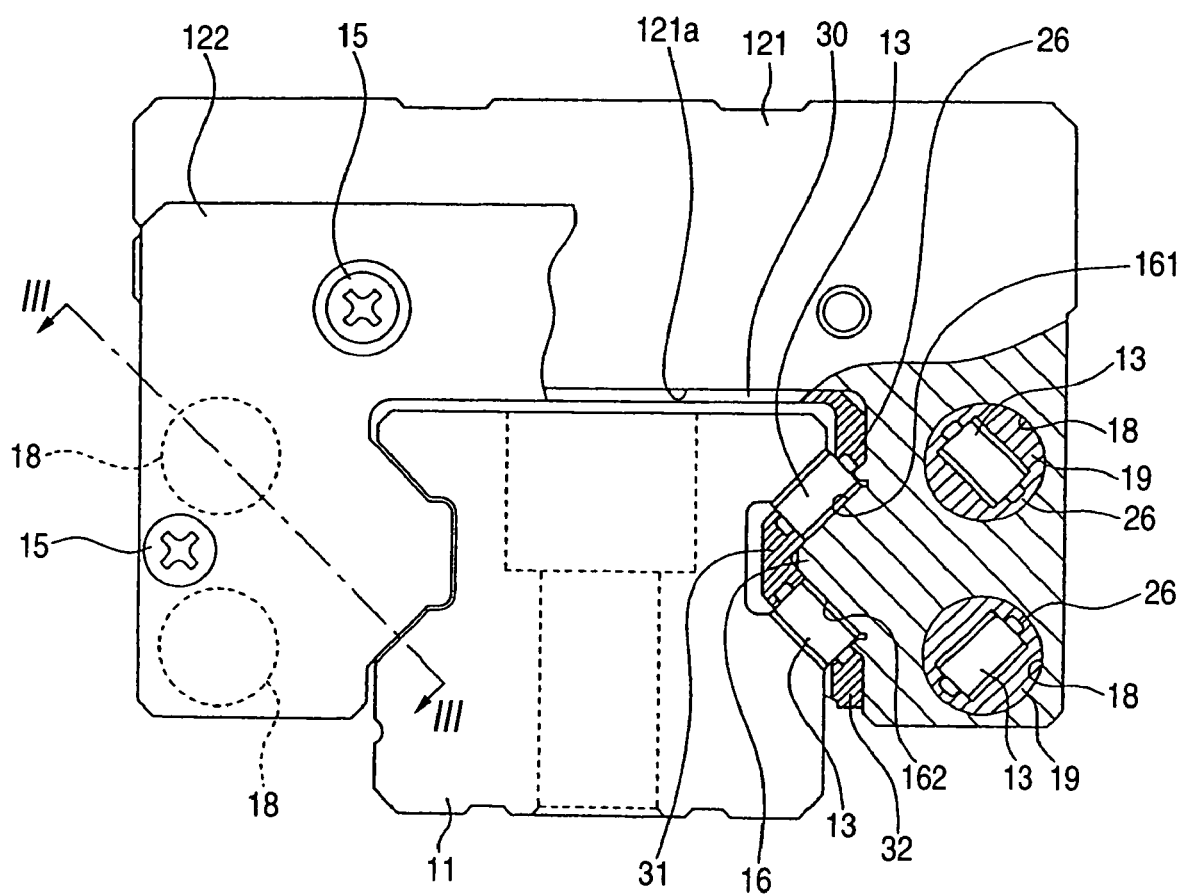
FIG. 2 is a partial cutaway front view of the linear guide shown in FIG. 1.

The raceway track 16 has raceway surfaces 161, 162 (see FIG. 2). Of the raceway surfaces 161, 162, the raceway surface 161, which is located at an upper position, is formed at an angle exceeding 90° (e.g., 135°) with respect to the inner side surface of the slider main body 121. Further, the raceway surface 162, which is located at a lower position in the drawing, is formed at an angle exceeding 90° (e.g., 135°) with respect to the inner side surface of the slider main body 121 in a direction opposite the raceway surface 161. The raceway surfaces 161, 162 oppose the raceway surfaces 141, 142 of the raceway track 14. A rolling element raceway 17 (see FIG. 3) to be used for rolling the rolling elements 13 in the longitudinal direction of the guide rail 11 is formed between the raceway surfaces 141 and 161 and between the raceway surfaces 142 and 162.

Figure 3:
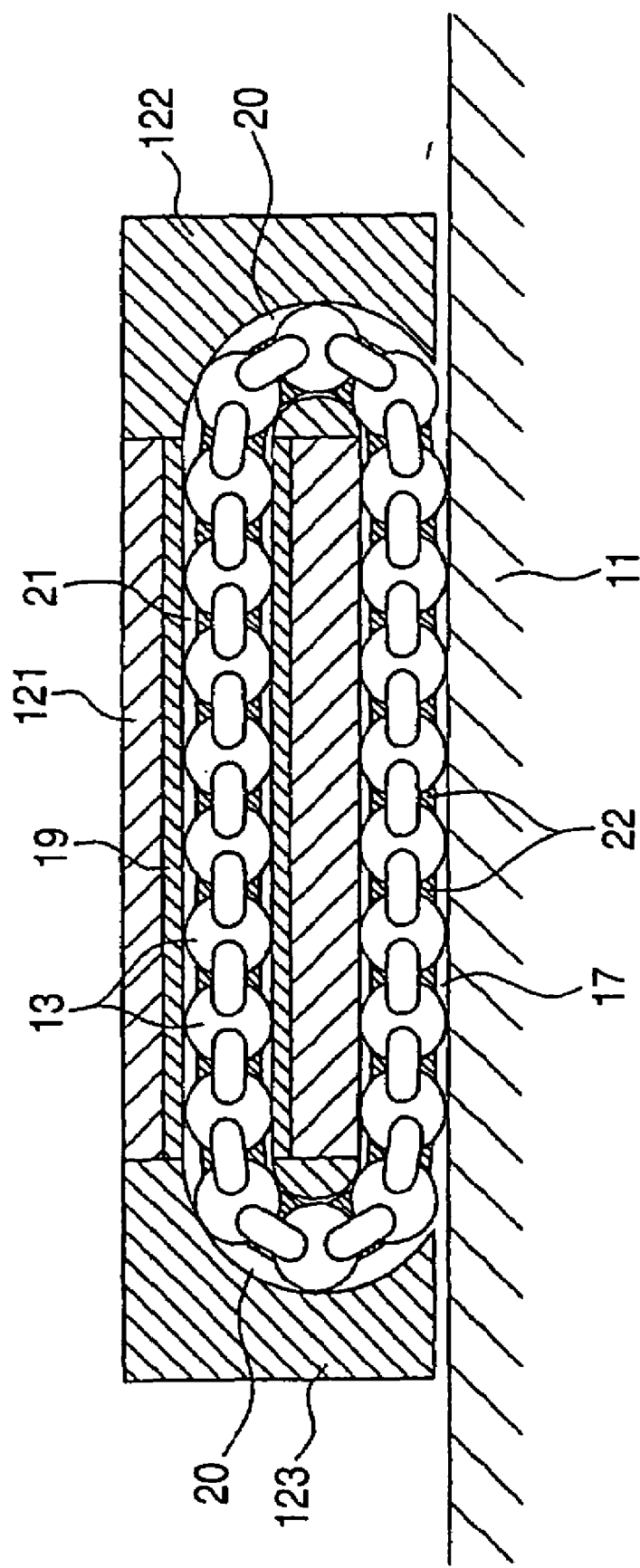
FIG. 3 is a cross-sectional view taken along II—II shown in FIG. 2.

The slider main body 121 has four through holes 18 penetrating through the slider main body 121 in the longitudinal direction of the guide rail 11 (see FIG. 2). Rolling element circulation members 19 are fitted into the respective through holes 18. The rolling element circulation members 19 are formed by forming, e.g., resin material, into a columnar shape. As shown in FIG. 3, a rolling element return path 21—which establishes the rolling element change direction path in conjunction with a rolling element change direction path 20 formed in the end caps 122, 123—is formed in each of the center sections of the respective rolling element circulation members 19.

When the slider 12 moves in the longitudinal direction of the guide rail 11, the rolling elements 13 roll through the rolling element raceway 17 and further through the rolling element change direction path 20 and the rolling element return path 21. Further, the rolling elements 13 are formed into the shape of a cylindrical roller. The rolling elements 13 that roll between the raceways 141, 161 are retained by the rolling element retaining members 30, 31. The rolling elements 13 that roll between the raceways 142, 162 are retained by the rolling element retaining members 31, 32. Further, the respective rolling elements 13 are formed from metal, ceramics, or the like. Further, separators 22 (see FIG. 3) formed from material softer than the material of the rolling elements (e.g., resin or the like) are interposed between the roller-shaped rolling elements 13.

Figure 4:
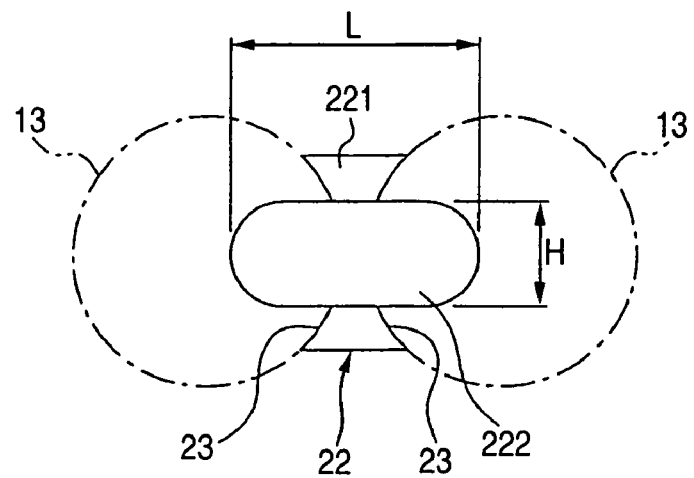
FIG. 4 is a side view of the separator shown in FIG. 3.
Figure 5:
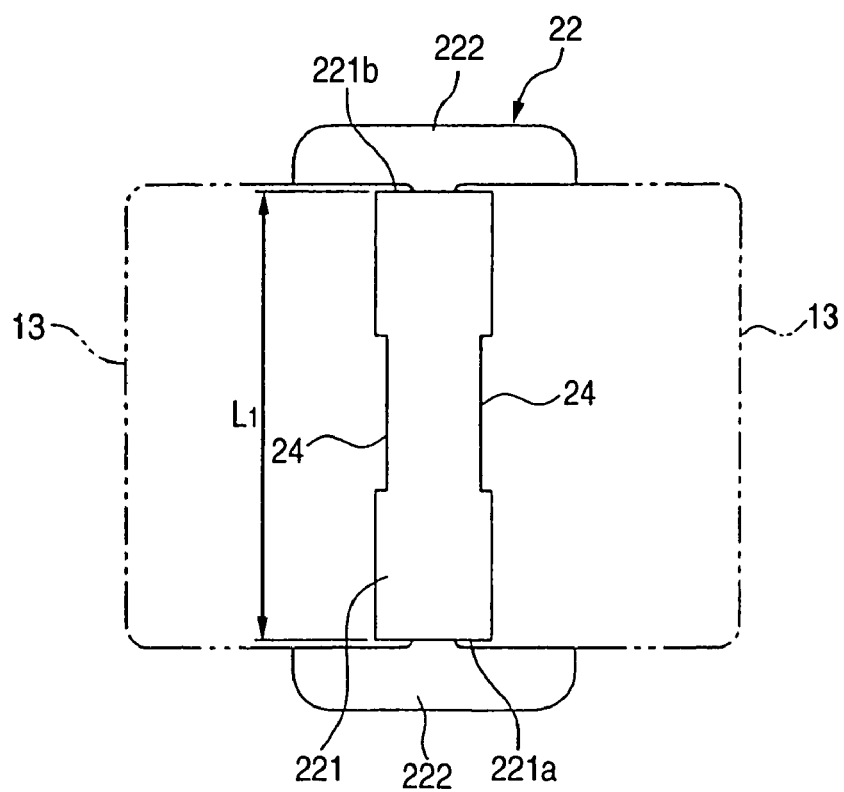
FIG. 5 is a plan view of the separator shown in FIG. 3.
Figure 6:
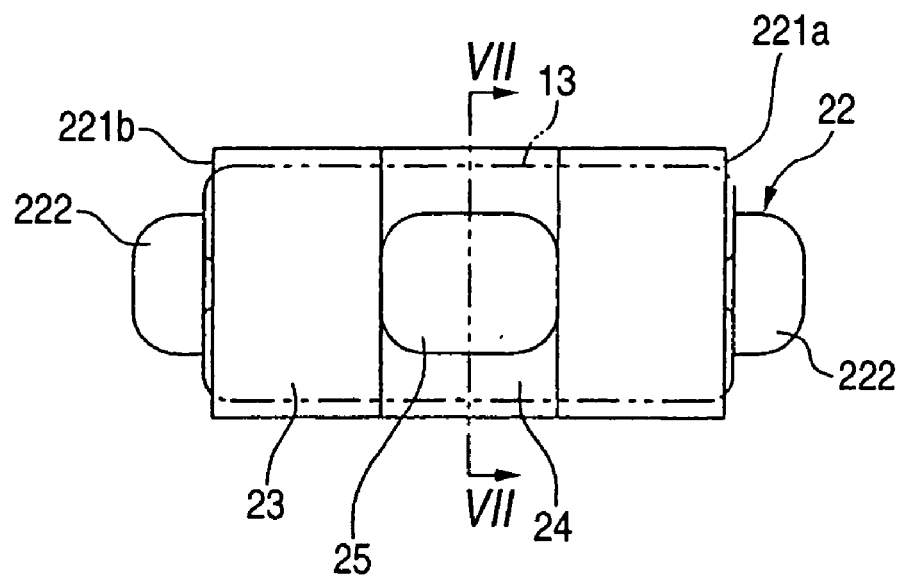
FIG. 6 is a front view of the separator shown in FIG. 3.
Figure 7:
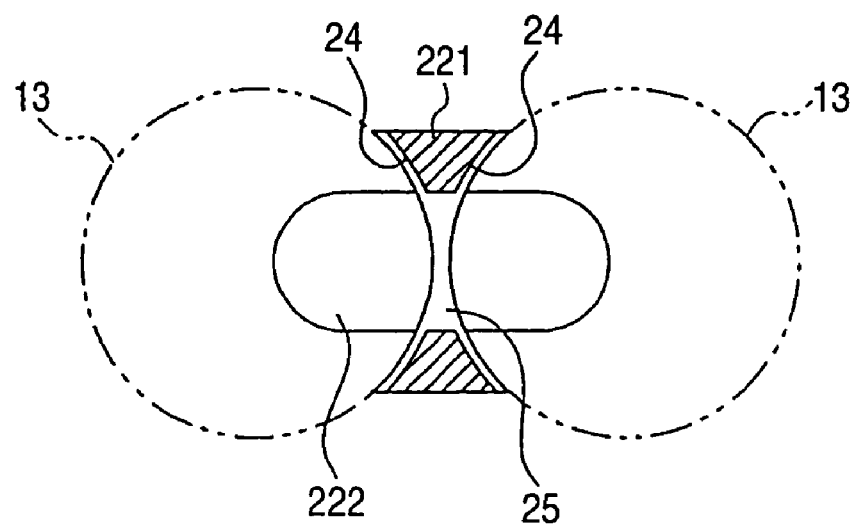
FIG. 7 is a longitudinal cross-sectional view taken along line VII—VII shown in FIG. 6.
Figure 8:
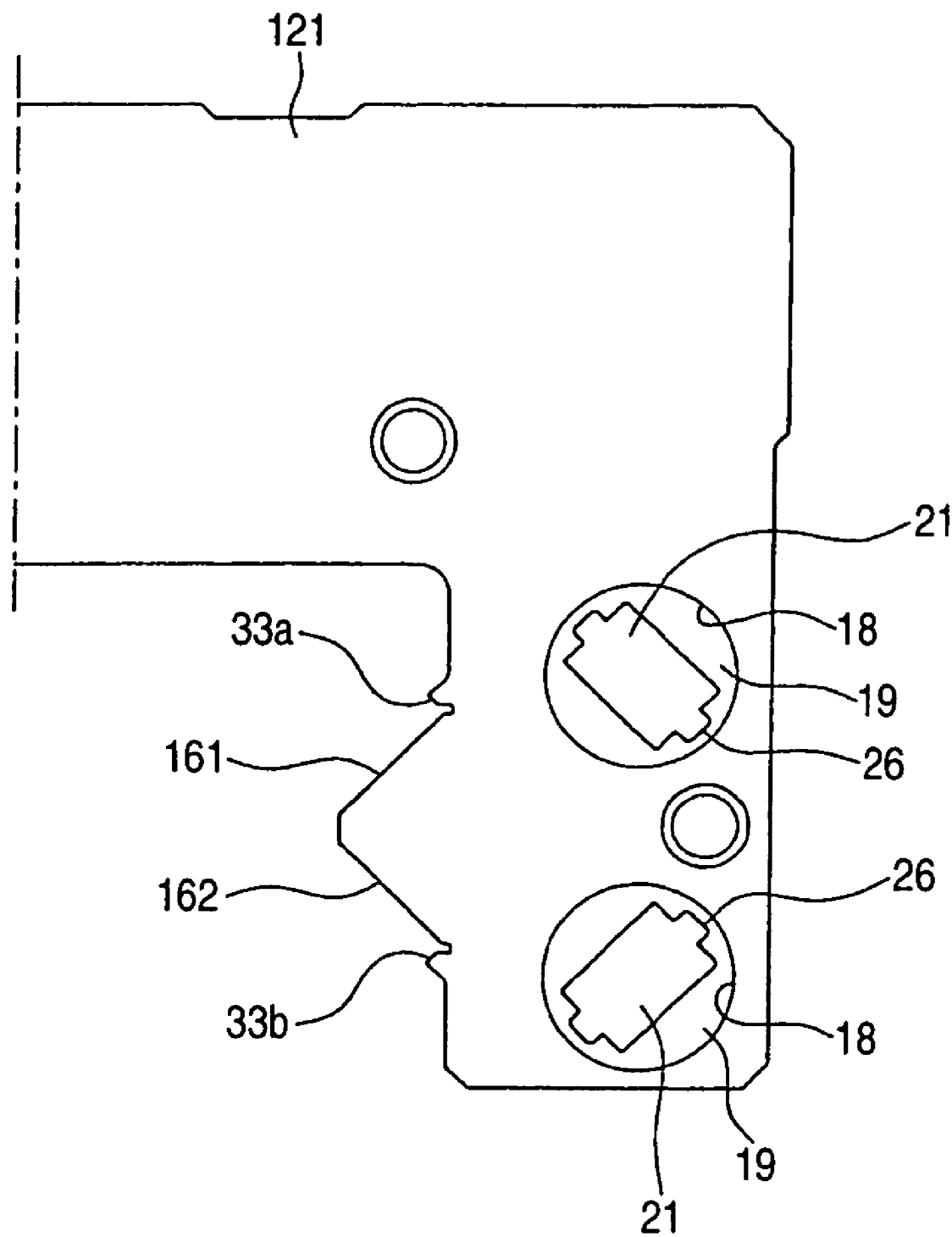
FIG. 8 is a view showing separator guide surfaces formed on an inner side surface of a slider main body.

As shown in FIGS. 4 through 6, the separator 22 comprises a separator main body 221 and a pair of arm sections 222, 222 provided on respective sides of the separator main body 221. A separator guide groove 26 (see FIG. 2) for guiding the arm sections 222 of the separators 22 in the rolling direction of the rolling elements 13 is formed in the rolling element change direction path 20, in the rolling element return path 21, and in the rolling element retaining members 30 to 32.

The arm sections 222, 222 are formed integrally with the separator 22 such that both ends of the arm sections 222, 222 are projected in the longitudinal direction of the separator 22. As shown in FIG. 4, the length L of the arm sections 222, 222 is shorter than a distance between the centers of the two adjacent rolling elements 13, 13 with the separator main body 221 sandwiched therebetween. Preferably, the length L is set to about 50% to 98% the diameter of the rolling element. The height H of the arm sections 222, 222 (see FIG. 4) is about 20% to 60% the diameter of the rolling element.

A lateral length $L_1$ of the separator main body 221 (see FIG. 5) is slightly shorter than the axial length of the rolling element 13. As a result, of the two arm sections 222, 222, at least one arm section is arranged to contact an axial end face of the rolling element 13. The separator main body 221 has recessed surface sections 23, 23 provided on respective sides of the separator main body 221 with respect to the front and rear directions thereof, the recessed surface sections 23, 23 coming into contact with the circumferential section of the rolling element 13. A clearance groove 24 having a width of about one-third the axial length of the rolling element 13 is formed in the center of each recessed surface section 23 along a circumferential direction of the rolling element 13. A through hole 25 is also formed in the center of each recessed surface section 23 so as to penetrate through the recessed surface section 23 in the front and rear direction of the separator 22.

The separator main body 221 has two side surface sections 221a, 221b (see FIGS. 5 and 6) in the lateral direction thereof. Of the side surface sections 221a, 221b, one side surface section is adjacent to the raceway surface 161 and remains in contact with a separator guide surface 33a (see FIG. 8) formed on the inner side surface of the slider main body 121 or is adjacent to the raceway 162 and remains in contact with a separator guide surface 33b. The separator guide surfaces 33a, 33b are ground integrally, concurrently with the raceways 161, 162 and by means of an unillustrated grindstone. Either right or left side surface sections of the rolling elements 13 remain in contact with the separator guide surfaces 33a and 33b. A plurality of bolt through holes 27 (see FIG. 1) are formed at substantially constant intervals in the upper surface of the guide rail 11 in the drawing with respect to the longitudinal direction of the guide rail 11. Screw holes 28 for use in mounting a slider are formed in a plurality of areas on the upper surface of the slider main body 121 in the drawing.

As mentioned above, there is prevented occurrence of a clearance between the rolling elements 13 and the separator main body 221 and an eventual decrease in the number of rolling elements to be disposed in the load zone, which has arisen in the linear guide disclosed by JP-B-40-24405 as a result of the length L between the arm sections 222 of the separator 22 being made shorter than the distance between the centers of the two adjacent rolling elements 13, 13. Hence, occurrence of contact between the rolling elements and skew can be inhibited without involvement of a decrease in load capacity. Moreover, there is also prevented occurrence of an offset of rotational resistance of the separators 22 to the rolling elements 13, which has arisen in the linear guide disclosed by JP-A-2001-132745. Hence, an effect of inhibiting occurrence of skew can be sufficiently yielded.

As a result of the height H of the arm section 222 being set to 20% to 60% the diameter of the rolling element 13, the separator main body 221 can be reinforced by the arm sections 222, and sufficient contact area can be ensured between the end face of the rolling element 12 and the raceway which contacts the end face.

Moreover, as a result of the clearance groove 24 being formed in the center of the recessed surface section 23 in the circumferential direction of the rolling element 13, the contact area existing between the rolling element 13 and the separator 22 is limited to the right and left sides of the separator 22. Therefore, the operability of the linear guide can be enhanced while occurrence of skew in the rolling elements 13 can be suppressed. Further, as a result of the through hole 25 being formed in the centers of the recessed surface sections 23 so as to penetrate through the recessed surface sections in the front and rear direction of the separator main body 221, lubricant can be stored in the through hole 25, and the lubricant stored in the through hole 25 can be stably supplied to the rolling elements 13. The separator guide surfaces 33a, 33b which contact the side surface sections of the rolling elements 12 are provided on the inner side surface of the slider main body 121. Therefore, the position of the separators 22 and that of the rolling elements 13 become stable, thereby preventing occurrence of skew in the rolling elements 13.

The present invention is not limited to the embodiment set forth. For instance, in the embodiment the length L between the arm sections 222 is made shorter than the distance between the centers of the two adjacent rolling elements 13, 13. However, the length L between the arm sections 222 may be made equal to the distance between the centers of the two adjacent rolling elements 13, 13. In the previously-described embodiment, the width of the clearance groove 24 is set to about one-third the axial length of the rolling element 13. However, the width is not limited to one-third or thereabouts. For instance, the width may be set to about one-fourth to half the width of the groove.

An embodiment of the present invention will now be described by reference to the accompanying drawings.

Figure 9:
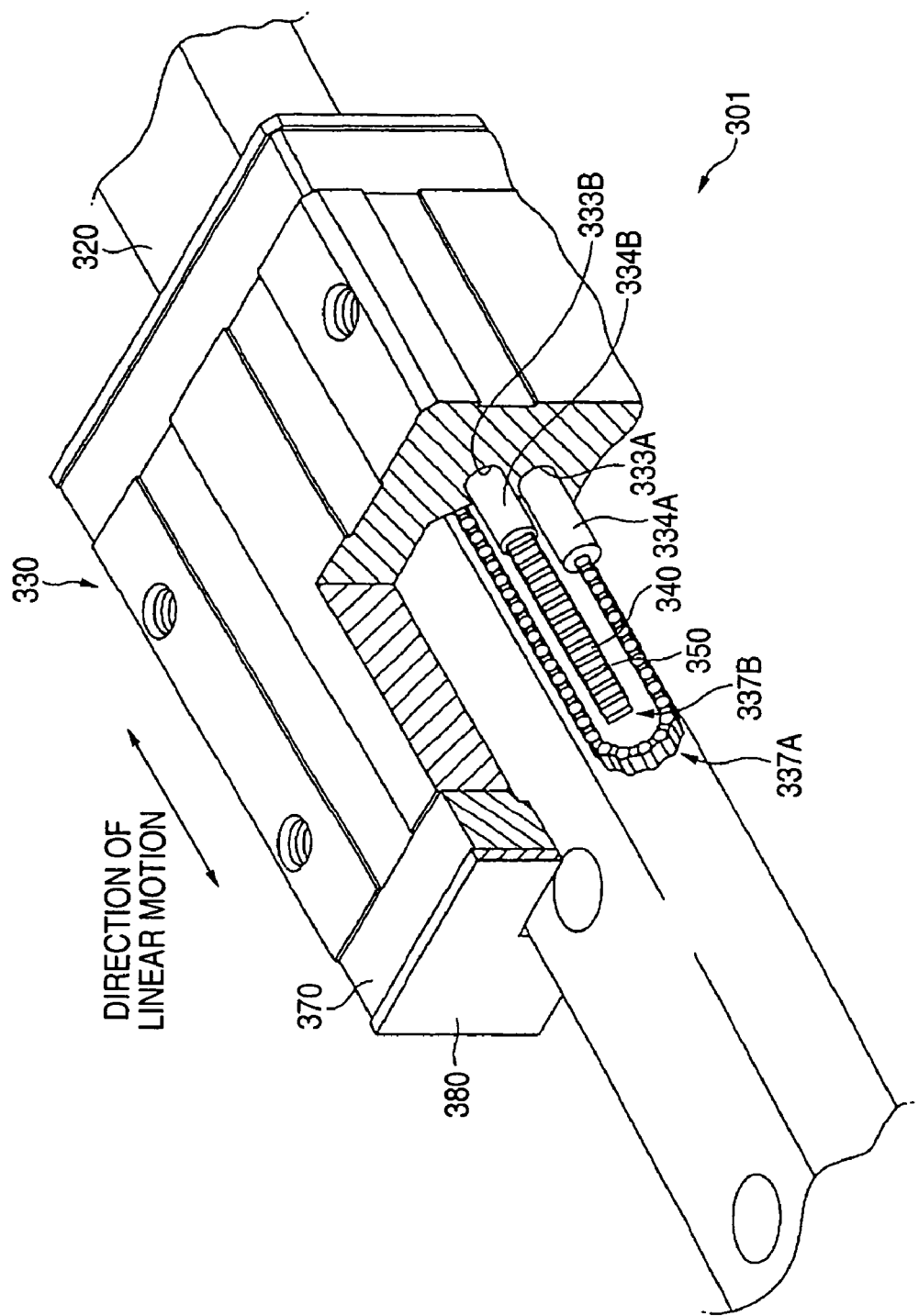
FIG. 9 is a perspective view (including a partial cross section) for describing a brief configuration of a linear guide (a linear guide) according to one embodiment of the present invention.

FIG. 9 schematically shows (includes a partial cross section of) the configuration of a linear guide (a linear guide) 301 according to a first embodiment of the present invention.

As shown in FIG. 9, in the linear guide 301 of the embodiment, a slider unit 330 is arranged so as to fit and straddle around a rail 320 in a linearly movable manner. Reference numeral 370 designates an end cap, and 380 designates a side seal.

Figure 10:
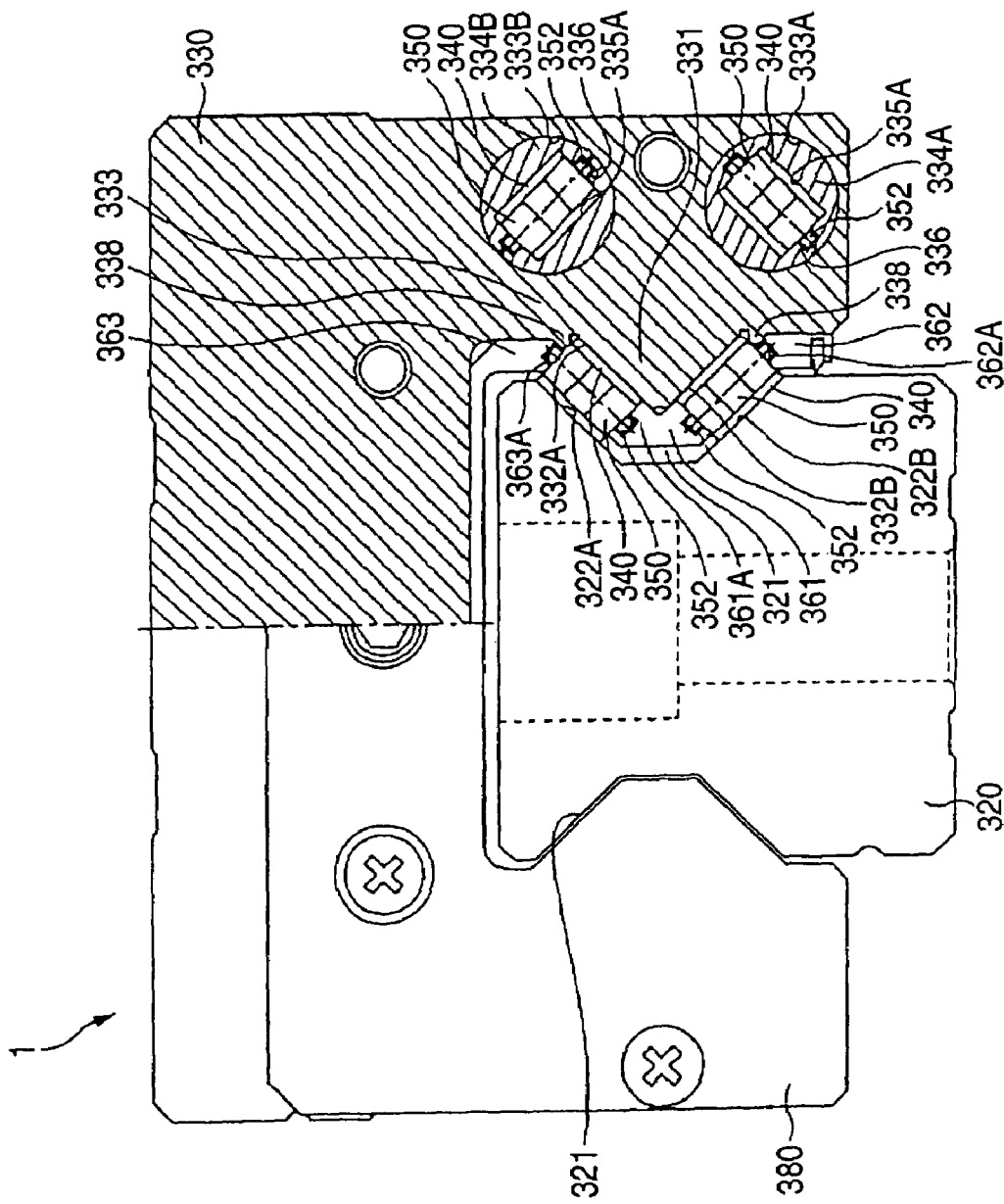
FIG. 10 is a view (including partial cross sections) of the linear guide of the embodiment when viewed in the direction of linear motion shown in FIG. 9.

FIG. 10 is a view (including partial cross sections) of the rail 320 and the slider unit 330 when viewed in the direction of linear motion shown in FIG. 9. As shown in FIG. 10, a raceway groove 321 is formed on either side of the rail 320. The raceway groove 321 is formed in both side surfaces of the rail 320 and in a recessed shape having a substantially V-shaped cross-sectional profile.

As shown in FIGS. 9 and 10, the slider unit 330 fitted around the rail 320, the rail extending in a direction orthogonal to the plane of FIG. 10, is provided with protruding sections 331 which oppose the raceway grooves 321 formed in the rail 320 and are formed into a protruding shape having an essential V-shaped cross-sectional profile.

The surface of the raceway groove 321 having an essentially V-shaped cross-sectional profile constitutes raceway surfaces 322A, 322B for rollers 340. The surface of the protruding section 331 which faces the raceway surfaces 322A, 322B and has an essentially V-shaped cross-sectional profile constitutes raceway surfaces 332A, 332B for the rollers 340. The raceway surfaces are preferably formed with high precision through grinding.

A plurality of the rollers 340, serving as columnar or cylindrical rolling elements, are interposed between the raceway surface 322A (or 322B) of the raceway groove 321 and the raceway surface 332A (or 332B) of the raceway section 331. Separators (partition elements) 350 are sandwiched between the rollers 340. FIG. 10 illustrates only the right portion of the rail 320 and that of the slider unit 330 with reference to the center of the rail 320. However, the left side of the rail 320 and that of the slider unit 330 with reference to the center of the rail 320 shown in FIG. 10 can be constructed in the same manner as are the right portions (i.e., in a manner axially-symmetrical about the center of the rail 320).

Here, the separators 350 interposed between the rollers 340 in the present embodiment will be described.

Figure 11:
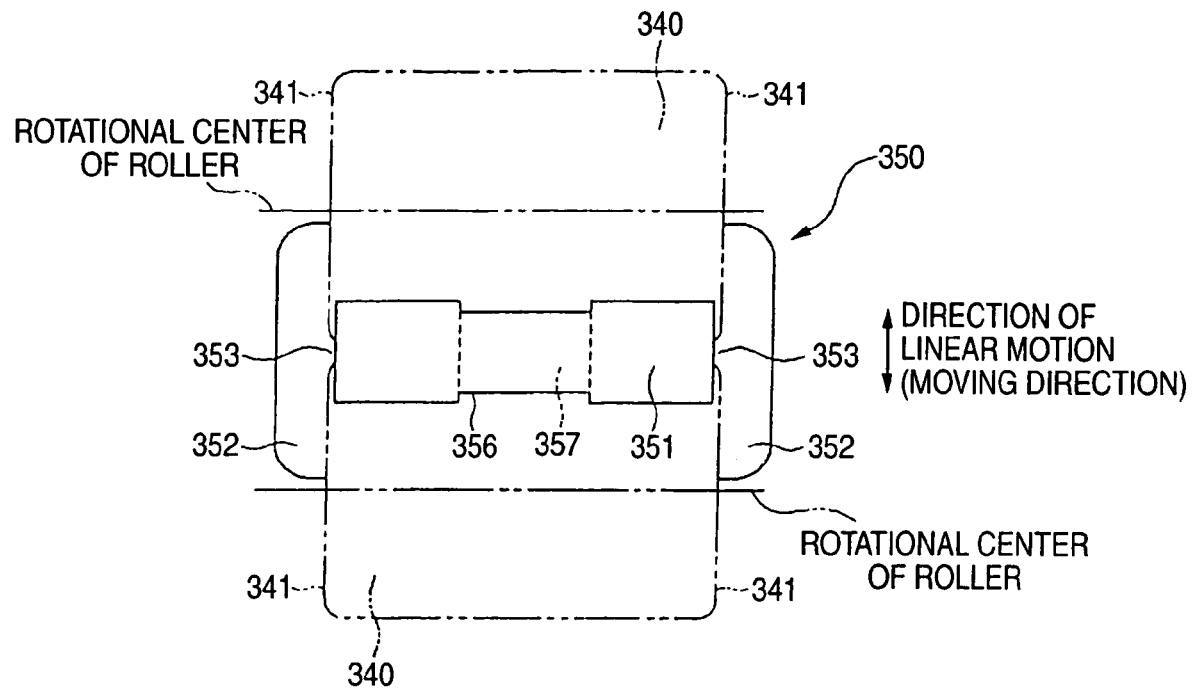
FIG. 11 is a view of rollers and separators of the embodiment when viewed in the direction orthogonal to a raceway surface.

As shown in FIG. 11, the separator 350 of the embodiment comprises a separator main body 351 interposed between the rollers 340; arm sections 352 for guiding end faces 341 of the rollers 340 disposed on the respective sides of the separator main body 351; and bridge sections 353 for bridging the separator main bodies 351 and the arm sections 352. The separators 350 can-be formed integrally from, e.g., resin.

Figure 12:
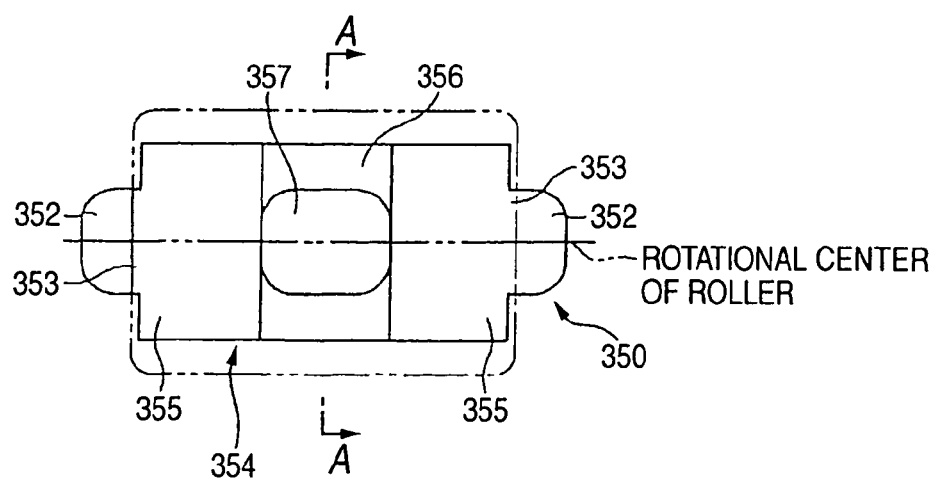
FIG. 12 is a view of the rollers and the separators, both being shown in FIG. 11, when viewed in the direction of linear motion.
Figure 13:
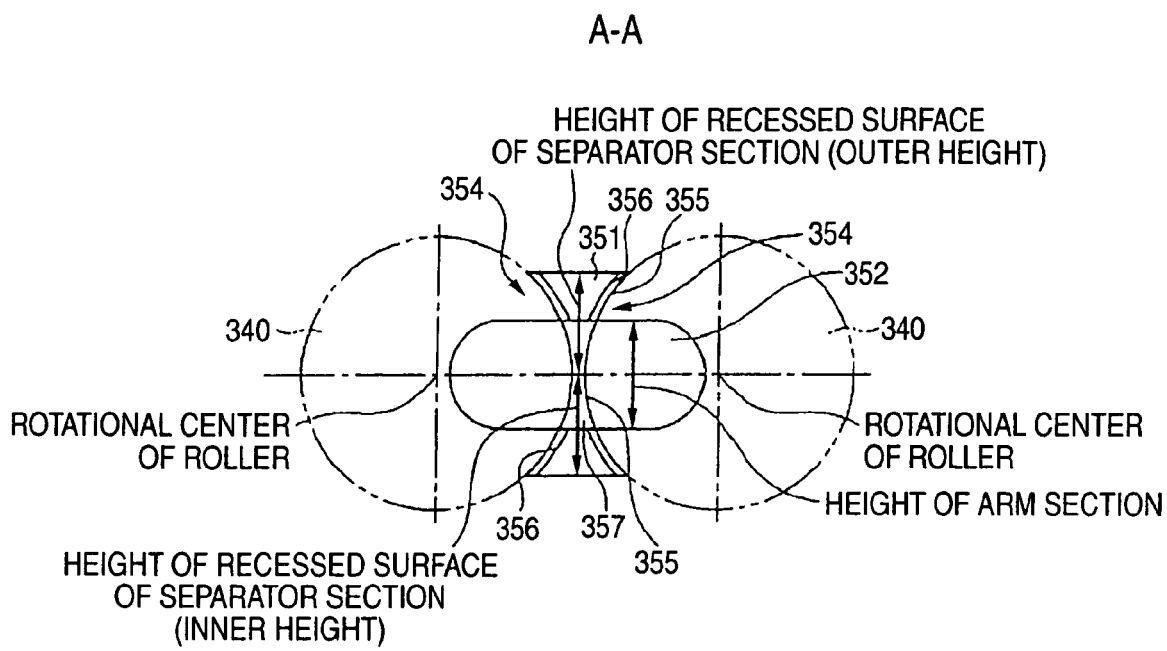
FIG. 13 is a cross-sectional view taken along line A—A shown in FIG. 12.
Figure 14:
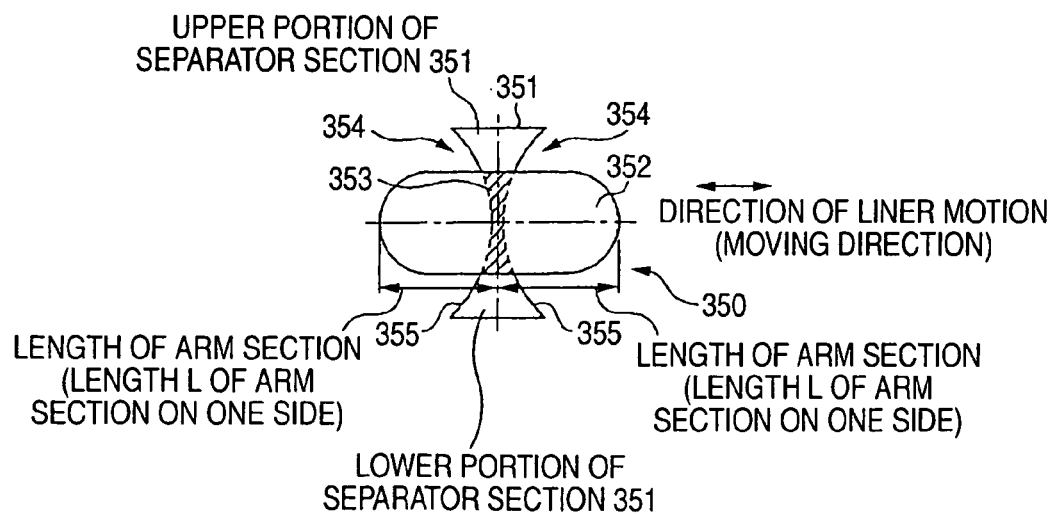
FIG. 14 is a view of the rollers and the separators, which are shown in FIG. 11, when viewed in the direction parallel to the shaft (axis) of the rollers.

As shown in FIGS. 12, 13, and 14, the separator main body 351 is configured such that recessed roller receiving sections 354 are provided on respective sides of the separator main body 351, each coming into contact with a portion of the cylindrical outer periphery of the roller 340 disposed on the respective side and receiving that portion. A recessed groove 356 and a through hole 357, which act as a lubricant reservoir, are formed in a surface 355 of the receiving section 54 which comes into contact with the roller 340. The present embodiment shows an example in which a single recessed groove 356 is provided. However, a plurality of recessed grooves 356 can be formed in accordance with a required lubricating characteristic. A plurality of through holes 357 can also be formed in the same manner. Moreover, either the recessed grooves 356 or the through holes 357 can be omitted according to the required lubricating characteristic. Alternatively, both the recessed grooves 356 and the through holes 357 can also be omitted.

The rollers 340—which are interposed between the raceway surfaces 322A and 332A and have passed through, while rolling, the slider unit 330 and, by extension, a load zone (see FIG. 15) where load acts on the rollers 340—and the separators 350 sandwiched between the rollers 340 are returned (circulated) to the space between the raceway surfaces 322A and 332A (i.e., the load zone) by way of a circulation path 333A (see FIGS. 9 and 10).

The rollers 340—which are interposed between the raceway surfaces 322B and 332B and have passed through the load zone in a rolling manner—and the separators 350 sandwiched between the rollers 340 are returned (circulated) to the space between the raceway surfaces 322B and 332B (i.e., the load zone) by way of a circulation path 333B (see FIGS. 9 and 10).

As shown in FIGS. 9 and 10, the circulation path 333A is provided with a circulation tube 334A for smoothly circulating the rollers 340 and the separators 350, which roll over the raceway surfaces 322A and 332A. The circulation path 333B is provided with a circulation tube 334B for smoothly circulating the rollers 340 and the separators 350, which roll over the raceway surfaces 322B and 332B. The circulation tubes 334A, 334B are provided with guide passages 335A, 335B for accommodating the rollers 340 and the separators 350 and enabling smooth circulation of the rollers 340 and the separators 350. Arm section guide grooves 336 for guiding the arm sections 352 of the separators 350 at the time of circulation of the rollers 340 and the separators 350 are opened in the respective circulation tubes 334A, 334B so as to face the guide passages 335A, 335B.

With a view toward achieving smooth circulating operation or in view of manufacturing costs, the circulation tubes 334A, 334B are preferably made of resin. Change direction sections 337A, 337A are provided at respective ends of the circulation path 333A in the direction of linear motion thereof. Change direction sections 337B, 337B are provided at respective ends of the circulation path 333B in the direction of linear motion thereof. In order to prevent occurrence of mutual interface between the change direction sections 337A, 337B, the circulation paths 333A, 333B are preferably arranged in a so-called chain pattern.

As shown in FIG. 10, the present embodiment is provided with end face guide members 361, 362, and 363 for guiding end faces 341 of the rollers 340 and the arm sections 352 of the separators 350. Thereby, occurrence of a skew of the roller 340 or the like, which would otherwise arise during rolling action, is effectively inhibited, thereby enabling smooth operation of the rollers 340.

The slider unit 330 of the present embodiment is provided with a roller end face guide section 338 for guiding end faces of the rollers 340. Thereby, occurrence of a skew or the like, which would otherwise arise during rolling of the roller, is effectively prevented, thereby enabling smooth rolling action of the rollers. The roller end face guide section 338 can be formed with high precision through grinding and can be ground concurrently with grinding of the rolling surfaces 332A, 332B.

The configuration and working-effect of the separator 350 of the present embodiment will now be described in detail.

As shown in FIGS. 11 through 14, each of the separators 350 of the embodiment is provided with the arm sections 352 which extend toward the rotational centers (shafts) of the adjacent rollers 340. The arm section 352 and the separator main body 351 are connected together by way of the bridge section 53. Hence, the strength of the roller contact section of the separator main body 351 can be enhanced. Specifically, if the distance between the rollers is shortened in order to enhance the load capacity by means of increasing the number of rollers disposed within the load zone, the roller contact section of the separator main body 351 will become thin in the moving direction (i.e., the direction of linear motion). Resultantly, the separator main body 351 will become weakened. However, as shown in FIG. 14, a joint between an upper portion of the separator main body 351 and a lower portion of the separator main body 351 is enhanced by means of the bridge section 353 located between the arm section 352 and the separator 351, thereby reinforcing the separator main body 351. For this reason, the distance between the rollers can be shortened while desired strength is ensured. Therefore, even when the separators 350 are sandwiched between the rollers, a decrease in the number of rollers located within the load zone and a drop in load capacity can be minimized.

The arm sections 352 are guided by arm section guide grooves 361A, 362A, and 363A formed in the respective end face guide members 361, 362, and 363. Therefore, a chance of the roller 340 becoming dislodged from the separator main body 351 or occurrence of a skew can be minimized. As mentioned previously, as a result of the separator main bodies 351 being reinforced by the bridge sections 353, the depth Depth of the recessed surface of the separator main body 351 (i.e. the amount of a roller accommodated; and see FIG. 17) can be increased. Such an increase in the depth as well enables effective inhibition of a chance of dislodgment of the roller 340 or occurrence of a skew.

As such, in the present embodiment, the retaining characteristic of the rollers is promoted, and hence occurrence of a phenomenon of pattering of the rollers 340, which would otherwise arise at the entrance of the load zone where load is exerted on the rollers 340, is suppressed. Eventually, impact sound caused as a result of the rollers 340 having collided with the end cap 370 is diminished, thereby enabling provision of a tranquil linear guide and, by extension, an apparatus using this linear guide.

As shown in FIG. 13, the "height of the arm section 352" is preferably set to 30% or more the diameter of the roller, in view of the previously-described reinforcement role. Meanwhile, in order to smoothly guide the rollers 340 while ensuring a contact area between the end face 341 of the roller 340 and the end face guide members 361, 362, and 363 for guiding the roller end face 341, the height of the arm section 352 is preferably set to 50% or less the diameter of the roller 340. Specifically, the "height of the arm section" in the direction orthogonal to the raceway surface is preferably set to 30% to 50% the diameter of the roller.

There will now be described the "length of the arm section" (see FIG. 14) in the moving direction of the arm section 352.

The "length of the arm section" in the moving direction of the arm section 352 is set to a length which prevents the arm sections 352 of the adjacent separator main bodies 351 from contacting each other, over the entire circulation path. This is required so as to enable smooth operation of the rollers 340 and the separators 350 and, by extension, smooth linear motion of the slider unit 330.

Figure 15:
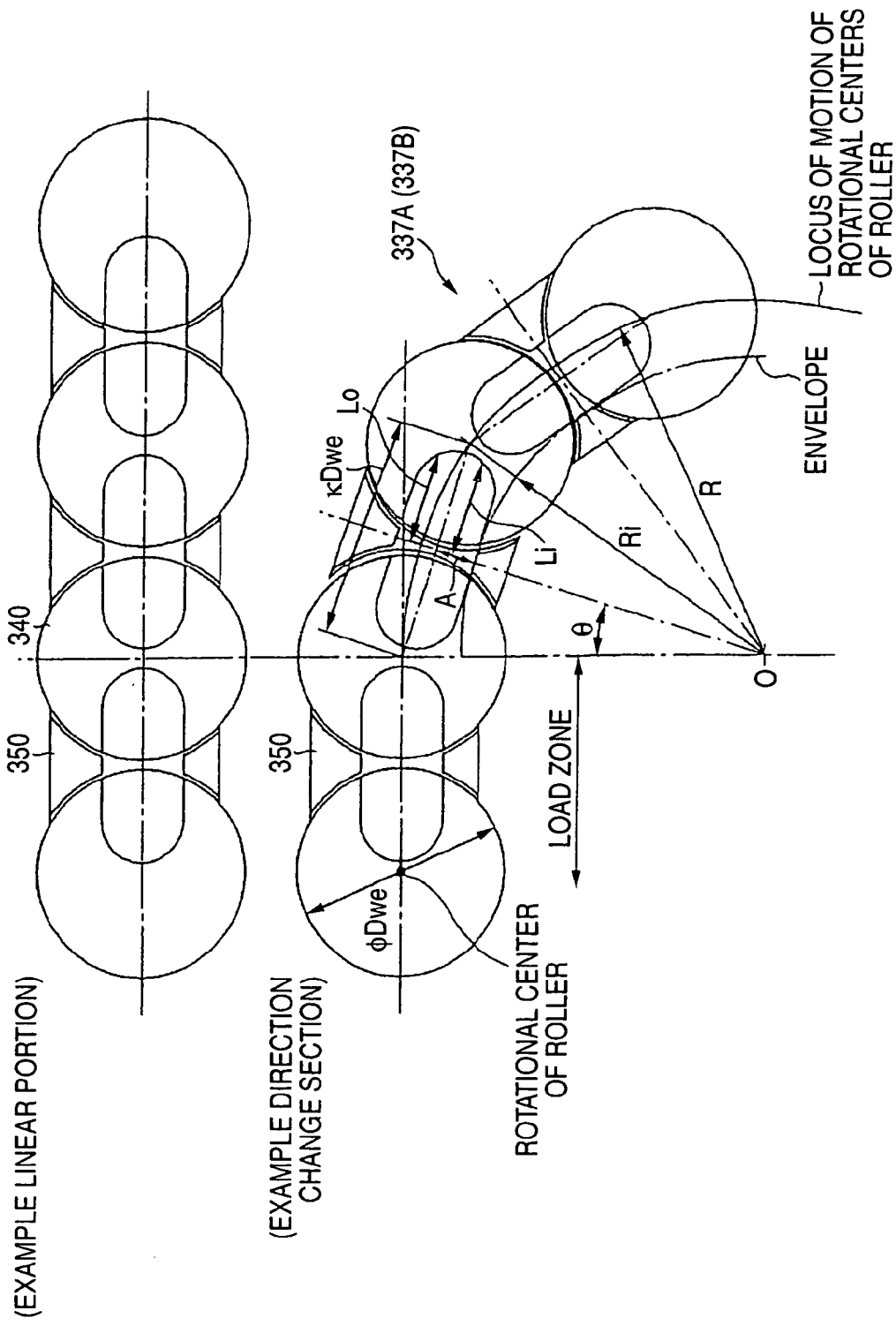
FIG. 15 is a view for describing the length of "arm section" determined in the embodiment.

Therefore, in relation to the length L (see FIG. 14) of the arm section 352 located on one side of the separator 350, the arm sections 352 of the separator 350 extending, on both sides with respect to the moving direction, toward the rotational center of the roller 340 to the same lengths, it is assumed, as shown in FIG. 15, that the diameter of the roller is taken as Dwe; a distance between the centers of adjacent rollers with the separator 350 being sandwiched therebetween is taken as $\kappa$Dwe; a radius from the motion center O to the locus of movement of rotational centers of the rollers in the roller change direction section (337A or 337B) is taken as R; and a radius from the motion center O to an envelope surface—which is located at a position closer to the motion center O than to an imaginary line interconnecting the centers of the adjacent rollers and defined by the arm sections 352 (having a height A)—is taken as Ri. At this time, a length Li of the arm section 352 on one side (i.e., the length of one inner arm section), the arm section being located at a position closer to the motion center O than to the imaginary line interconnecting the centers of the adjacent rollers (i.e., the length of the inner arm section), and a length Lo of the arm section 352 on the other side (the length of an outer arm section), the arm section being located at an opposite side to the motion center O with reference to the imaginary line interconnecting the centers of the adjacent rollers, must satisfy the following equations.

$$\theta = \sin^{-1}\{\kappa Dwe/(2R)\}$$

$$0.3/2 \times Dwe \leq A \leq (R-Ri)$$

$$Li < (\kappa Dwe/2 - A \sin \theta)$$

$$Lo < \kappa Dwe/2.$$

Specifically, if a contour of the arm section 352 which satisfies Li and Lo in the above equations is achieved by means of chamfering, an R shape, or an oval shape, occurrence of a contact between the arm sections 352 over the entire circulation path can be avoided.

As requirements approach Li=$\kappa$Dwe/2-A sin $\theta$ and Lo=$\kappa$Dwe/2, the most efficient accommodating shape can be obtained.

Figure 16:
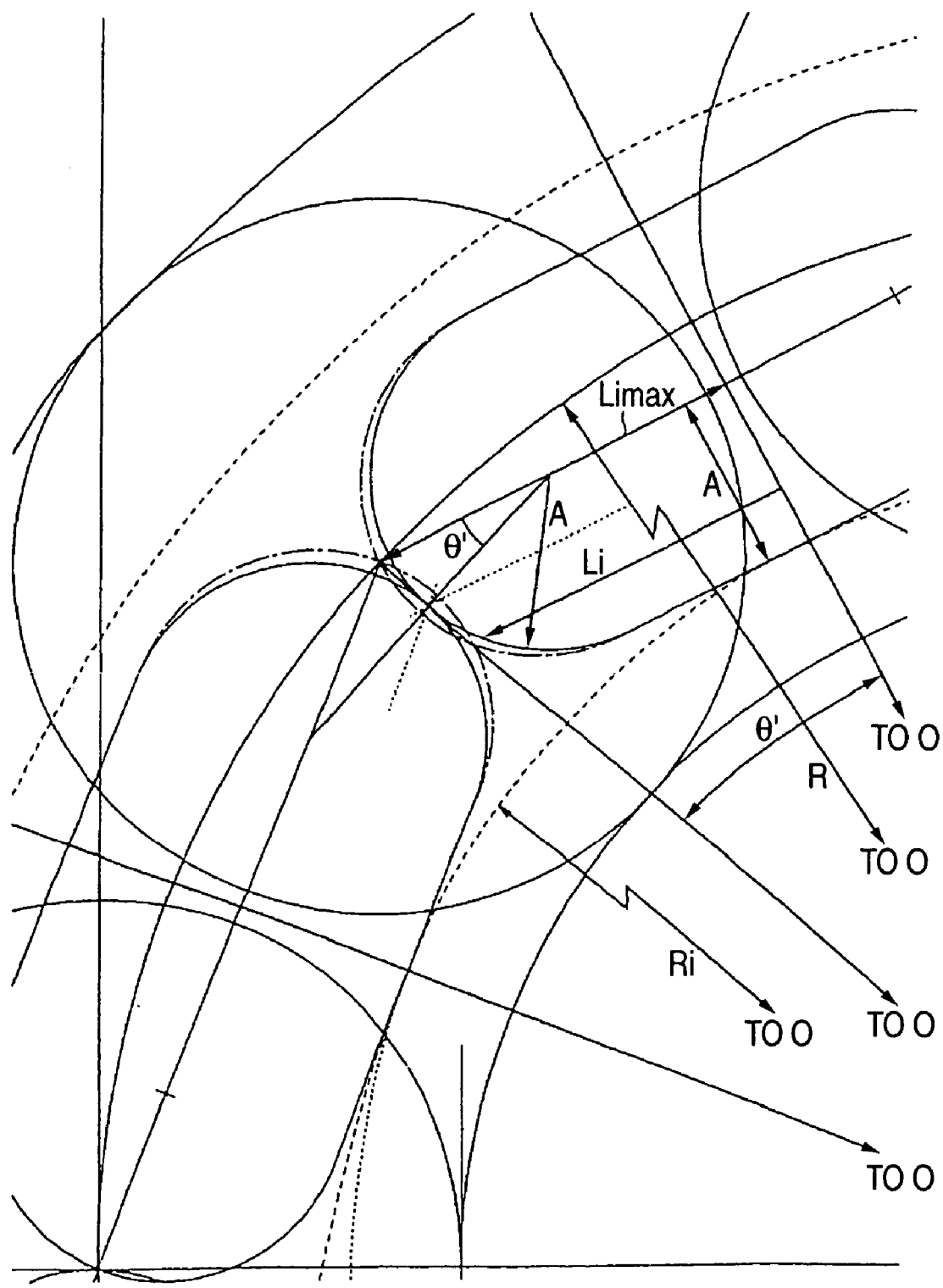
FIG. 16 is a view for describing the length of "arm section" determined in the embodiment.

As shown in FIG. 16, in a case where the end section of the arm section 352 in the moving direction thereof is formed into the shape of a single circular arc (i.e., the radius of the single circular arc is taken as A), if the maximum length Limax of the length Li of the arm section 352 on one side. (i.e., the length of the inner arm section) located at a position closer to the motion center O than to the imaginary line interconnecting the centers of the adjacent rollers is set to κDwe/2, the arm section 352 will interrupt the adjacent arm section 352 (see a dashed line in FIG. 16). Here, κDwe/2 designates a distance between the centers of adjacent rollers with the separator 350 being sandwiched therebetween.

In order to avoid occurrence of interruption, it is assumed that the radius from the motion center O to the locus of movement of the rotational centers of the rollers at the direction change section (337A or 337B) is taken as R and that a radius from the motion center O to an envelope surface—which is located at a position closer to the motion center O than to the imaginary line interconnecting the centers of the adjacent rollers and defined by the arm sections 352 (having the height A)—is taken as Ri. At this time, the maximum value Limax of the length Li of the inner arm section is required to be defined by the following equations.

$$\theta' = \sin^{-1}(\kappa Dwe/2R)$$

$$Li\ \max = \kappa Dwe/2 - A \times (1 - \cos\theta')/\cos\theta'$$

When the arm sections 352 of the separator 350 are configured to extend toward the rotational centers of the adjacent roller 340 to different lengths with respect to the direction of linear motion, the maximum length Ls; that is, a total sum of lengths of the arm sections extending on the respective sides of the separator, is required to become smaller than the distance κDwe between the rotational centers of adjacent rollers located on the respective sides of the separator 350.

By reference to FIGS. 17 and 18, there will now be described "clearance (gap)" which arises when a train consisting of the plurality of rollers 340 and the separators 350 is displaced toward one side with respect to the moving direction.

Figure 17:
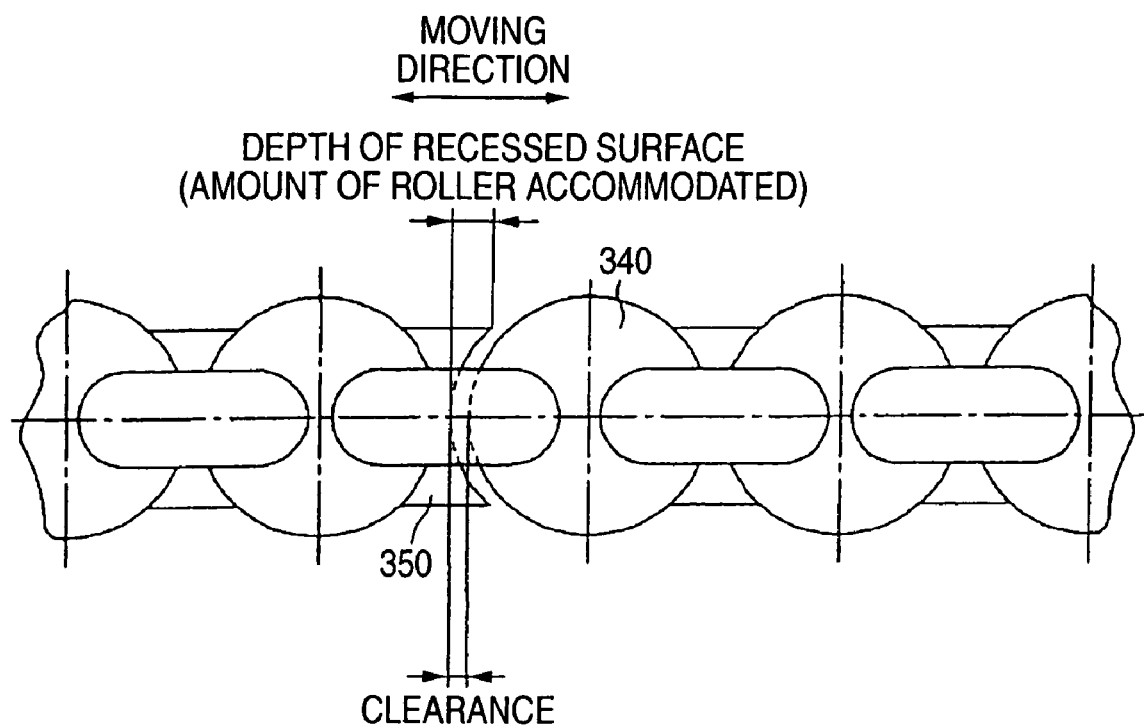
FIG. 17 is a view for describing a train of rollers of the embodiment.

The "clearance"—which develops when the train consisting of the plurality of rollers 340 and the separators 350 is displaced toward one side with respect to the moving direction, as shown in FIG. 17—cannot be eliminated in order to maintain smooth operation by means of absorbing fluctuations which will arise in the length of the train of rollers when the rollers change their directions at the change direction section (337A or 337B).

In contrast, if the "clearance" is made larger than necessary, the capability of the arm section 352 to guide or retain the rollers 340 will become deteriorated, and the function of preventing dislodgment of rollers and occurrence of a skew 5 or the like may be deteriorated.

Figure 18:
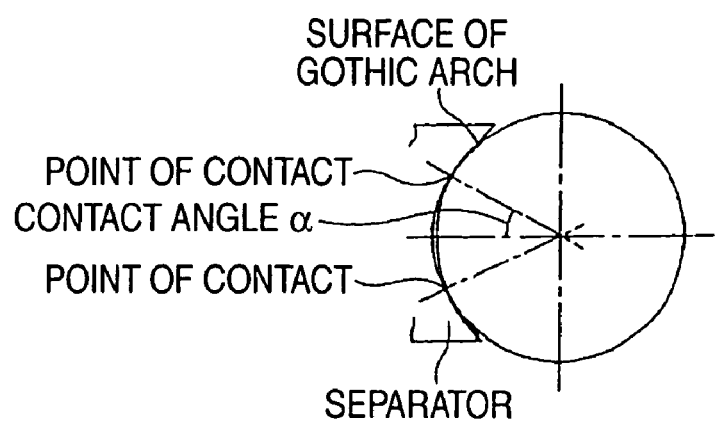
FIG. 18 is a view for describing a contact angle defined between the "separators" and the "rollers" according to the embodiment.

Hence, depending on the contact angle α defined between the roller 340 and the recessed surface 355 which is provided on either side of the separator main body 351 and comes into contact with and houses the adjacent roller 340, in view of an improvement in the function of accommodating a roller, the "clearance"—which arises when the train of rollers has become offset to one side with respect to the moving direction—is preferably set to one-half or less of the depth Depth of the recessed surface when α=0 (degree) (i.e., when the recessed surface is formed into the shape of a groove consisting of a single circular arc, and only a single contact point exists), or the clearance is preferably set to one-half or less of the product of the depth Depth of the recessed surface and cos α when the recessed surface is formed into the shape of a Gothic arch, as shown in FIG. 18 and two contact points exist.

By reference to FIGS. 19 and 20, the height of the recessed surface of the separator 350 (see FIG. 13 or the like) will now be described.

Figure 19:
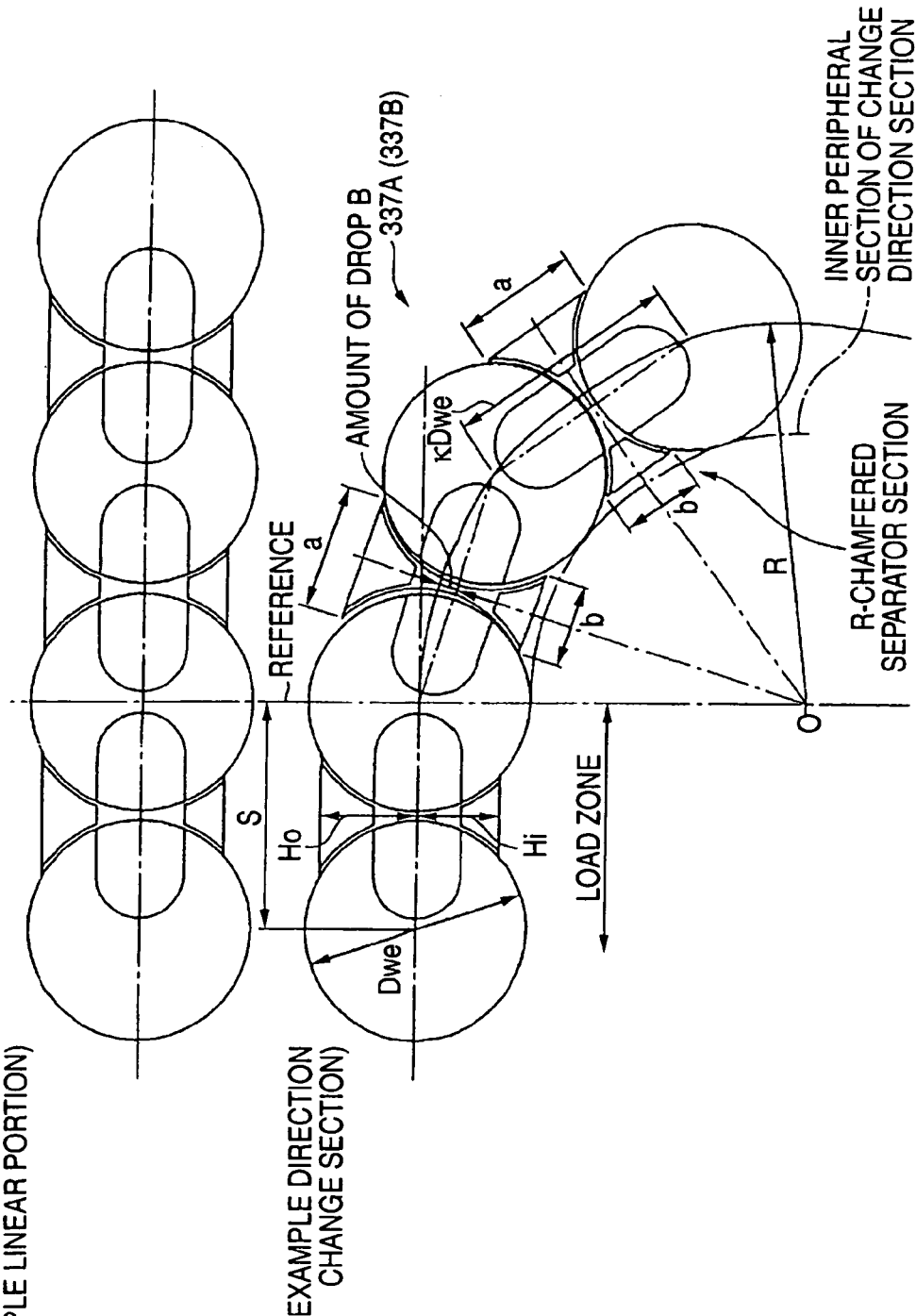
FIG. 19 is a view for describing the height of a "recessed surface" determined in the embodiment.
Figure 20:
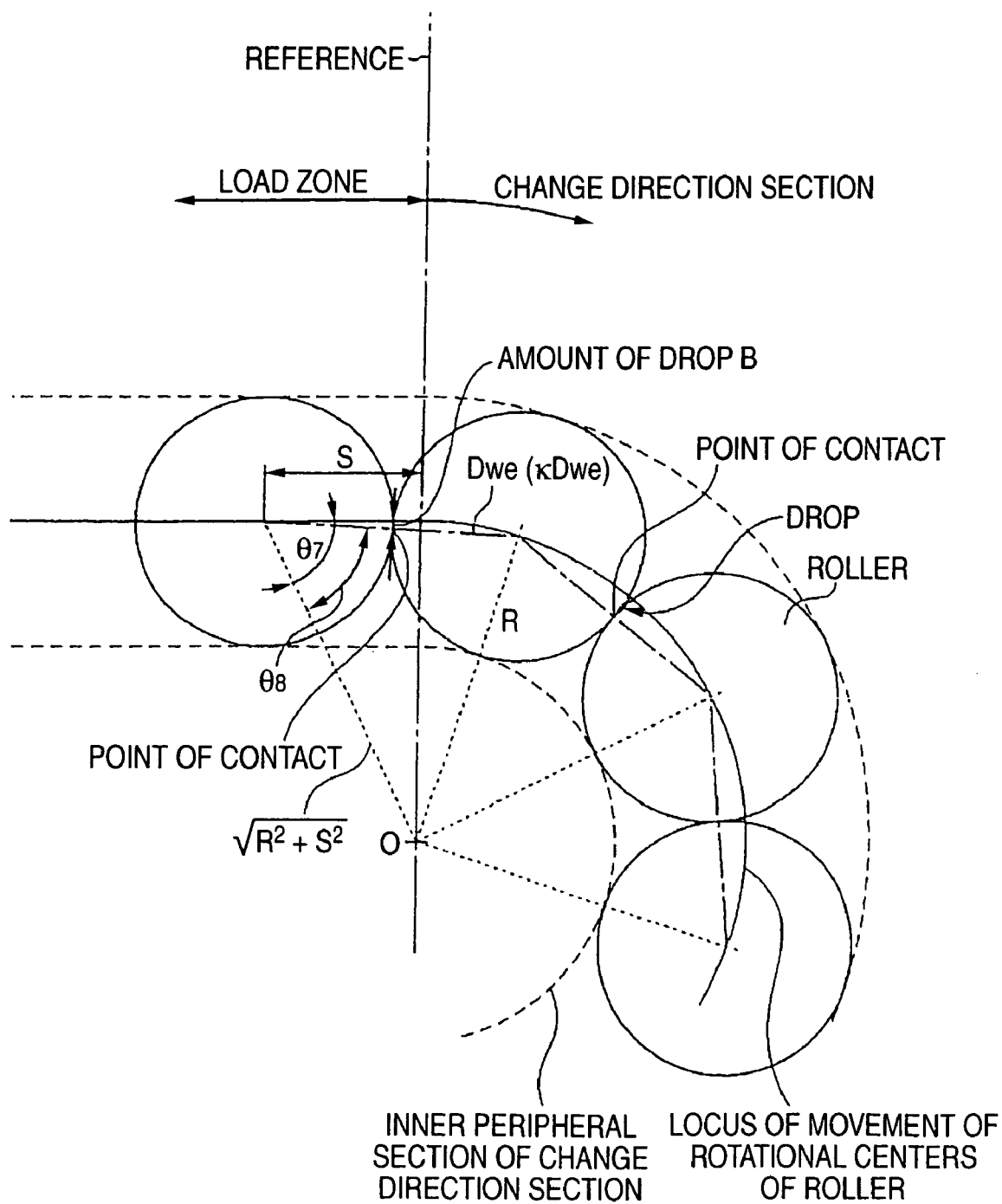
FIG. 20 is a view for describing the amount of "drop"

As shown in FIG. 20, when the separators 350 are not interposed between the rollers 340, a phenomenon of a contact point arising between the rollers falling toward the motion center O (see the amount of "drop B" shown in FIG. 20) with respect to the locus of motion of the rotational centers arises at the change direction section (337A, 337B). When the separators 350 are interposed between the rollers 340, such a phenomenon arises as a drop of the separator 350 as shown in FIG. 19. A drop in the separator 350 causes the separator 350 to come into contact with an inner peripheral section of the change direction section at the change direction section (337A, 337B).

In the present embodiment, in relation to the height of the recessed surface from the imaginary line interconnecting the rotational centers of the adjacent rollers to the end face of the separator 350, the height Ho of the recessed surface from the imaginary line interconnecting the rotational centers of the adjacent rollers on the distal side with reference to the motion center O is made larger, in the change direction section, than the height Hi of the recessed surface from the imaginary line interconnecting the rotational centers of the adjacent rollers on the proximal side with reference to the motion center O.

A more specific explanation is given by reference to FIGS. 19 and 20. Here, a distance between the centers of the adjacent rollers when the separator 350 is interposed between the rollers is taken as κDwe; a radius from the motion center O of the locus of movement of the centers of the rollers at the change direction section (337A or 337B) is taken as R; when a point where the roller shifts from the line of locus of movement of the roller center to the change direction section is taken as a reference, a distance from the reference to the center of the roller is taken as S (becomes negative before the roller enters the change direction section); and the amount of drop in the separator 350 from the locus of movement of the roller center in the vicinity of the change direction section is taken as B. At this time, the amount of drop in the separator 350 can be determined from the following equations.

$$\theta_7 = \tan^{-1}(-R/S)$$

$$\theta_8 = \tan^{-1}(-R/\kappa Dwe \times \sin\theta_3)$$

$$\theta_3 = \cos^{-1}\{(2R^2 + S^2 - \kappa Dwe^2)/(2R \times (R^2 + S^2)^{1/2})\}$$

$$B = \kappa Dwe/2 \times \sin(\theta_7 - \theta_8)$$

Figure 21:
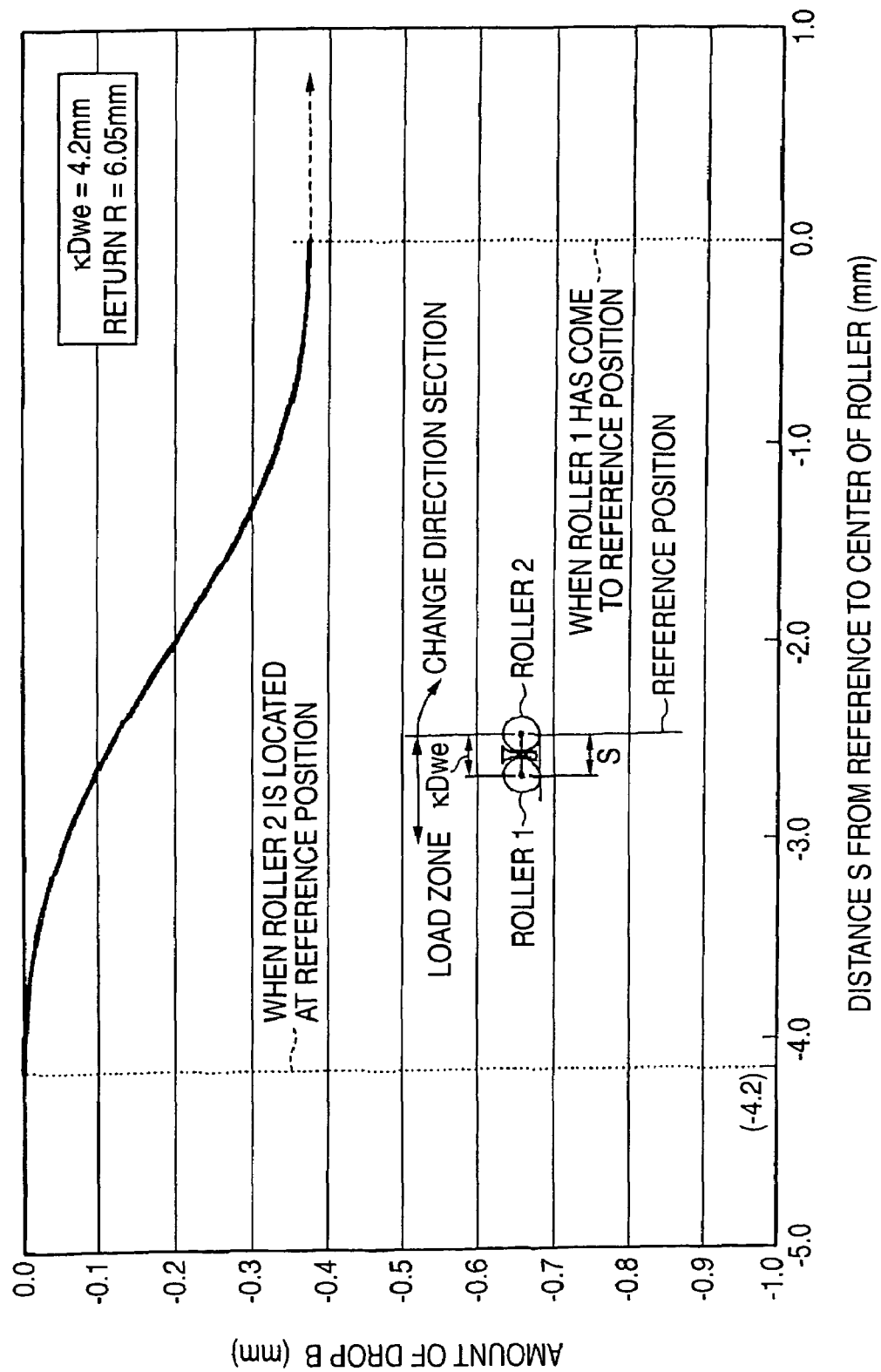
FIG. 21 is a view showing a relationship between a "distance S from a reference position to the center of the roller" and the "amount of drop B"

Specifically, if the above equations are used, basic specifications of the rollers 340 and the separators are determined The amount of drop B in the separator can be uniquely determined from the position of the roller. For instance, when κDwe=4.2 mm and R=6.05 mm, the amount of drop B in the separator determined according to the above equations is shown in FIG. 21.

In order to prevent the separator 350 from contacting the inner peripheral portion of the change direction section, which would otherwise arise when the separator 350 has fallen toward the motion center, the height of the recessed surface of the separator 350 is set so as to satisfy the relationships Hi<roller diameter/2−B and Ho−Hi≦B.

Similarly, in relation to the width of the separator main body 351 (i.e., a dimension of the separator main body in the moving direction), the width "a" of the separator located on the distal side with reference to the imaginary line interconnecting the rotational centers of the adjacent rollers is preferably made larger, in the change direction section, than the width "b" located on the proximal side with reference to the imaginary line interconnecting the rotational centers of the adjacent rollers (see FIG. 19). In relation to the width, the curved surfaces formed on both sides of the separator 350 in accordance with the outer peripheries of the adjacent rollers 340 assume negative curvatures (i.e. a recessed surface). Hence, if the heights Hi, Ho of the recessed surfaces are set so as to satisfy the foregoing requirements (i.e., the relationships Hi<diameter of a roller/2-B and Ho−Hi≦B), the width of the separator main body 351 (i.e., the dimension of the separator main body in the moving direction) is set in the change direction section such that the width "a" becomes larger than the width "b."

In general, the separators assume a complicated shape and, therefore, are molded in many cases with a view toward inexpensively manufacturing the separators. For this reason, plastics or elastomers, which can be molded, are used as materials for separators. However, the linear guide is a mechanical element which usually employs a lubricant or an anticorrosive agent during use or storage. Accordingly, when the separators are formed from plastics or elastomers, complete elimination of the chance of occurrence of swelling is difficult. Therefore, when the separators are interposed between the rollers, comparatively large influence may be imposed on the distance between the centers of the rotational shafts of the rollers. In the separator, the height is greater than the dimension between the recessed surfaces which are provided on both sides of the separator and accommodate rollers upon contact with the rollers. For this reason, if swelling has arisen, elongation of the roller in the heightwise direction is large. The interval between the recessed surfaces tends to become smaller under the influence of the elongation. Therefore, there is the risk of the rollers being dislodged from the separators, which would otherwise be caused an increase in the clearance in the train of rollers with the separators sandwiched therebetween.

Therefore, in the present embodiment, in order to minimize the influence of the swell on the interval between the recessed surfaces, the contact surface 355 is formed such that the contact section located between the roller 340 and the recessed contact surface 355 of the separator 350 comes to a position where the dimension between the recessed contact surfaces 55 formed on both sides of the separator 350 is minimized. In particular, when the recessed contact surfaces 355 are formed from a single circular arc, the contact surfaces 55 are preferably formed in a dimension R (radius) which is greater than one-half the maximum diameter of the roller 340.

Since plastics or elastomers are more easily deformed than is metal material, the clearance in the train of rollers with separators sandwiched therebetween is likely to resiliently change, which may render dislodgment of a roller likely to arise. For this reason, as shown in FIGS. 11 and 12, occurrence of a skew is inhibited by means of rendering the axial length of the separator main body 351 in the axial direction of the roller shorter than the length of the roller. Further, the preferred amount of accommodation Depth is ensured by means of setting the width "a" so as to become greater than the width "b" described in connection with FIG. 19. The function of the change direction sections 337A, 337B to retain rollers is enhanced by means of setting the width "a" so as to become greater than the width "b" described in connection with FIG. 19. As a result, occurrence of dislodgment of rollers, which would otherwise arise when the slider unit 330 is removed from the rail 320, can be prevented.

Figure 22:
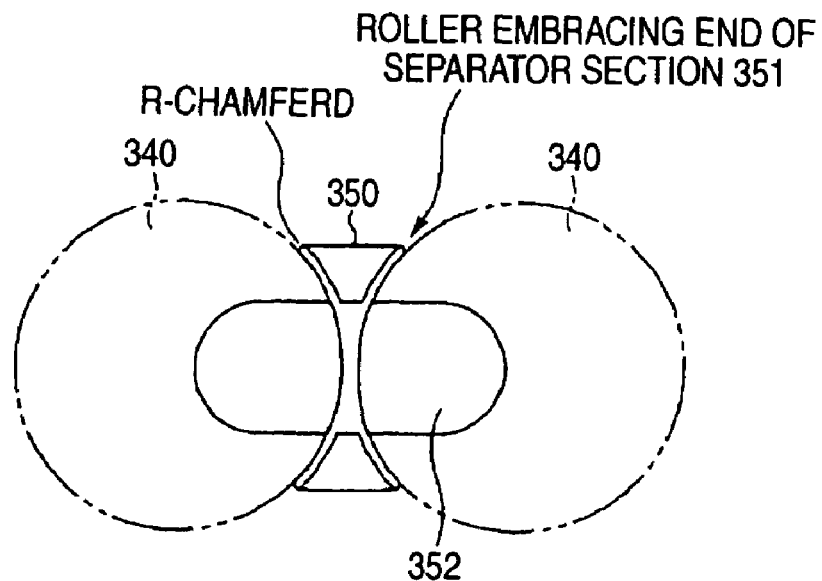
FIG. 22 is a view showing an example of R-chamfer in the separator main body of the embodiment.
Figure 23:
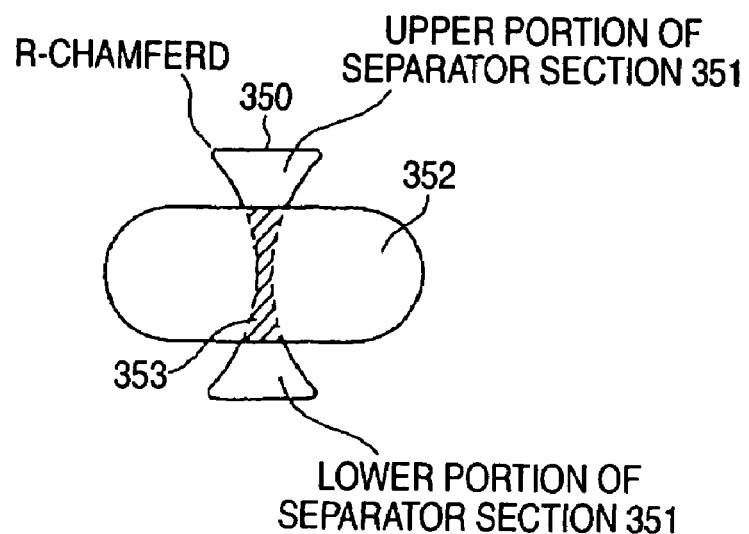
FIG. 23 is a view showing an example of R-chamfer in the separator main body of the embodiment.
Figure 24A:
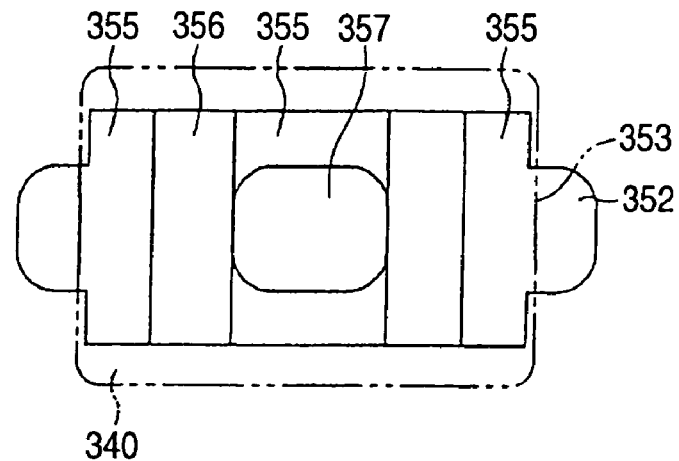
FIG. 24A is a view showing an example of a lubricant reservoir of the present invention.
Figure 24B:
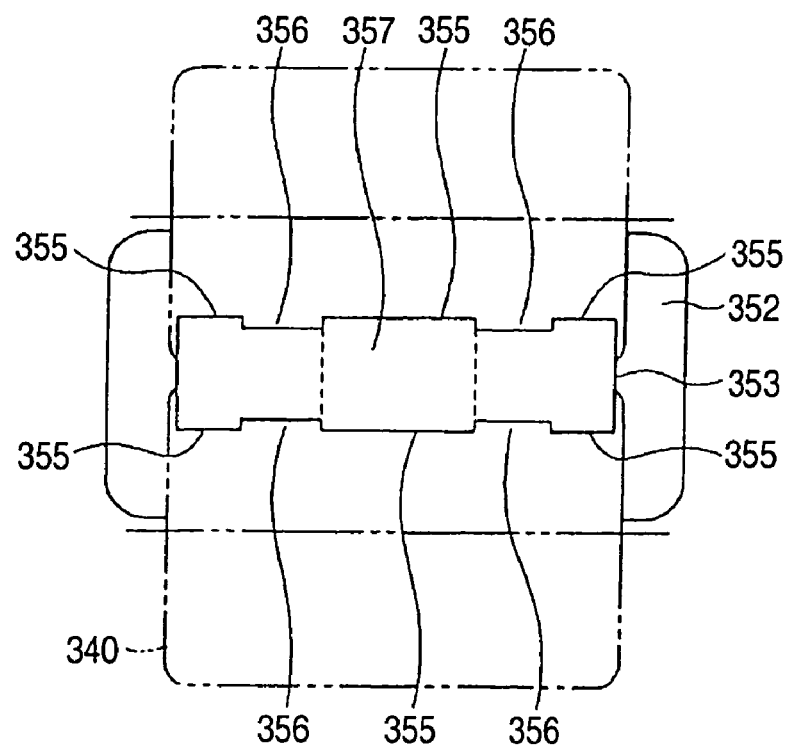
FIG. 24B is a view of the lubricant reservoir shown in FIG. 24A when viewed in the direction of linear motion.

As shown in FIGS. 22 and 23, in the separator 350, edges of the recessed surface sections of the separator main body 351 may be R-chamfered or the like. In place of R-chamfering, C-chamfering may be adopted.

The present embodiment has described an exemplary configuration in which the recessed groove 356 and the through hole 357, which act as a lubricant reservoir and are shown in FIG. 12, or the like, are provided. Moreover, there has been provided an explanation to the effect that the example configuration of the lubricant reservoir is not limited to this example. More specifically, for instance, a configuration shown in FIGS. 24A–25B may also be employed.

Figure 25A:
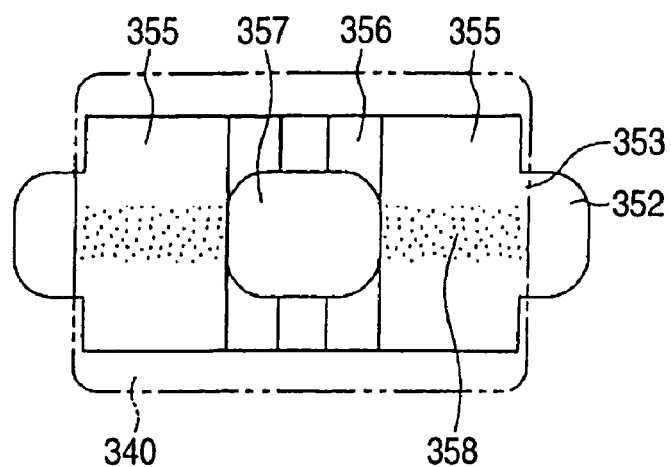
FIG. 25A is a view showing another example of a lubricant reservoir of the present invention.
Figure 25B:
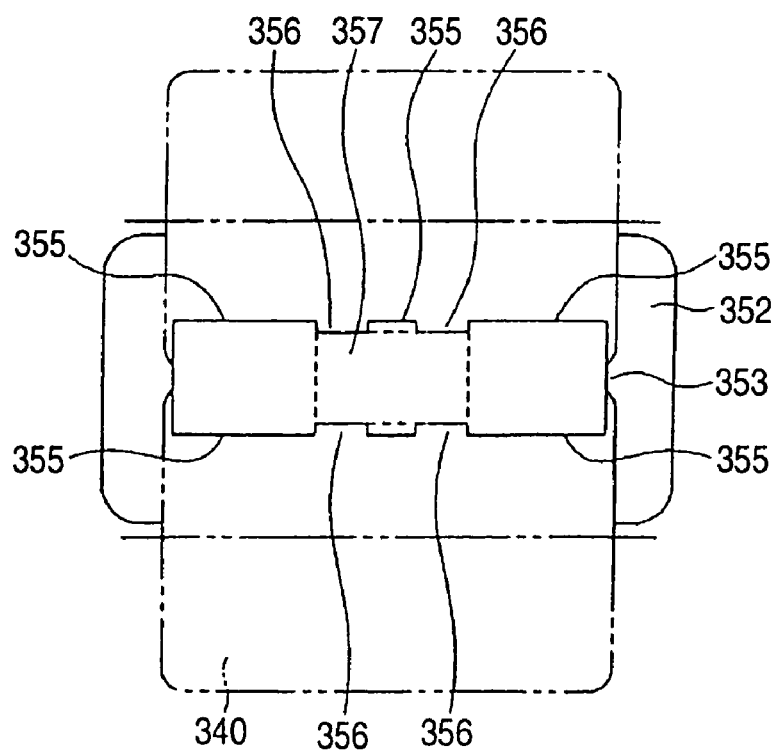
FIG. 25B is a view of the lubricant reservoir shown in FIG. 25A when viewed in the direction of linear motion.

In FIGS. 25A and 25B, reference numeral 358 designates a dimple-shaped recess formed at a location on the recessed contact surface 355 in the vicinity of the contact section between the contact surface 355 and the roller 340 in order to promote the effect of lubricant reservoir to a much greater extent. In order to reduce production cost by means of eliminating a distinction between machining operations, the dimple-shaped recess 358 may be formed in the entire contact surface 355.

In the linear guide of the embodiment that has been described thus far, the contact surfaces 355 of the separator main body 351 of the separator 350 are formed into the shape of a recess. Hence, retaining of the rollers 340 can be performed without fail. Further, even when the separators 350 are interposed between the rollers, the distance between the rotational centers of the adjacent rollers can be minimized, and hence the number of rollers to be disposed in the load zone can be held at a minimum number.

The contact surface 355 is given the shape of a recessed surface, and the roller 340 is retained by the arm sections 352 provided on the separator 350. Further, there are provided the guide members 361, 362, and 363 which guide the side surfaces 341 of the rollers 340 and the arm sections 352, and the roller end face guide section 338 for guiding the end surfaces 341 of the rollers 340. Therefore, dislodgment of the rollers can be prevented without fail, and occurrence of a skew can be inhibited effectively, thereby enhancing operability of the linear guide. Consequently, the collision sound is lessened, and there can be provided a quietly operating linear guide and, by extension, a quietly operating apparatus using the linear guide.

Further, if the contact surface 355 of the separator 5 is provided with the recessed groove 356, the through hole 357, and the dimple section 358, a lubricating characteristic is improved and abrasion of the rollers 340 and the separators 350 can be inhibited.

As in the case of the separator main body 351 of the embodiment, if the arm sections 352 are prevented from contacting the separator main body 351 and if the axial length of the separator main body 351 in the axial direction of the roller is increased to the extent possible, undesired movement of the rollers can be effectively inhibited without impairing smooth movement of the rollers. Hence, the rollers can be smoothly actuated, and occurrence of a skew in the rollers can be effectively prevented.

The exemplary configuration described in the embodiment is a mere example, and as a matter of course a modification can be made to the embodiment within the scope of technical spirit of the present invention.

An embodiment of a separator for use with a linear guide and that of a linear guide having the separators incorporated therein, both pertaining to the present invention, will be described hereinbelow.

Figure 26:
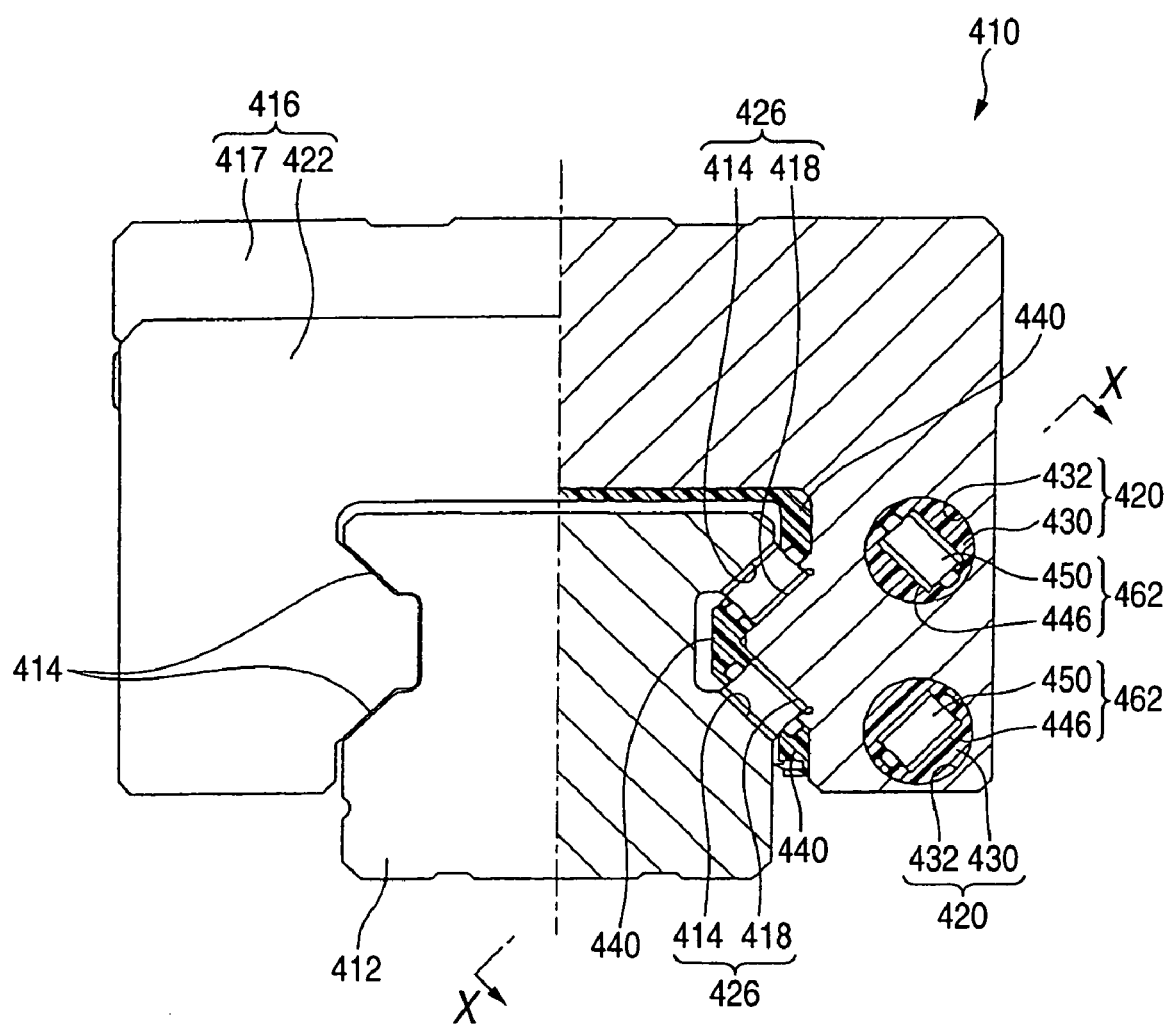
FIG. 26 is a descriptive view showing, in a partial cutaway view, a portion of a linear guide having separators for a linear guide of the present invention incorporated therein.
Figure 27:
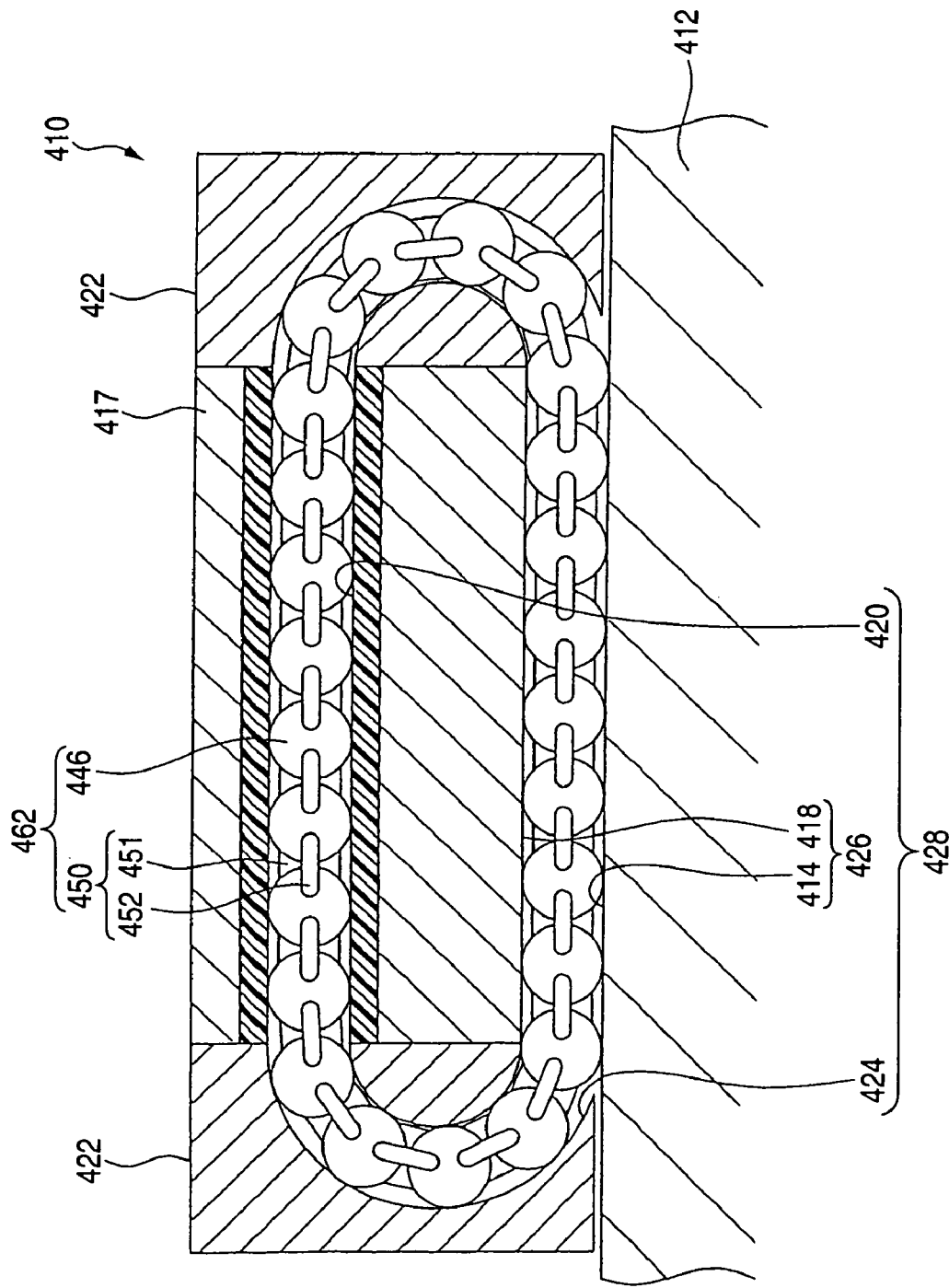
FIG. 27 is a cross-sectional view of the linear guide shown in FIG. 26 taken along line X—X.

FIG. 26 is a descriptive view showing, in a partial cutaway view, a linear guide into which separators for a linear guide of the invention are incorporated. FIG. 27 is a cross-sectional view of the linear guide taken along line X—X shown in FIG. 26.

As shown in FIGS. 26 and 27, the linear guide 410 is provided with a guide rail 412 having a roller guide surface 414, and a slider 416 which is provided so as to straddle the guide rail 412 in a relatively movable manner and has a load roller guide surface 418 opposing the roller guide surface 414.

Two roller guide surfaces 414 are formed on either side surface of the guide rail 412 in a longitudinal direction; that is, a total of four roller guide surfaces 414 are formed in a longitudinal direction. The slider 416 is constituted of a slider main body 417, and an end cap 422 attached to either axial end of the slider main body 417.

When the slider main body 417 and the end cap 422 are continuous with each other in an axial direction, they have an essentially-C-shaped cross-sectional profile. A pair of change direction paths 424, which come into communication with the ends of the load roller guide surfaces 418, are formed in the end cap 422. The slider 416 is constituted of the slider main body 417 and the end caps 422 connected to the axial ends of the slider main body 417.

A space—which is defined between the roller guide surface 414 of the guide rail 412 and the load roller guide surface 418 of the slider main body 417 opposing the roller guide surface 414—constitutes a roller track 426. A total of four endless circulation paths 428 which are annualarly continuous with each other are each constituted of the pair of change direction paths 424, a roller return passage 420, and the roller track 426.

A plurality of cylindrical rollers 446, which act as rolling elements, are loaded in the endless circulation path 428. A separator main body 452 of a separator 450 is interposed between adjacent rollers 446, wherein the separator 450 is constituted of a separator main body 451 and arm sections 452. More specifically, the roller 446 is sandwiched between roller contact surfaces 454a, 454b of the separator main bodies 451 of the adjacent separators 450. Occurrence of skew of the rollers 446 in the aligned direction is prevented by means of the pair of arm sections 452, 452. In this way, the rollers 446 are restrained by the separators 450, to thus constitute a train of rollers 462 along with the separators 450.

Next, areas in the linear guide 410 where the trains of rollers 462 are to be incorporated will be described in more detail.

Figure 28:
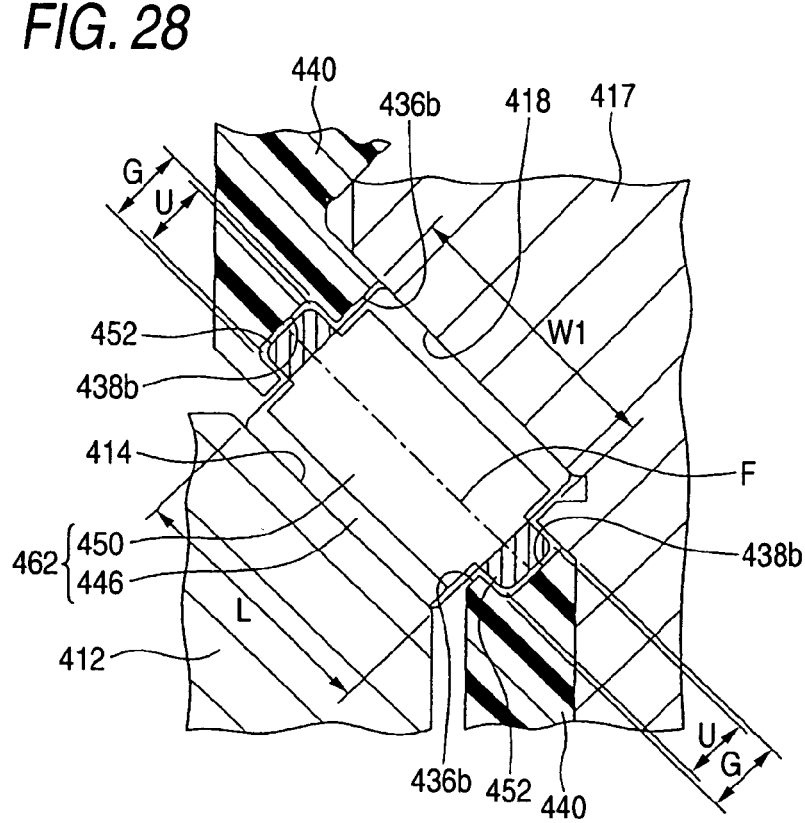
FIG. 28 is a descriptive view showing the principal feature of the linear guide shown in FIG. 26 in an enlarged view.

As shown in FIGS. 26 and 28, the inner side surface of the slider main body 417 is covered with a separator guide member 440 made of synthetic resin or the like, except areas where the load roller guide surfaces 418 are to be formed. Moreover, a slight clearance is formed between the separator guide member 440 and the surface of the guide rail 412 opposing the separator guide member 440.

Grooves—into which the load roller guide surface 418 and the separator guide member 440 are to be inserted—are formed in the essentially-C-shaped inside portion of the slider main body 417. More specifically, the groove is formed as a result of a separator guide wall 36b being formed by the separator guide member 440. A distance W1 between the separator guide walls 436b which oppose each other in the axial direction of the roller 446 is slightly greater than the length L of a barrel portion of the roller 446. A guide groove 438b with which the arm section 452 of the separator 450 is to be engaged is continuously formed in the separator guide wall 36b in the longitudinal direction. A width G of the guide groove 438b is slightly larger than a height U of the arm section 452. Therefore, the arm section 452 can be slidably engaged with the inside of the guide groove 438b.

Figure 29:
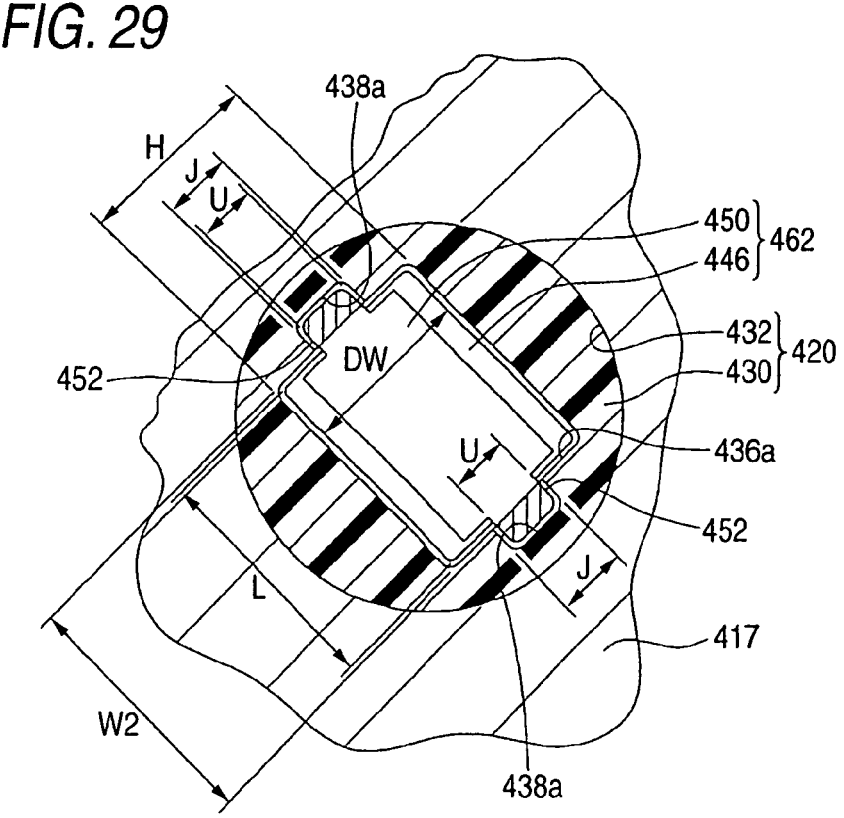
FIG. 29 is a descriptive view showing the principal feature of the linear guide shown in FIG. 26 in an enlarged view.

As shown in FIGS. 27 and 29, the roller return path 420 is formed in an essentially-C-shaped thick sleeve section of the slider main body 417 so as to be spaced a given distance from and in parallel to the load roller guide surface 418. The roller return path 420 is formed from a through hole 432 whose circular cross section continuously extends in a longitudinal direction, and a circular tube 430 inserted in the through hole 432.

The circulation tube 430 is a tube made of synthetic resin or the like. The cross-sectional profile of an internal space of the circulation tube 430 which continues in the longitudinal direction is defined with an essentially rectangular shape corresponding to the shape obtained as a result of the barrel of the roller 446 being projected in the longitudinal direction so that the rollers 446 can pass through the circulation tube 430. More specifically, the width W2 of the essentially rectangular cross-sectional profile is slightly greater than the length L of the barrel of the roller 446. The height H of the rectangular cross section is slightly greater than the diameter Dw of the roller 446. Therefore, the rollers 446 and the separators 450 can smoothly move through the space in the circulation tube 440.

Walls of the circulation tube 430 opposing both ends of the roller 446 that move through the circulation tube 430 also act as separator guide walls 436a. A guide wall 438a having a width which enables guiding of the arm section 452 in an engaged manner is formed continuously in the separator guide wall 436a longitudinally. Specifically, the width J of the guide groove 438a is slightly larger than the height U of the arm section 452. Therefore, the arm section 452 of the separator 450 can be slidably engaged with the inside of the guide groove 438a.

As shown in FIG. 27, a pair of curved change direction paths 424 are formed in the end cap 422, wherein the change direction paths 424 are connected to the ends of the load roller guide surfaces 418 and in communication with the roller return passages 420. The change direction paths 424 are formed from through holes which are continuous in the longitudinal direction and curved.

Specifically, the change direction path 424 is defined with an essentially rectangular shape corresponding to the shape obtained as a result of the barrel of the roller 446 being projected in the longitudinal direction so that the rollers 446 can pass through the change direction path 424. Walls of the change direction path 424 opposing the two ends of the rollers 446 that move through the change direction path 424 also act as separator guide walls. The dimension between the separator guide walls that oppose each other in the axial direction of the roller 446 is slightly greater than the length L of the barrel portion of the roller 446. The height of the rectangular cross section is slightly greater than the diameter Dw of the roller 446. Therefore, the train of rollers 462 constituted of the rollers 446 and the separators 450 can smoothly move through the internal space of the change direction path 424. In the change direction path 424, the entire train of rollers 463 moves while rolling. Accordingly, the width of the guide groove in the change direction path 424 is slightly widened in consideration of a radius of curvature matching the range of turning of the arm sections 452. The transverse cross-sectional profile of the change direction path 424 is identical with the circulation tube 430 of the roller return path 420. Hence, illustration of the cross sections is omitted.

Figure 30A:
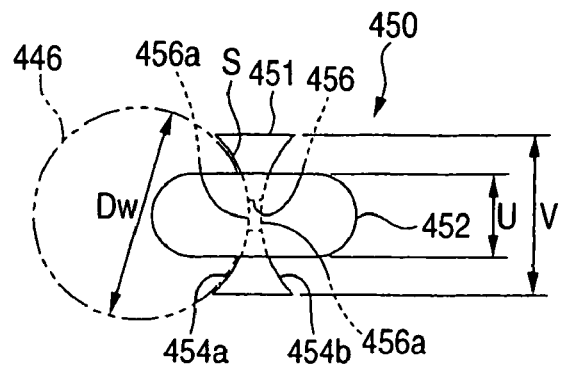
FIG. 30A is a front view of the separator.
Figure 30B:
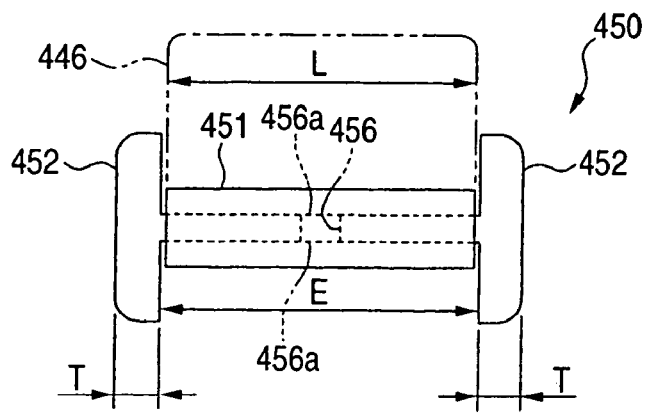
FIG. 30B is a plan view of the same.
Figure 30C:
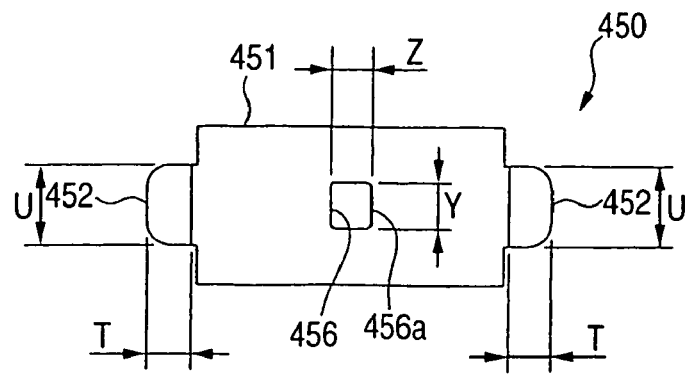
FIG. 30C is a right-side view of the same.
Figure 31A:
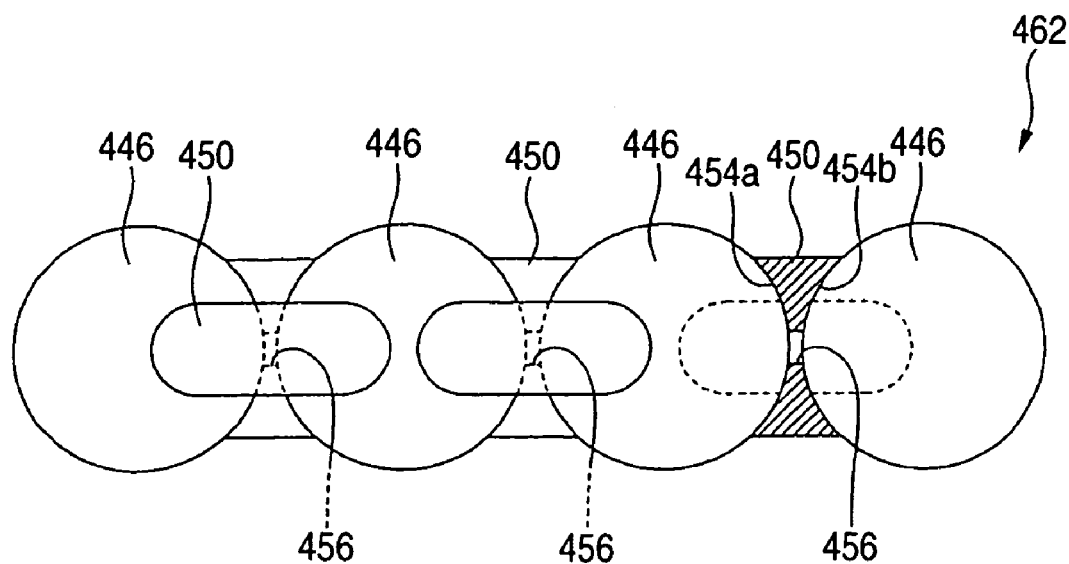
FIG. 31 is a partially-enlarged descriptive view showing that the separators (for use in a linear guide) of the present invention constitute a train of rollers interposed between adjacent rollers.
Figure 31B:
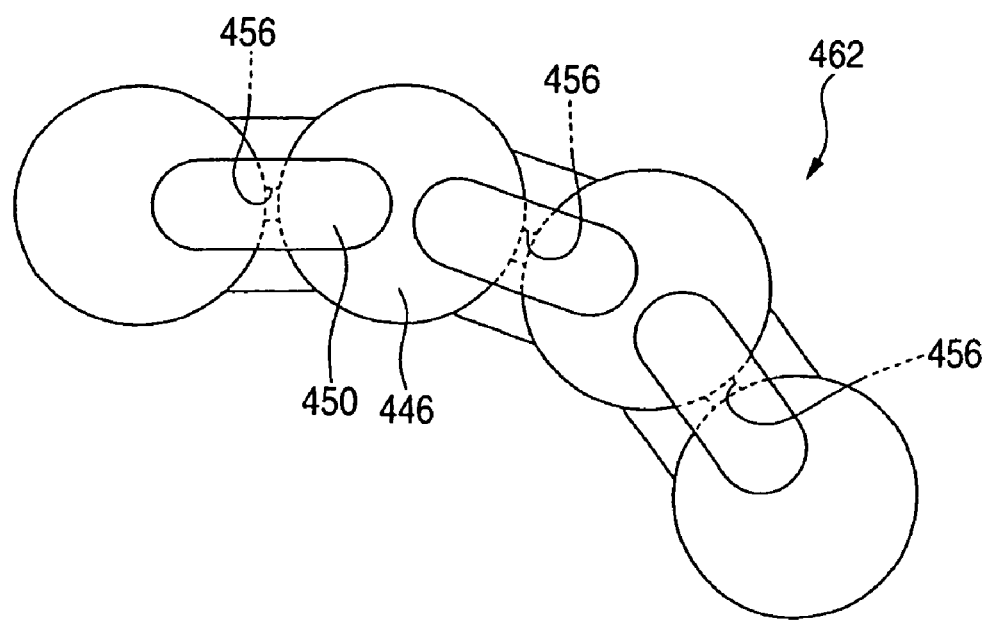

Next, the separator 450 will be described in detail by reference to FIGS. 30A–31B. FIG. 30 is an enlarged descriptive view of the separator 450. FIG. 30A is a front view of the separator 450, and FIG. 30B is a plan view of the same. FIG. 30C is a right-side view of the same. FIG. 31 is a partially-enlarged descriptive view showing that the train of rollers 461 is constituted by means of the separators 450 being sandwiched between the rollers 446.

The separator 450 is formed integrally from elastic synthetic resin. As shown in FIG. 30A, the separator 450 comprises the separator main body 451 and the arm sections 452, 452.

The height V of the separator main body 451 is smaller than the diameter Dw of the roller 446. One roller contact surface 454a is formed so as to oppose one adjacent roller 446 with which the roller contact surface is to be independently brought into contact. The other roller contact surface 454b is formed so as to oppose the other adjacent roller 446 with which the roller contact surface is to be independently brought into contact, in the direction opposite the roller contact surface 454a. The roller contact surfaces 454a, 454b are formed from recessed surfaces (i.e., recessed surfaces in the embodiment) corresponding to an outer peripheral surface S which is a rolling surface of the roller 446 such that the roller 446 can be rotatably supported and retained between the adjacent separators 441.

As shown in FIGS. 30B and 30C, in order to preserve lubricant, a lubricant reservoir section 456 which penetrates from the roller contact surface 454a to the roller contact surface 454b is formed in the roller contact surfaces 454a, 454b from opening sections 456a, each having a predetermined shape (i.e., an essentially rectangular shape in the embodiment) and a predetermined size.

The arm sections 452, 452 formed as a pair are formed so as to be able to stably roll within the endless circulation path 428 in the direction in which the rollers 446 are consecutively aligned, with the shafts of the rollers 446 being aligned parallel to each other. More specifically, the arm sections 452, 452 extend from end faces of the separator main body 451 toward the centers of the adjacent rollers 446 and also bulge along end faces of the rollers 446. Further the arm sections 452, 452 each have the predetermined height U guided by the guide grooves 438a, 438b. As shown in FIG. 30B, an interval E between the pair of arm sections 452 is slightly greater than the length L of the barrel portion of the roller 446. The height U of the arm section 452 (see FIG. 30A) is slightly smaller than the width of the guide groove 438a and that of the guide groove 438b. Therefore, the arm sections 452 of the separator 450 can be slidably engaged with the inside of the guide grooves 438a and 438b.

Usually, in order to increase the amount of lubricant retained in the lubricant reservoir section 456 and reduce a contact area between the lubricant reservoir section 456 and the roller 446, the opening sections 456a of the lubricant reservoir section 456 are increased in size, whereby the lubrication performance is considered to be improved while the slidable resistance against the roller is reduced. Therefore, an effect can be considered to be achieved by means of rendering the opening sections 456a large within the range in which the rigidity of the separator main body 451 of the separator 450 can be maintained.

However, required function and performance of the separator 450 are not mere function and performance achieved when the separators are actually incorporated in a product. For instance, adoption of a functional shape contributing to an improvement in productivity is an important requirement. Specifically, a important problem to be confronted is to adopt a functional shape which enables an improvement in productivity of an assembly operation for interposing the separators 450 between the adjacent rollers 446 and inserting the thus-interposed separators 450 into the endless circulation path 428.

For the separator 450, there is adopted a geometry which enables an automatic aligning machine, such as a parts feeder or the like, to readily align the separators and successively assemble the thus-aligned separators through use of, e.g., a robot or the like.

As shown in FIG. 30C, in order to make the separators 450 capable of comprehensively solving the problems, the separator 450 is configured to have the arm sections 452—which enable configuration of the train of rollers 462—and the lubricant reservoir sections 456. The maximum dimension of the lubricant reservoir section 456—including the height Y and width Z, which define an inner diameter of the essentially rectangular opening 456a of the lubricant reservoir section 456, and the diagonal dimension of the reservoir lubricant section 456—is made smaller than the maximum dimension including the height. U and the width T, which define the outer dimension of the arm section 452, and the diagonal dimension. Specifically, the arm section 452 is formed into an outer shape such that a free end of the arm section 452 does not fit into the opening section 456a of the lubricant reservoir section 456 formed in the roller contact surfaces 454a, 454b.

A working-effect of the linear guide 410 using the separators 450 of the present invention will now be described.

In the linear guide 410 having the foregoing configuration, when the slider 416 is moved over the guide rail 412 in the axial direction thereof, the rollers 446 move through the endless circulation path 428 while rolling, and the separators 450 also move along with the rollers 440 within the endless circulation path 428. At this time, the separator main body 451 of the separator 450 in the endless circulation path 428 pushes the roller 446 located ahead the separator main body 451 in the moving direction thereof. Further, the roller 446 pushes another separator main body 451 located ahead of the roller 446 in the moving direction thereof. In short, the entire train of rollers 462 circulates through the endless circulation path 428.

The train of rollers 462 moves through the roller track 426 in the direction opposite the moving direction of the slider 416. The train of rollers 462 enters one change direction path 424 by way of the end of the roller track 426 connected to the change direction path 424, where the train of rollers 462 changes its direction. The train of rollers 462 then enters the roller return path 420 by way of the change direction path 424 and moves in the same direction as that in which the slider slide 416 moves. The train of rollers 462 then enters the other change direction path 424, where the train of rollers 462 again changes its direction. The train of rollers 462 then returns to the roller track 426. The train of rollers 462 can iterate such a circulating operation.

According to the linear guide 410, the separator main bodies 451 are interposed between the rollers 446, thereby preventing the rollers 446 from coming into direct contact with each other and hence occurrence of noise or abrasion, which would otherwise be caused when the rollers 446 rub against each other. Further, the roller 446 is sandwiched between and retained by the roller contact surfaces 454a, 454b of the adjacent separators 450 of the respective rollers 446. The roller 446 is regulated by the arm sections 452 of the separator 450. Hence, the respective rollers 446 are held in a state where the center shafts of the rollers are held parallel to each other, by means of the separators 450. The rollers 446 can stably rotate and move through the endless circulation path 428 while being held in a predetermined position and at a predetermined pitch.

The rollers 446 undergo resistance within the roller track 426. However, the respective rollers 446 are pushed by following separator main bodies 451. Hence, the rollers 446 can smoothly move through the roller track 426. Further, the interval between the separator guide walls 436b in the roller track 426 is slightly greater than the length of the barrel of the roller 446. Therefore, the arm section 452 of each separator 450 is guided while being engaged with the guide grooves 438b of the separator guide walls 436b. For these reasons, occurrence of skew in the respective separator main bodies 454 in the roller track 426 is prevented more stably, and hindrance of smooth movement of the train of rollers 462, which would otherwise be caused by fluctuations in the arrangement of the train of rollers 462, is also prevented.

The arm sections 452 of the separators 450 are guided through the endless circulation path 428 along the guide grooves 438a, 438b. Hence, fluctuations, which would be caused at the time of movement of the separators 450, are limited, and fluctuations in the rollers 446 retained between the arm sections 452 of the separators 450 are also limited. Thus, the entire train of rollers 462 can accurately, smoothly move through the endless circulation path 428. Consequently, axial fluctuations (skew) of the rollers 446 are effectively prevented, and hence no strain acts on the train of rollers 462.

Moreover, the arm sections 452 of the separators 450 are engaged with the guide grooves 438a and the guide grooves 438b. The roller 446 retained between the separator main bodies 451 is also supported and retained by the roller contact surfaces 454a, 454b. Therefore, even when the slider 416 is removed from the guide rail 412, dislodgment of the roller train 462 from the slider 416 can be prevented.

Moreover, the lubricant reservoir section 456 for preserving lubricant is formed from through holes in the roller contact surfaces 454a, 454b of the separator 450. Since the separators 450 are used in the linear guide 410, the rollers 446 can be rolled more smoothly, and occurrence of early abrasion of the rollers 446 and generation of noise can be prevented.

Further, the separator 450 is configured such that the opening section 456a of the lubricant reservoir section is formed so as to become smaller than the external dimension of the arm section 452. Specifically, the maximum dimension of the lubricant reservoir section 456—including the height Y and width Z, which define the inner diameter of the essentially rectangular opening 456a of the lubricant reservoir section 456, and the diagonal dimension of the reservoir lubricant section 456—is made smaller than the maximum dimension including the height U and the width T, which define the outer dimension of the arm section 452, and the diagonal dimension. Therefore, fitting of the arm section 452 into the lubricant reservoir section 456 can be prevented. For example, even when the separators 450 have been automatically aligned through use of, e.g., a parts feeder or the like, entanglement of the separators 450 can be prevented. Particularly, even when the separators 450 are accumulated in a hopper or the like at a stage before a state at which the separators 450 are sent to the parts feeder, the separators 450 do not become entangled in the hopper or the like. Therefore, automation of production is facilitated, thereby enabling provision of the separators 450 for use with a linear guide which are capable of improving productivity of the linear guide 410.

The separators for a linear guide and the linear guide, both pertaining to the present invention, are not limited to the embodiment.

For instance, the embodiment shows an example in which the lubricant reservoir section 456 penetrating from the roller contact surface 454a to the roller contact surface 454b is provided at one position. However, the separator of the present invention is not limited to such an embodiment.

Figure 32B:
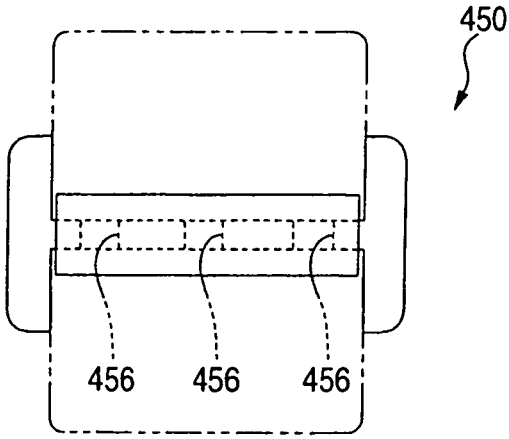
FIG. 32 is a descriptive view showing another embodiment of the separators (for use in a linear guide) of the present invention.
Figure 32C:
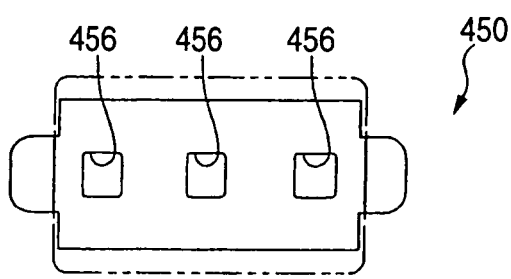

For instance, as shown in FIG. 32, the lubricant reservoir section 456 penetrating from the roller contact surface 454a to the roller contact surface 454b may be provided at a plurality of locations (e.g., three positions in the drawing) as another embodiment.

Figure 33B:
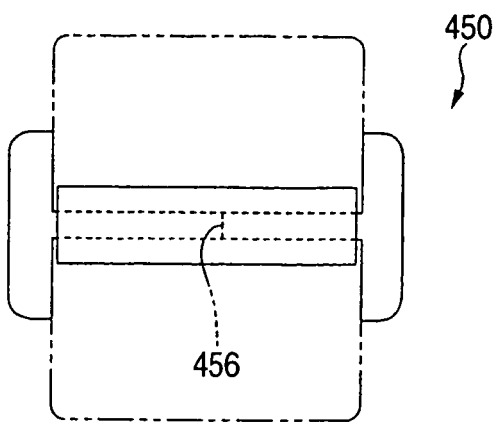
FIG. 33 is a descriptive view showing another embodiment of the separators (for use in a linear guide) of the present invention.
Figure 33C:
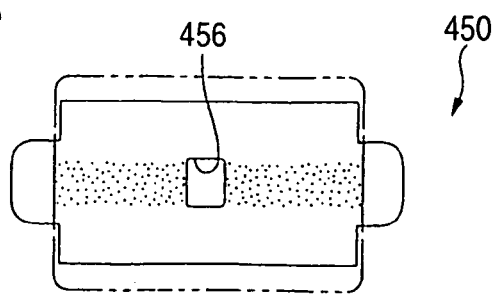

As shown in FIG. 33, dimples consisting of a plurality of small indentations (an image of the dimples is illustrated as a plurality of dots in the drawing) along with, e.g., the lubricant reservoir section of the embodiment, may be formed integrally in a principal contact area between the roller and the separator as yet another embodiment, thereby enhancing lubricity.

The position where the lubricant reservoir section is to be formed and the shape of the lubricant reservoir section are not limited to those described in connection with the embodiment, so long as the opening section of the lubricant reservoir section is made smaller than the outer dimension of the arm section, thereby preventing fitting of the arm section into the lubricant reservoir section. For instance, when the roller contact surface to be formed in the separator main body 451 is formed into the shape of a Gothic arch or a conical shape and when the roller contact face is brought into contact with the roller, an arbitrary contact angle may be imparted to the roller contact surface, and a lubricant reservoir section may be formed in the contact section corresponding to the contact angle. Specifically, as shown in FIG. 34, the lubricant reservoir section may be formed at a plurality of locations (e.g., six locations in the drawing) from oval indentations (or recesses) as still another embodiment.

Figure 34B:
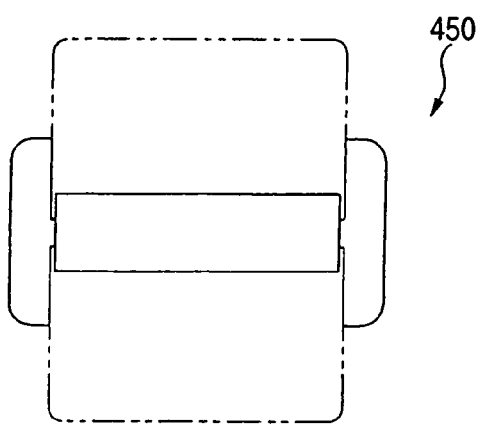
FIG. 34 is a descriptive view showing another embodiment of the separators (for use in a linear guide) of the present invention.
Figure 34C:
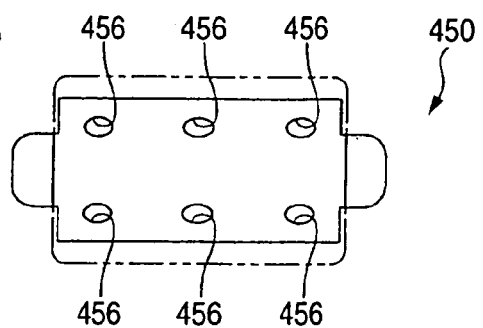
Figure 35B:
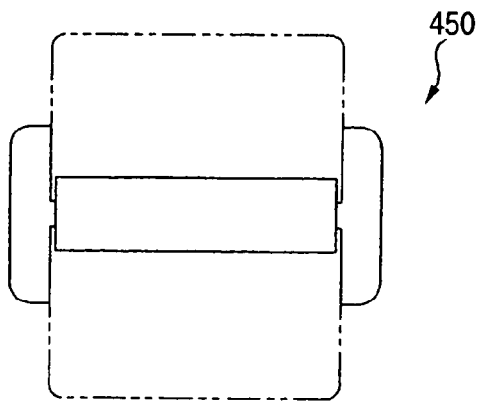
FIG. 35 is a descriptive view showing another embodiment of the separators (for use in a linear guide) of the present invention.
Figure 35C:
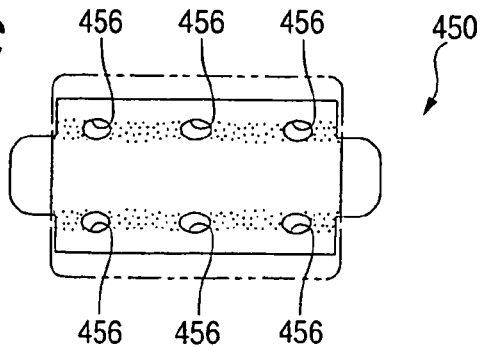

As shown in FIG. 35, the small dimples shown in FIG. 33 may be combined with the configuration shown in FIG. 34 as another embodiment. Thus, the embodiments can be arbitrarily created within the scope of the invention.

Moreover, in relation to the dimensional relationship between the opening section 456a of the lubricant reservoir section 456 and the arm section 452 for preventing fitting of the arm section into the opening section in the present embodiment, the essentially rectangular relationship between the width and the height is realized by means of rendering the size of opening section 456a smaller than that of the arm section. However, the embodiment is not limited thereto.

The gist of the present invention lies in that any shape can be employed, so long as the shape can prevent fitting of one separator into another separator. Specifically, in view of the relationship between shapes which contribute to fitting of the arm section into the lubricant reservoir section, the only requirement is that the opening section be substantially smaller than the outer dimension of the arm section. Therefore, the maximum dimension of the opening section 456a (a diagonal dimension, if the opening section is rectangular) is made smaller than the maximum dimension of the arm section 456 (a diagonal dimension, if the opening section is rectangular) within a cross section orthogonal to the longitudinal direction of the arm section 452, thereby preventing fitting of the separators into each other. For instance, if the arm section has a circular cross-sectional profile when viewed in the longitudinal direction thereof, the only requirement is to make the maximum dimension of the opening section be smaller than the diameter of the circle. Moreover, if the arm section is formed from another composite geometry, the maximum dimension of the opening section is made smaller than the maximum dimensions of individual sections in a shape obtained by projecting the arm section in the direction in which the shape contributes to fitting of the arm section.

Figure 36A:
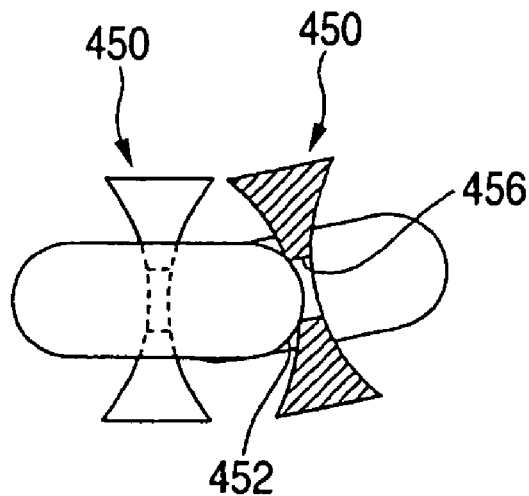
FIG. 36 is a descriptive view showing how the separators (for use in a linear guide) of the present invention fit into each other.
Figure 36B:
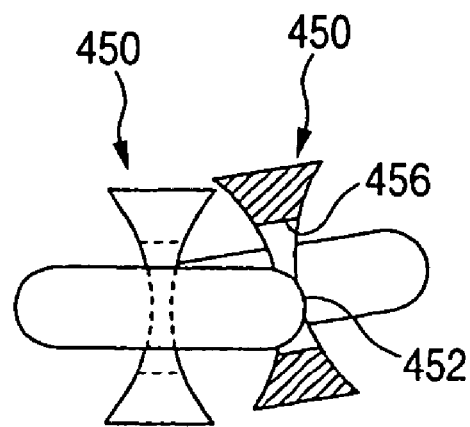

Here, the phrase "opening section is substantially smaller than the outer dimension of the arm section" used herein means that, as shown in FIG. 36A, in a case where the arm section 452 has an identical cross section that extends in a longitudinal direction and the extremity of the arm section is formed from a free end having a round protuberance, even if a portion of the round extremity of the arm section 452 has nominally fitted into the lubricant reservoir section 456, the separators 450 can readily disengage from each other. Thus, the expression also encompasses a shape which does not cause any substantial mutual catch. The reason for this is that, if the relationship shown in FIG. 36A stands, mutual fitting of the separators 450 will not arise. As shown in FIG. 36B, an example in which the opening section is essentially larger than the outer dimension of the arm section 452 can be illustrated as the example in which fitting of the separators arises.

Figure 37:
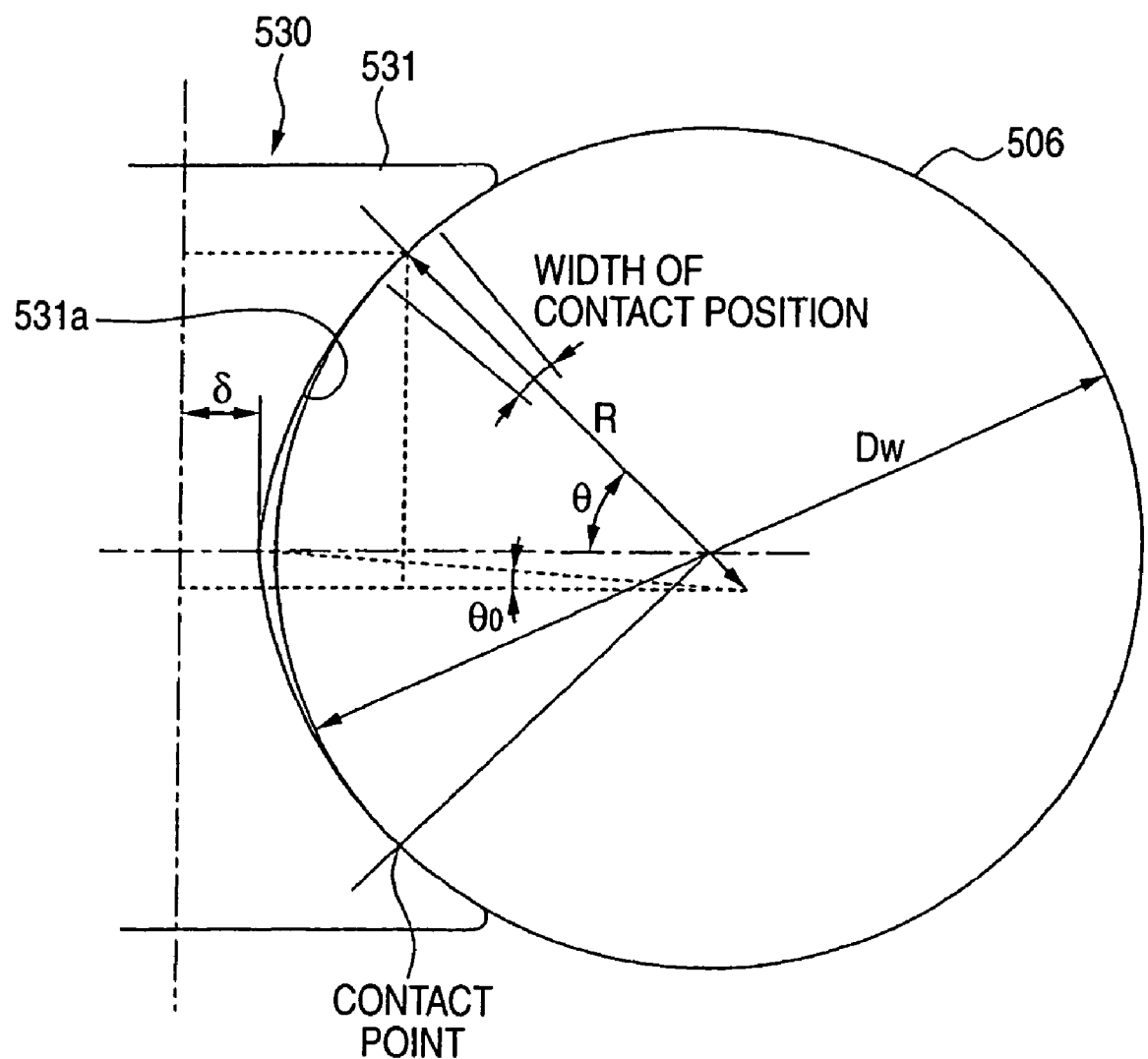
FIG. 37 is a descriptive view for describing a linear guide bearing which is an example of the present embodiment of the invention.
Figure 38:
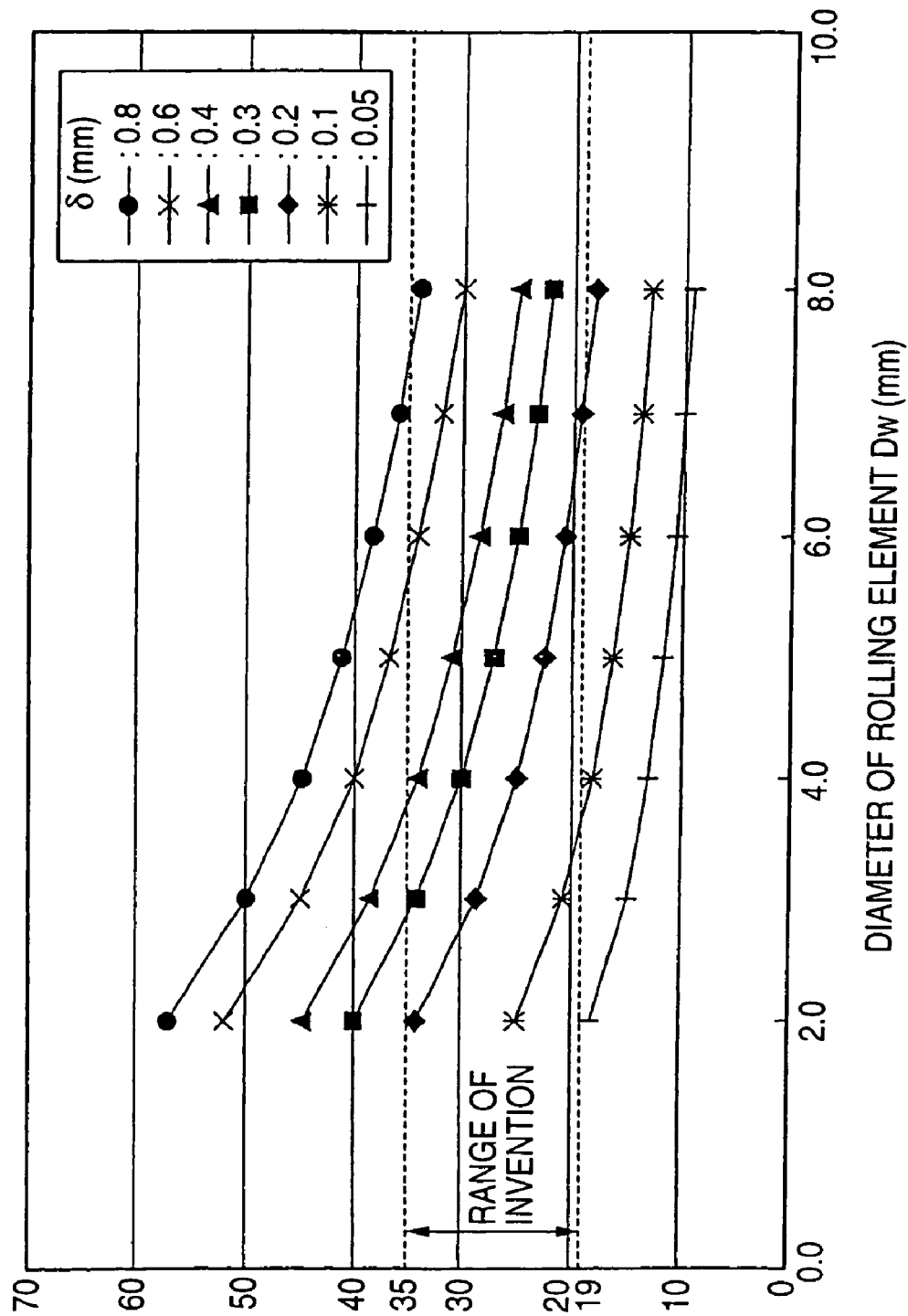
FIG. 38 is a graph showing a relationship between a contact angle θ at which dimensional changes in a separator due to swell become minimum and the diameter Dw of the rolling element on a per-δ basis.
Figure 39:
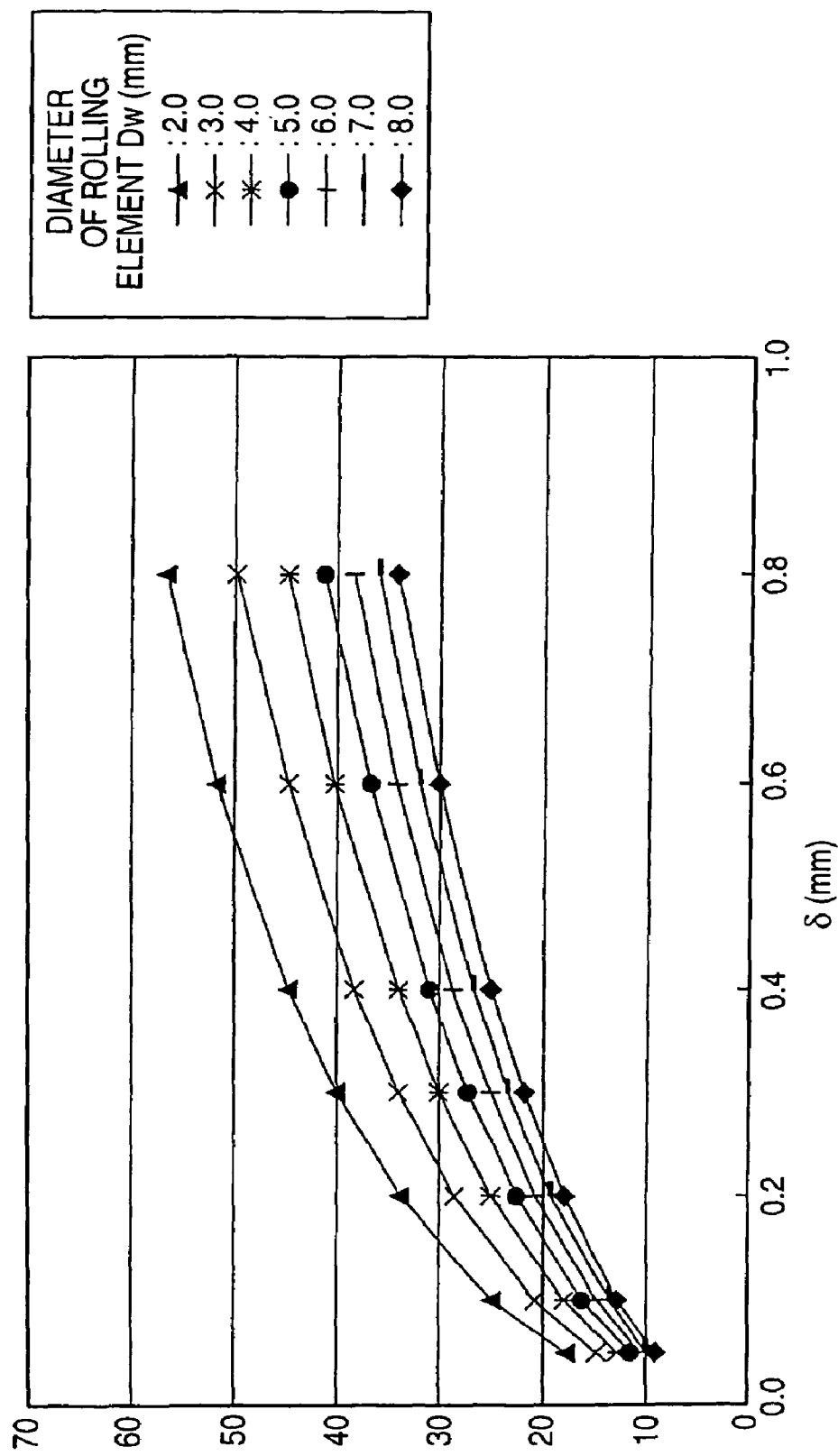
FIG. 39 is a graph showing a relationship between the contact angle θ at which dimensional changes in a separator due to swell become minimum and δ for each the diameter Dw of the rolling element.
Figure 40:
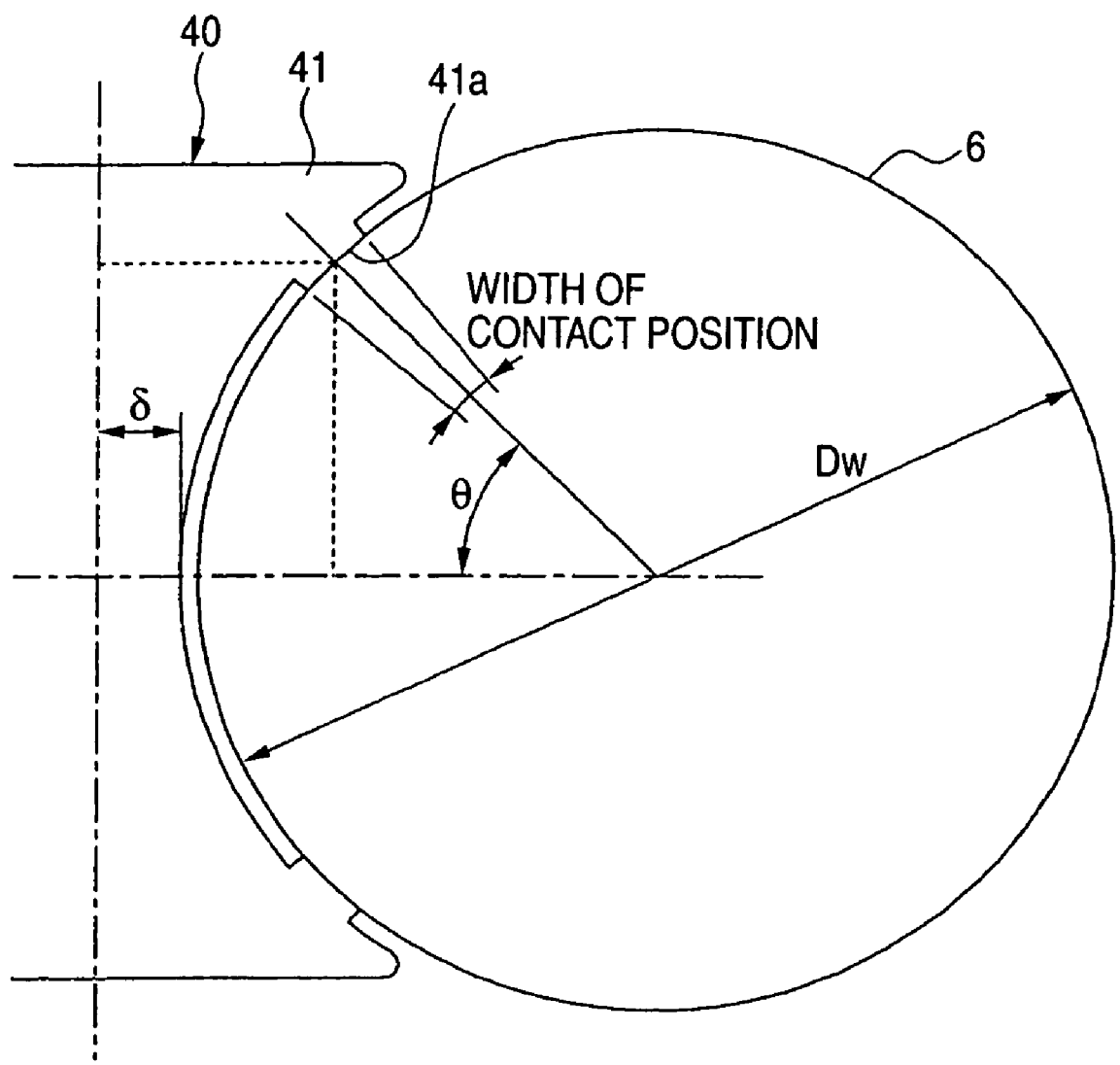
FIG. 40 is a descriptive view for describing a linear guide bearing according to another embodiment of the invention.
Figure 41:
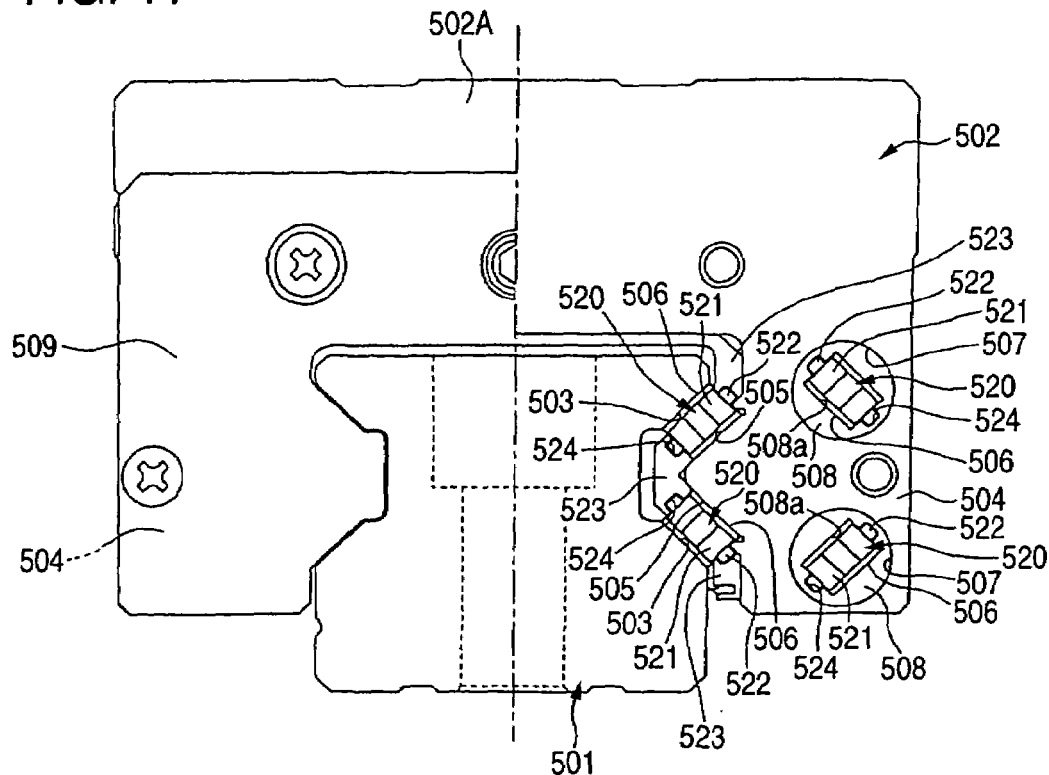
FIG. 41 is a partially cutaway view for describing the linear guide bearing using cylindrical rollers as rolling elements, the bearing being an example of the direct-acting apparatus.
Figure 42A:
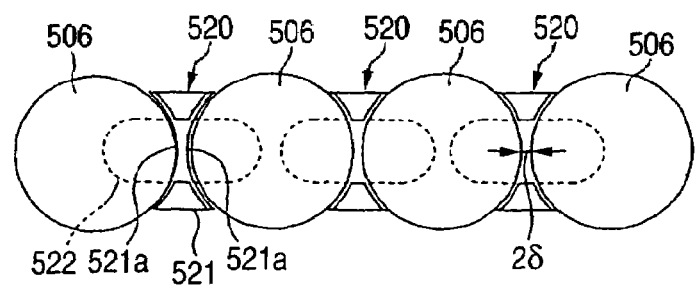
FIG. 42A shows a linear motion area.
Figure 42B:
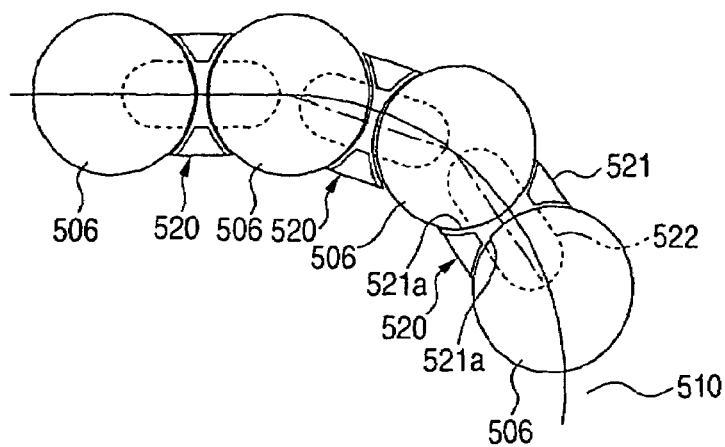
FIG. 42B shows a change direction path area.
Figure 43:
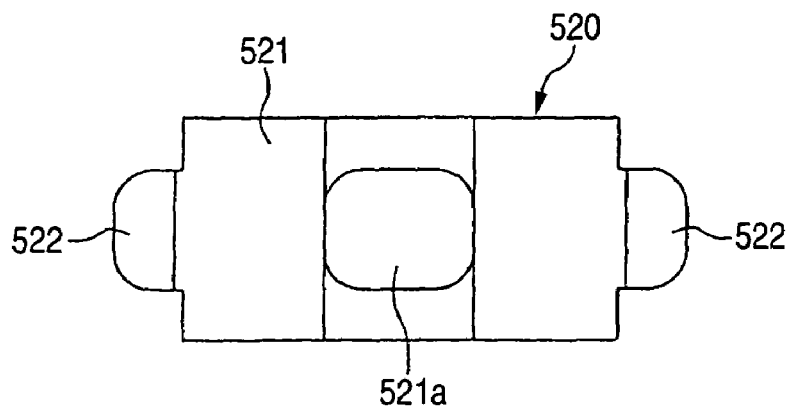
FIG. 43 is a view of the separator when viewed in the direction in which the cylindrical rollers are circulated.
Figure 44:
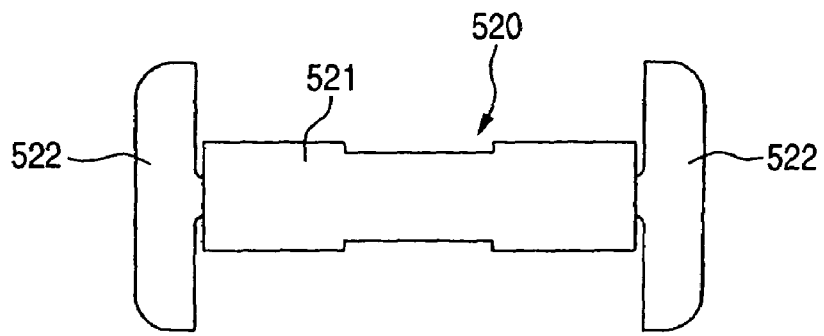
FIG. 44 is a top view of FIG. 43.
Figure 45:
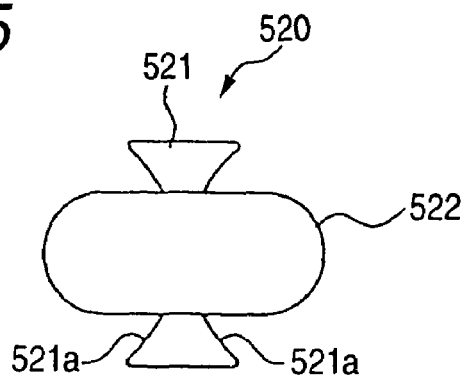
FIG. 45 is a side view of FIG. 44.
Figure 46:
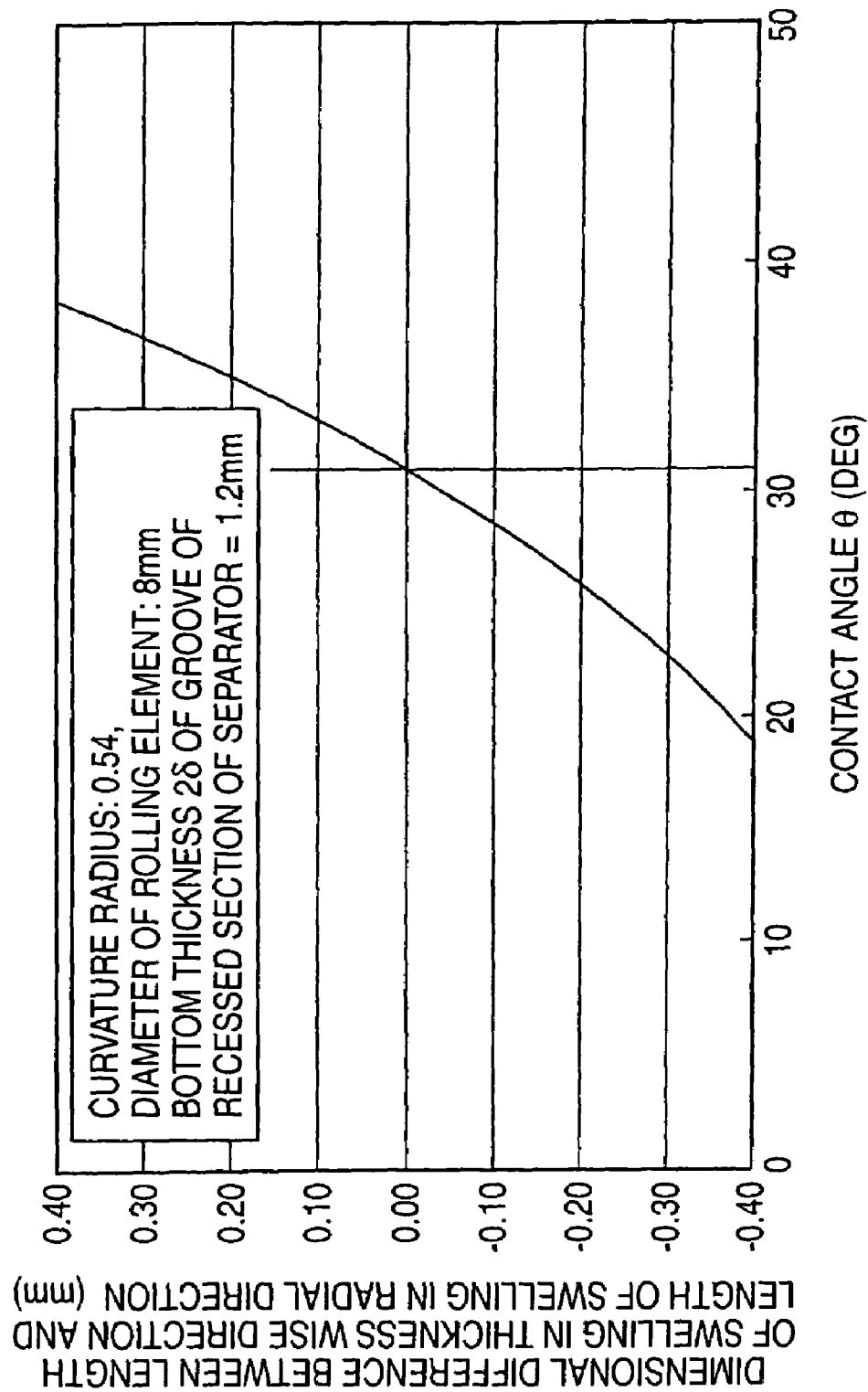
FIG. 46 is a graph showing a relationship between a contact angle θ and a dimensional difference, wherein the dimensional difference exists between the thicknesswise length of a swell in the separator and the radial length of the swell in the same.

An embodiment of the present invention will be described hereinbelow by reference to the drawings. FIG. 37 is a descriptive view for describing a linear guide bearing which is an example of the present embodiment of the invention. FIG. 38 is a graph showing, for various values of δ, a relationship between a contact angle θ at which dimensional changes in a separator due to swelling become minimum and the diameter Dw of the rolling element. FIG. 39 is a graph showing, for various values of the diameter Dw of the rolling element, a relationship between the contact angle θ at which dimensional changes in a separator due to swelling become minimum and δ. FIG. 40 is a descriptive view for describing a linear guide bearing according to another embodiment of the invention. Explanations are given only to differences between embodiments and the conventional linear guide bearing shown in FIG. 41.

As shown in FIG. 37, the linear guide bearing, which is an example of the embodiment of the invention, comprises separator main bodies 531 to be interposed between adjacent cylindrical rollers (rolling elements) 506; and separators (partition elements) 530 which are arranged such that both axial end faces of the cylindrical roller 506 are sandwiched between the separators 530. Arm sections (not shown) are provided integrally on each of the separator main bodies 531. Recessed surface sections 531a agreeing with the outer circumferential shape of the cylindrical roller 506 are provided on portions of the separator main body 531 opposing the outer circumferential surface of the cylindrical roller 506.

Material which is easy to mold, has high strength, and has self-elasticity is optimum as a material of the separator 530. For instance, polyamide or elastomer can be employed. PEEK, which has slightly lower self-elasticity but emits a small amount of an outgas, can be used For vacuum applications.

Moreover, a structure for storing lubricant for use with the cylindrical roller 506; e.g., a dimple or an oil puddle groove, may be provided on a surface of the recessed surface section 531a, the surface contacting the cylindrical roller 506.

Here, in the present embodiment, on the assumption that a cross section of the recessed surface section 531a is formed into the shape of a Gothic arch; the diameter of the cylindrical roller 506 is taken as Dw; a contact angle θ between the recessed surface section 531a of the separator main body 531 and the cylindrical roller 506 is taken as θ; the radius of a Gothic arch groove of the recessed surface section 531a is taken as R; the bottom thickness of the groove of the recessed surface section 531a of the separator is taken as 2δ; and the curvature radius of the recessed surface section 531a is taken as "f," the separator 530 assumes the contact angle θ which satisfies the following equations (1) to (3)

$$0.5 Dw \sin\theta \tan\theta = \delta + R(\cos\theta o - \cos\theta) \quad (1)$$

$$\theta o = \sin^{-1}[\{(2f-1)/(2f)\}\sin\theta] \quad (2)$$

$$f = R/Dw \quad (3).$$

In the case of the direct-acting apparatus, it has already been known that, when the separator is interposed between the rolling elements, the number of effective rolling elements of a load section becomes small, thereby affecting load capacity and rigidity.

For instance, load capacity is taken as an example. In a case where the rolling element is a roller, load capacity is proportional to the 0.75th-power of the number of rolling elements (meanwhile, in a case where the rolling element is a ball, load capacity is proportional to two-thirds the number of rolling elements). When compared with a direct-acting apparatus which does not use sandwiched separators, a decrease in load capacity and rigidity is unavoidable. However, the decrease in load capacity is desirably minimized. In general, the rate of decrease in load capacity must be suppressed to 10% or less. Specifically, a rate of filling of rolling elements must be maintained to at least 88% or thereabouts.

Generally, the number of rolling elements of the direct-acting apparatus is 10 to 20 per train in the load section. Accordingly, Table 1 shows an allowance of ability to assure the bottom thickness 2δ (mm) of the recessed surface section of the separator within the range in which the rate of filling of the rolling elements can be maintained at 88%. Here, 2δ=[the number of rolling elements×(1−the rate of filling of rolling elements)×the diameter Dw of the rolling elementD]/(the number of rolling elements−1).

TABLE 1

| NUMBER OF ROLLING ELEMENTS | | 10.0 | | | 20.0 | | |
|---|---|---|---|---|---|---|---|
| FILLING RATE OF ROLLING ELEMENTS | | 0.95 | 0.90 | 0.85 | 0.95 | 0.90 | 0.85 |
| DIAMETER OF ROLLING ELEMENT (mm) | 1.0 | 0.06 | 0.11 | 0.17 | 0.05 | 0.11 | 0.16 |
| | 2.0 | 0.11 | 0.22 | 0.33 | 0.11 | 0.21 | 0.32 |
| | 3.0 | 0.17 | 0.33 | 0.50 | 0.16 | 0.32 | 0.47 |
| | 4.0 | 0.22 | 0.44 | 0.67 | 0.21 | 0.42 | 0.63 |
| | 5.0 | 0.28 | 0.56 | 0.83 | 0.26 | 0.53 | 0.79 |
| | 6.0 | 0.33 | 0.67 | 1.00 | 0.32 | 0.63 | 0.95 |
| | 7.0 | 0.39 | 0.78 | 1.17 | 0.37 | 0.74 | 1.11 |
| | 8.0 | 0.44 | 0.89 | 1.33 | 0.42 | 0.84 | 1.26 |

Here, for instance, in the case where the diameter of the rolling element is 2 mm, δ assumes a value ranging from 0.055 to 0.165 mm. FIG. 37 shows results of computation of the contact angle θ—at which dimensional variations in the separator due to swelling become minimum—for various values of δ through use of Equations (1) to (3) while the diameter Dw of the rolling element is taken as a horizontal axis.

In FIG. 37, in consideration of the range of the values of δ settable by the diameter Dw of each rolling element regulated by a load capacity or rigidity shown in the above Table 1, the optimum value of the contact angle θ is within 19° to 35°.

When the diameter Dw of the rolling element is set to 10 mm, which is in excess of 8 mm shown in Table 1, the upper limit of the contact angle θ approaches the neighborhood of 40°. Determining the contact angle θ that satisfies Equations (1) to (3) enables determination of the optimum contact angle θ at which deformation of the separator 530 due to swelling can be minimized. FIG. 39 shows the same information, wherein the parameters shown in FIG. 38 are changed.

As mentioned above, in the present embodiment, dimensional changes developing between the cylindrical rollers 506 for reasons of swelling of the separator 530 due to oil and fat or the like, which is unavoidable for a resin product, can be minimized by means of bringing the recessed surface section 531a of the separator 530 into contact with the cylindrical roller 506 at an optimum contact angle θ. Therefore, deterioration in the operability of the direct-acting apparatus stemming from circulation of the cylindrical rollers 506 and the separators 530 can be inhibited. Moreover, an additional improvement in a low-noise characteristic and durability can be readily achieved at low cost.

By reference to FIG. 40, a linear guide bearing which is another embodiment of the present invention will now be described. As shown in FIG. 40, the linear guide bearing comprises separator main bodies 541 to be interposed between adjacent cylindrical rollers (rolling elements) 506; and separators 540 which are arranged such that both axial end faces of the cylindrical roller 506 are sandwiched between the separators 540 and have arm sections (not shown) provided integrally on each of the separator main bodies 541. Recessed surface sections 541a agreeing with the outer circumferential shape of the cylindrical roller 506 are provided on portions of the separator main body 531 opposing the outer circumferential surface of the cylindrical roller 506.

Here, in the present embodiment, on the assumption that a cross section of the recessed surface section 541a is formed into the shape of a single circular arc; the diameter of the cylindrical roller 506 is taken as Dw; a contact angle between the recessed surface section 541a of the separator 540 and the cylindrical roller 506 is taken as θ; the radius of a circular arc groove of the recessed surface section 541a is taken as R; the bottom thickness of the groove of the recessed surface section 541a of the separator main body 541 is taken as 2δ; and the curvature radius of the recessed surface section 541a is taken as "f," the separator 540 assumes the contact angle θ which satisfies the following equations (4) and (5), wherein the range of the contact position between the recessed surface section 541a and the cylindrical roller 506 is ±10° or less.

$$0.5Dw \cdot \sin\theta \tan\theta = \delta + R(1-\cos\theta) \quad (4)$$

$$f = R/Dw \quad (5).$$

The reason why the range of the contact position between the recessed surface section 541a and the cylindrical roller 506 is set to ±10° or less is as follows. Deformation of resin is originally large, and hence when the range of contact position is desired to be set to a wide range. However, the recessed surface section 541a assumes the shape of a single circular arc. Hence, if the range of contact position is set to an excessively large range, the cylindrical rollers 506 are susceptible to large slippage, which in turn results in an increase in frictional force. Hence, setting the range of contact position to a large value is not appropriate. For this reason, the range of contact position is set to an ordinary value. In other respects, the present embodiment is identical with the previously-described embodiment in terms of configuration and working effect. Hence, its explanation is omitted.

The present invention is not limited to the embodiments and is susceptible to various alterations within the range of gist of the invention.

For instance, the respective embodiments have described a case where the rolling element is a roller. However, even when the rolling element is embodied as a ball, the same working-effect can be achieved by means of acquiring the contact angle θ that satisfies the foregoing equations.

The respective embodiments have adopted a linear guide bearing as an example of the linear motion apparatus. However, the prevent embodiments are not limited to the linear guide bearing. For instance, the present invention can be applied to a linear motion apparatus, such as a ball screw, a ball spline, and a linear ball bush.

As has been described above, an invention of claim 1 prevents occurrence of a decrease in the number of rolling elements to be disposed in a load zone, which would otherwise be caused as a result of a clearance arising between rolling elements and separators. Hence, occurrence of contact between the rolling elements and skew can be prevented without involvement of a drop in load capacity.

In addition to yielding the advantage of the invention yielded by the invention, an invention enables reinforcement of the separator main body with arm sections and ensures a sufficient contact area between an end face of a rolling element and a raceway contacting the end face.

According to an invention, the positions of the rolling elements become more stable, thereby yielding a sufficient effect of inhibiting occurrence of skew in the rolling elements.

According to an invention, the contact area between the separator and the rolling element is limited to right and left sides of the separator. Hence, occurrence of skew in the rolling element is inhibited, thereby enabling enhancing operability of the linear guide.

According to an invention, a lubricant can be stored in the through holes, and the lubricant stored in the through holes can be stably supplied to the rolling elements.

According to an invention, there can be provided a linear guide capable of improving operability while suppressing occurrence of skew in the rolling elements.

As has been described, the present invention can provide a separator for a linear guide which effectively inhibits occurrence of a decrease in load capacity and skew and achieves enhanced operability with a simple construction, as well as providing a linear guide including the separator, and an apparatus including the linear guide.

What is claimed is:

1. A separator for use in a linear guide having a guide rail, a slider disposed on the guide rail so as to move relatively each other, and a plurality of roller-shaped rolling elements incorporated in the slider, the separator comprising:

a separator main body having, on both sides in a front and rear direction thereof, recessed surface sections which contact circumferential sections of the rolling elements; and at least a pair of arm sections provided parallel to each other on both sides of the separator main body while being oriented in the same direction, wherein a length of the arm section is equal or shorter than a distance between centers of two adjacent rolling elements with the separator main body sandwiched therebetween, with respect to a lateral direction of the separator main body.

2. A separator for a linear guide according to claim 1, wherein the arm sections have a height which is about 20% to 60% with respect to the diameter of the roller-shaped rolling element.

3. A separator for a linear guide according to claim 1, wherein a lateral length of the separator main body is made slightly shorter than an axial length of the roller-shaped rolling element, and wherein one of right and left side surface sections of the rolling element contacts with a surface which is formed on an inner side surface of the slider so as to be adjacent to a raceway of the slider and is finished concurrently with finishing of the raceway.

4. A separator for use in a linear guide according to claim 1, further comprising:
a clearance groove formed in the center of the recessed surface section in a circumferential direction of the rolling element.

5. A linear guide comprising the separator defined in claim 4.

6. A separator for use in a linear guide according to claim 4, wherein a through hole is formed in the center of the recessed surface sections so as to penetrate through the recessed surface sections in the front and rear direction of the separator main body.

7. A separator for a linear guide according to claim 1, further comprising bridge sections for connecting the separator main bodies with the arm sections.

8. A separator for a linear guide according to claim 7, wherein, in relation to the height of the recessed surface from an imaginary line interconnecting rotational centers of the adjacent rolling elements to an end face substantially parallel to a direct-acting surface of the rolling element in the recessed surface section of the separator main body, in a change direction section where the direction of movement of the rolling element is changed around a predetermined motion center, a height Ho of the recessed surface from the imaginary line interconnecting the rotational centers of the adjacent rolling elements on a distal side with reference to the motion center is made greater than a height Hi of the recessed surface from the imaginary line interconnecting rotational centers of the adjacent rolling elements on a proximal side with reference to the motion center.

9. A separator for a linear guide according to claim 7, wherein, in relation to a width of the separator main body at an end face substantially parallel to a direct-acting surface of the rolling element in a change direction section where the direction of movement of the rolling element is changed around a predetermined motion center, a width "a" of the separator main body located on a distal side with reference to the motion center is greater than a width "b" located on a proximal side with reference to the motion center.

10. A separator for linear guide according to claim 7, wherein, when the arm sections are configured so as to extend to substantially identical lengths from the center on both sides of the separator main body toward rotational centers of adjacent rolling elements in a moving direction, when a length of the arm section located on one side is taken as L;

a diameter of the rolling element is taken as Dwe;

a distance between centers of adjacent rolling elements is taken as κDwe;

a radius from the motion center to a locus of movement of rotational centers of the rolling elements at the change direction section is taken as R; and a radius from the motion center to an envelope surface, which is located at a position closer to the motion center than to an imaginary line interconnecting the centers of the adjacent rolling elements and defined by the arm sections (a height of the arm section in a direction orthogonal to a raceway surface of the rolling element is taken as A), is taken as Ri, the arm sections are formed into a contour such that a length Li of the arm section on one side (i.e., the length of one inner arm section), the arm section being located at a position closer to the motion center than to the imaginary line interconnecting the centers of the adjacent rolling elements and a length Lo of the arm section on the other side (the length of an outer arm section), the arm section being located at an opposite side to the motion center with reference to the imaginary line interconnecting the centers of the adjacent rolling elements satisfies the following equations:

$$\theta = \sin^{-1}\{\kappa Dwe/(2R)\}$$

$$0.3/2 \times Dwe \leq A \leq (R-Ri)$$

$$Li < (\kappa Dwe/2 - A \sin\theta)$$

$$Lo < \kappa Dwe/2.$$

11. A separator for linear guide according to claim 7, wherein, when the arm sections are configured to extend, on the respective sides of the separator, from the center of the separator main body toward the rotational centers of the adjacent rolling elements to different lengths with respect to the moving direction, the maximum length Ls of a total sum of lengths of the arm sections extending on the respective sides of the separator with respect to the moving direction is smaller than the distance κDwe between the rotational centers of adjacent rolling elements.

12. A separator for linear guide according to claim 7, wherein the contact surfaces provided on both sides of the separator main body with respect to the moving direction come into contact with adjacent rolling elements at a position, where a dimension between recessed contact surfaces of the recessed surface section is minimized.

13. A separator for linear guide according to claim 7, wherein
a recessed lubricant reservoir is formed in the contact surfaces of the recessed surface section.

14. A separator for use in a linear guide according to claim 1, wherein the guide rail has a roller guide surface, the slider has a load roller guide surface, a pair of change direction paths and a roller return passage, the load roller guide surface opposing the roller guide surface constitutes a roller track along with the roller guide surface, the pair of change direction paths remaining in communication with both ends of the roller track, and the roller return passage remaining in communication with the pair of change direction paths; and an endless circulation path is constituted of the roller track, the pair of change direction paths, and the roller return passage, the linear guide has guide grooves in the endless circulation path, the grooves continuous in a direction in which the rolling elements are arranged, the pair of arm sections are guided by the guide groove; and lubricant reservoir sections which are opened in respective the recessed surface section, the openings of the lubricant reservoir sections being made smaller than an outer dimension of the arm section, thereby preventing fitting of the arm section into the lubricant reservoir section.

15. A separator for use in a linear guide according to claim 14, wherein the maximum dimension of the opening section is smaller than the maximum dimension of the arm section within a cross section orthogonal to a longitudinal direction of the arm section.

16. A separator for use in a linear guide according to claim 1, wherein a through hole is formed in the center of the recessed surface sections so as to penetrate through the recessed surface sections in the front and rear direction of the separator main body.

17. A linear guide comprising the separator defined in claim 1.

18. A linear motion apparatus comprising:
a guide rail including a rolling surface;
a slider including a rolling surface opposing to the rolling surface of the guide rail and guided by the guide rail by way of a plurality of rolling elements interposed between the rolling surfaces so as to move relatively each other; and
a separator interposed between the adjacent rolling elements and including recessed surface sections being formed in portions of each of said spacers opposing said rolling elements,
wherein a cross section of the recessed surface section is formed into the shape of a single circular arc; the diameter of the rolling element is taken as Dw; a contact angle between the separator and the rolling element is taken as $\theta$; the radius of a circular arc groove of the recessed surface section is taken as R; the bottom thickness of the groove of the recessed surface of the separator is taken as $2\delta$; and the curvature radius of the recessed surface section is taken as "f", the separator assumes the contact angle $\theta$ which satisfies the following equations (4) and (5)

$$0.5Dw \cdot \sin\theta \tan\theta = \delta + R(1-\cos\theta) \tag{4}$$

$$f = R/Dw \tag{5}$$

19. A linear motion apparatus according to claim 18, wherein the range of the contact position between the recessed surface section of the separator and the rolling element is set within a range of $\pm 10°$.

20. A linear motion apparatus comprising:
a guide rail including a rolling surface;
a slider including a rolling surface opposing to the rolling surface of the guide rail and guided by the guide rail by way of a plurality of rolling elements interposed between the rolling surfaces so as to move relatively each other; and
a separator interposed between the adjacent rolling elements and including recessed surface sections being formed in portions of each of said spacers opposing said rolling elements,
wherein a contact position between the recessed surface section of the separator and the rolling element is set within a range of contact angle of 19° to 35°.

21. A linear motion apparatus comprising:
a guide rail including a rolling surface;
a slider including a rolling surface opposing to the rolling surface of the guide rail and guided by the guide rail by way of a plurality of rolling elements interposed between the rolling surfaces so as to move relatively each other; and
a separator interposed between the adjacent rolling elements and including recessed surface sections being formed in portions of each of said spacers opposing said rolling elements,
wherein a cross section of the recessed surface section is formed into the shape of a Gothic arch; the diameter of the rolling element is taken as Dw; a contact angle between the separator and the rolling element is taken as $\theta$; the radius of a Gothic arch groove of the recessed surface section is taken as R; the bottom thickness of the groove of the recessed surface of the separator is taken as $2\delta$; and the curvature radius of the recessed surface section is taken as "f", the separator assumes the contact angle $\theta$ which satisfies the following equations (1) to (3)

$$0.5Dw \cdot \sin\theta \tan\theta = \delta + R(\cos\theta_0 - \cos\theta) \tag{1}$$

$$\theta_0 = \sin^{-1}[\{(2f-1)/(2f)\}\sin\theta] \tag{2}$$

$$f = R/Dw \tag{3}$$

* * * * *